US 6,539,649 B2

(12) United States Patent
Sueshige et al.

(10) Patent No.: US 6,539,649 B2
(45) Date of Patent: Apr. 1, 2003

(54) POWER TRANSMISSION SYSTEM FOR SNOW-REMOVING MACHINE

(75) Inventors: Hiroshi Sueshige, Wako (JP); Takahiro Yamamoto, Wako (JP); Hiroshi Kobayashi, Wako (JP); Seishu Sakai, Wako (JP); Tomoaki Ishikawa, Wako (JP)

(73) Assignee: Honda Giken Kogyo Kabushiki Kaisha (JP)

( * ) Notice: Subject to any disclaimer, the term of this patent is extended or adjusted under 35 U.S.C. 154(b) by 67 days.

(21) Appl. No.: 09/793,937

(22) Filed: Feb. 27, 2001

(65) Prior Publication Data

US 2001/0008055 A1 Jul. 19, 2001

(30) Foreign Application Priority Data

Jan. 3, 2000 (JP) ........................................ 2000-055845
Mar. 21, 2000 (JP) ........................................ 2000-078279
Mar. 30, 2000 (JP) ........................................ 2000-095805
Mar. 31, 2000 (JP) ........................................ 2000-099642

(51) Int. Cl.$^7$ ............................. E01H 5/09; F16D 67/02
(52) U.S. Cl. ........................................ 37/245; 192/17 R
(58) Field of Search ........................... 37/244, 245, 255, 37/257, 266; 56/11.3; 192/12 R, 17 A, 17 R, 18 R, 113 B

(56) References Cited

U.S. PATENT DOCUMENTS 4,255,879 A * 3/1981 Greider ........................ 172/42
5,000,302 A   3/1991 Takeshita ................... 192/17 R

FOREIGN PATENT DOCUMENTS

| GB | 704497 | 2/1954 |
| GB | 1025607 | 4/1996 |
| JP | 51034111 | 3/1975 |

* cited by examiner

Primary Examiner—Robert E. Pezzuto
(74) Attorney, Agent, or Firm—Adams & Wilks

(57) ABSTRACT

A power transmission system for use in a snow-removing machine has a drive shaft having a first end for supporting a snow blower having a forward end and a rearward end. The drive shaft has second end disposed opposite the first end and for extension from the forward end of the snow blower. An auger transmission is connected to the second end of the drive shaft and has an auger shaft for undergoing rotation in accordance with rotation of the drive shaft. An auger is mounted on the auger shaft for rotation therewith. An overload protecting mechanism is disposed between the snow blower and the auger transmission for preventing application of a power overload between the drive shaft and the auger.

20 Claims, 40 Drawing Sheets

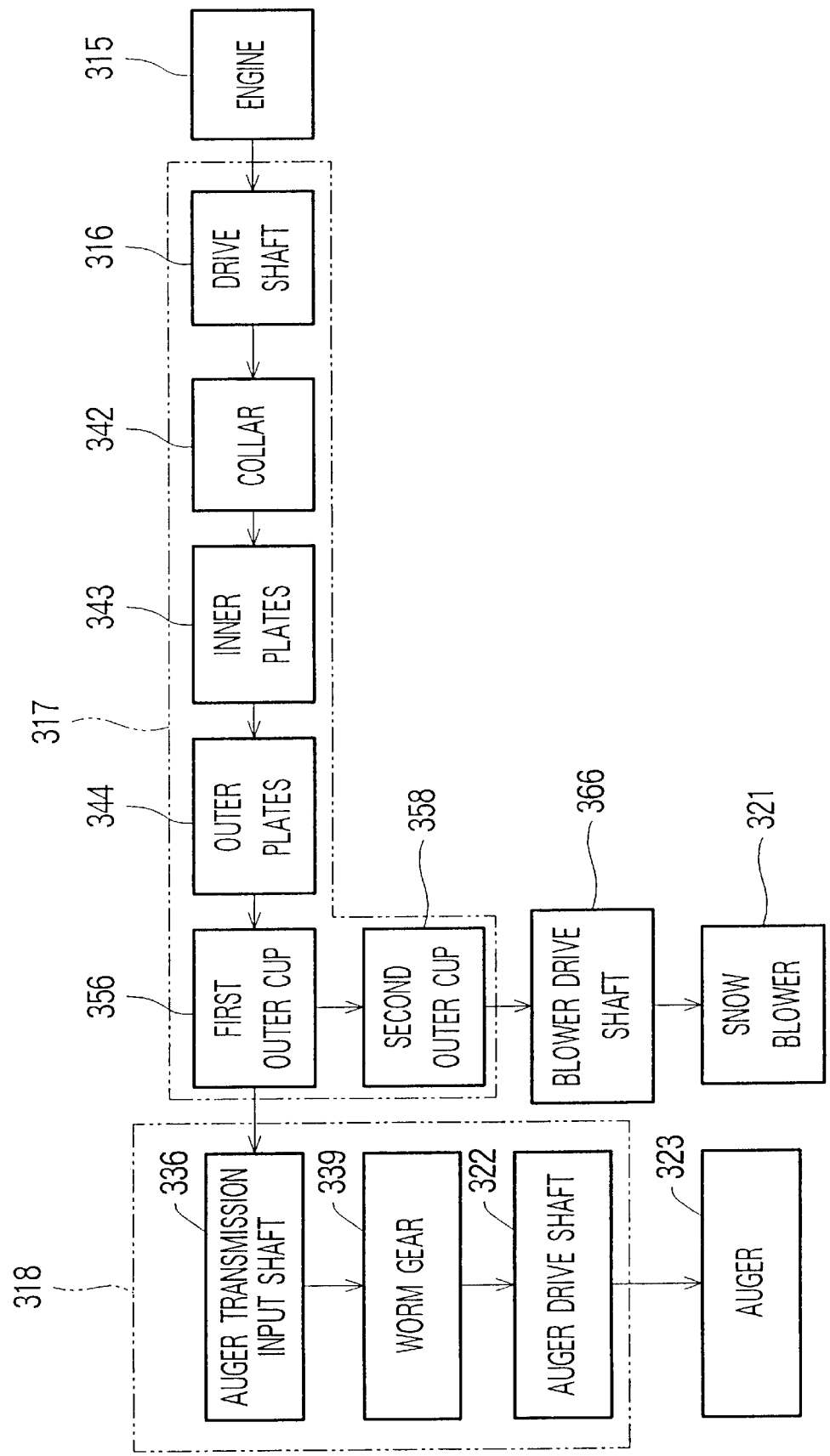

ified mounting structure to allow a damaged snow blower to be easily replaced with a new one, thereby preventing a decrease in snow-removing performance.

POWER TRANSMISSION SYSTEM FOR SNOW-REMOVING MACHINE

BACKGROUND OF THE INVENTION

1. Field of the Invention

This invention relates to power transmission systems for use in a snow-removing machine for protecting an auger and/or a power delivery path from overload, preventing a decrease in snow-removing performance and allowing the snow-removing machine to be downsized and to be compact in structure.

2. Description of the Related Art

In general, downsized, hand-type self-propelled snow-removing machines have been proposed to transmit output power of an engine to an auger through a power transmission system such that the auger collects snow and collected snow is discharged far off. One of these snow-removing machines is, for example, disclosed in Japanese Utility Model Kokai (Post-Exam) Publication No. 51-34111.

The snow-removing machine of this type usually includes a pulley coupled to an output shaft of an engine, a pulley coupled to a rear end portion of a power delivery path and a belt connected between two pulleys, with a snow blower being located midway of the power delivery path. A forward end of the power delivery path is connected to an auger transmission section that has an auger drive shaft connected to an auger.

For example, during rotation of the auger, when the auger accidentally encounters or hits an obstacle such as compressed snow, a lump of ice or stone projecting upward from a road surface to cause rotation of the auger to be interrupted, the auger, the power delivery path between the auger drive shaft and the engine output shaft, and the engine are caused to encounter excessively large forces.

One technique for protecting the snow-removing machine from excessively large forces is to place a pin, a so-called "shear pin", in a power delivery path and to cause the shear pin to be cut or broken in overload conditions, prior to the excessively large forces acting on the power delivery path thereby protecting the power delivery path from inadvertent damage.

With such a technology, when the shear pin is cut or broken, however, the snow-removing operation is interrupted, and the damaged shear pin is replaced with new one, resulting in a decrease in the snow-removing performance.

In order to lighten the work load, various attempts have been made to provide a snow-removing machine which is downsized and compact in structure.

In addition, for example, in the event the snow collected by the auger contains an obstacle such as a relatively large stone or a lump of ice, the obstacle accidentally enters a space between the snow blower and the frame body, interrupting rotation of the snow blower such that the snow blower encounters excessively large forces.

In the event the blades of the snow blower encounters damage owing to the excessively large forces, the damaged snow blower must be replaced with new one.

However, in the event the snow blower and the pulley are firmly mounted to the rotational axis, when the blades of the snow blower encounter damage, the snow blower, the rotational axis and the pulley must replaced as a whole, resulting in an increased cost.

Since, further, the aforementioned rotational axis is coupled to the auger transmission section by means of a fastening segment such as bolts, plural fastening segments should be employed in the power delivery path between the engine output shaft and the auger transmission section. Accordingly, when the power delivery path is assembled, the plural fastening segments may cause increased assembling steps, providing deteriorated workability in assembling.

SUMMARY OF THE INVENTION

It is therefore an object of the present invention to provide a power transmission system for a snow-removing machine, which system is suitable for preventing a snow blower, an auger and a power delivery path between the auger and a drive source, such as an engine, from excessively large forces, and which system has a simplified mounting structure to allow a damaged snow blower to be easily replaced with a new one, thereby preventing a decrease in snow-removing performance.

According to an aspect of the present invention, there is provided a power transmission system for a snow-removing machine, which system comprises a drive shaft driven by a drive source, an auger transmission for driving an auger located in front of a snow blower driven by the drive shaft, and an overload protecting mechanism connected between the snow blower and the auger transmission for preventing a power delivery path between the drive shaft and the auger transmission from excessive overload.

With the system thus arranged, owing to the overload protecting mechanism located between the auger transmission and the snow blower, it is possible to provide protection from damage when the auger and the power delivery path encounter overload. Also, since the overload protecting mechanism can be located in a large space between the auger transmission and the snow blower, the existing, relatively large space can be effectively utilized thereby allowing the snow-removing machine to be small-sized and compact in structure.

Desirably, the overload protecting mechanism is located in close proximity to the auger transmission. For example, in the event the snow blower is mounted on the main drive shaft with the shear pin for protection of the overload, it is possible to increase the distance between the shear pin and the auger transmission, providing ease of assembling or disassembling of the shear pin.

In a preferred form, the overload protecting mechanism comprises a wet type friction coupling incorporating at least one pair of friction plates held in contact with one another, with one of the friction plates being coupled to the aforementioned main drive shaft while the other friction plate is coupled to the aforementioned auger transmission input shaft. When a torque to be exerted exceeds a given value, the friction plates begin to slip. With such a wet type friction coupling employed as the overload protecting mechanism, the overload to be exerted on the power delivery path is effectively prevented, permitting the complicated assembling step of the shear pin to be omitted while providing improved workability.

Preferably, the input shaft of the auger transmission comprises an oil passage for interconnecting the interior of the auger transmission and the interior of the friction coupling. Flood oil coming out from the friction coupling owing to expansions of various component parts of the friction coupling caused due to thermal heat produced in the friction coupling escapes through the oil passage to the auger transmission, preventing oil from being leaked to outside. Since, further, the auger transmission additionally serves as an oil tank, a specific oil tank is not required for the friction coupling.

It is desirable that the overload protection mechanism further comprises a rubber coupling that includes an input shaft coupled to a main drive shaft, an output shaft coupled to the auger transmission, and cushion rubbers located between the input and output shafts.

Thus, by locating the rubber coupling between the auger transmission and the snow blower, overload is effectively prevented when the auger and the power delivery path encounter overload. Further, it is possible to omit the complicated assembling steps for frequent replacement of the overload protecting shear pin thereby providing an improved workability. In addition, the rubber coupling is located in a large space between the auger transmission and the snow blower, allowing effective utilization of the existing large space while providing the snow-removing machine that is small in size and compact in structure.

The overload protecting mechanism may include input members coupled to the main drive shaft, an output member composed of a cylindrical segment, with the snow blower and the auger transmission being connected to the output member such that the cylindrical member of the overload protecting mechanism is effective to provide protection from damage when the snow blower, the auger and the power delivery path encounter overload, preventing the snow blower. In the preferred embodiments, the overload protecting mechanism functions to cause the output member to rotate slightly after the input members when a torque to be exerted from the input members exceeds a given value. More particularly, for example, the input members begin to slip relative to the output member, thereby absorbing excessive load imparted to the power delivery path.

Preferably, the cylindrical member comprises an inner cylinder, an outer cylinder covering the inner cylinder, and a fastening segment for interconnecting the inner and outer cylinders to one another, with one of the inner and outer cylinders being coupled to the auger while the other one of the inner and outer cylinders is coupled to the snow blower. By dividing the cylindrical member into the inner and outer cylinders and by combining these cylinders with fastening segment, the inner and outer cylinders may be directly coupled to the auger and the snow blower without the use of additional fastening segment, thereby improving workability in assembly of the system. With the use of the inner and outer cylinders, further, the cylindrical member, even when it is divided into two pieces, is not increased in outer size, preventing the overload protecting mechanism from being largely sized.

By mounting the snow blower onto the aforementioned cylindrical member with a fastening segment in a detachable fashion, when the snow blower is damaged and replacement of the old one with the new one is required, the snow blower can be replaced in a simplified manner.

BRIEF DESCRIPTION OF THE DRAWINGS

Certain preferred embodiments of the present invention will be described in detail below, by way of example only, with reference to the accompanying drawings in which:

FIGS. 6A and 6B are side views illustrating the operation of the power transmission system according to the first embodiment, wherein FIG. 6A shows an operating condition in which an auger of the snow-removing machine is brought into contact with a projecting portion of a road surface while FIG. 6B shows a power delivery path in the above operating condition;

FIGS. 15A and 15B are side views illustrating the operation of the power transmission system according to the second embodiment, wherein FIG. 15A shows an operating condition in which an auger of the snow-removing machine is brought into contact with a projecting portion of a road surface while FIG. 15B shows a power delivery path in the above operating condition;

FIG. 21 is a block diagram illustrating the operation of the power transmission system according to the third embodiment;

FIGS. 22A and 22B are side views illustrating the operation of the power transmission system according to the third embodiment, wherein FIG. 22A shows an operating condition in which an auger of the snow-removing machine is brought into contact with a projecting portion of a road surface while FIG. 22B shows a power delivery path in the above operating condition;

FIGS. 27A and 27B are side views illustrating the operation of the power transmission system according to the fourth embodiment, wherein FIG. 27A shows an operating condition in which an auger of the snow-removing machine is brought into contact with a projecting portion of a road surface while FIG. 27B shows a power delivery path in the above operating condition;

FIGS. 32A and 32B are side views illustrating the operation of the power transmission system according to the fifth embodiment, wherein FIG. 32A shows an operating condition in which an auger of the snow-removing machine is brought into contact with a projecting portion of a road surface while FIG. 32B shows a power delivery path in the above operating condition;

FIGS. 35A and 35B are side views illustrating the operation of the power transmission system according to the sixth embodiment, wherein FIG. 35A shows an operating condition in which an auger of the snow-removing machine is brought into contact with a projecting portion of a road surface while FIG. 35B shows a power delivery path in the above operating condition;

FIGS. 38A and 38B are side views illustrating the operation of the power transmission system according to the seventh embodiment, wherein FIG. 38A shows an operating condition in which an auger of the snow-removing machine is brought into contact with a projecting portion of a road surface while FIG. 38B shows a power delivery path in the above operating condition;

FIGS. 41A and 41B are side views illustrating the operation of the power transmission system according to the eighth embodiment, wherein FIG. 41A shows an operating condition in which an auger of the snow-removing machine is brought into contact with a projecting portion of a road surface while FIG. 41B shows a power delivery path in the above operating condition;

DETAILED DESCRIPTION OF THE PREFERRED EMBODIMENTS

The following description is merely exemplary in nature and is in no way intended to limit the invention, its application or uses.

Figure 1:
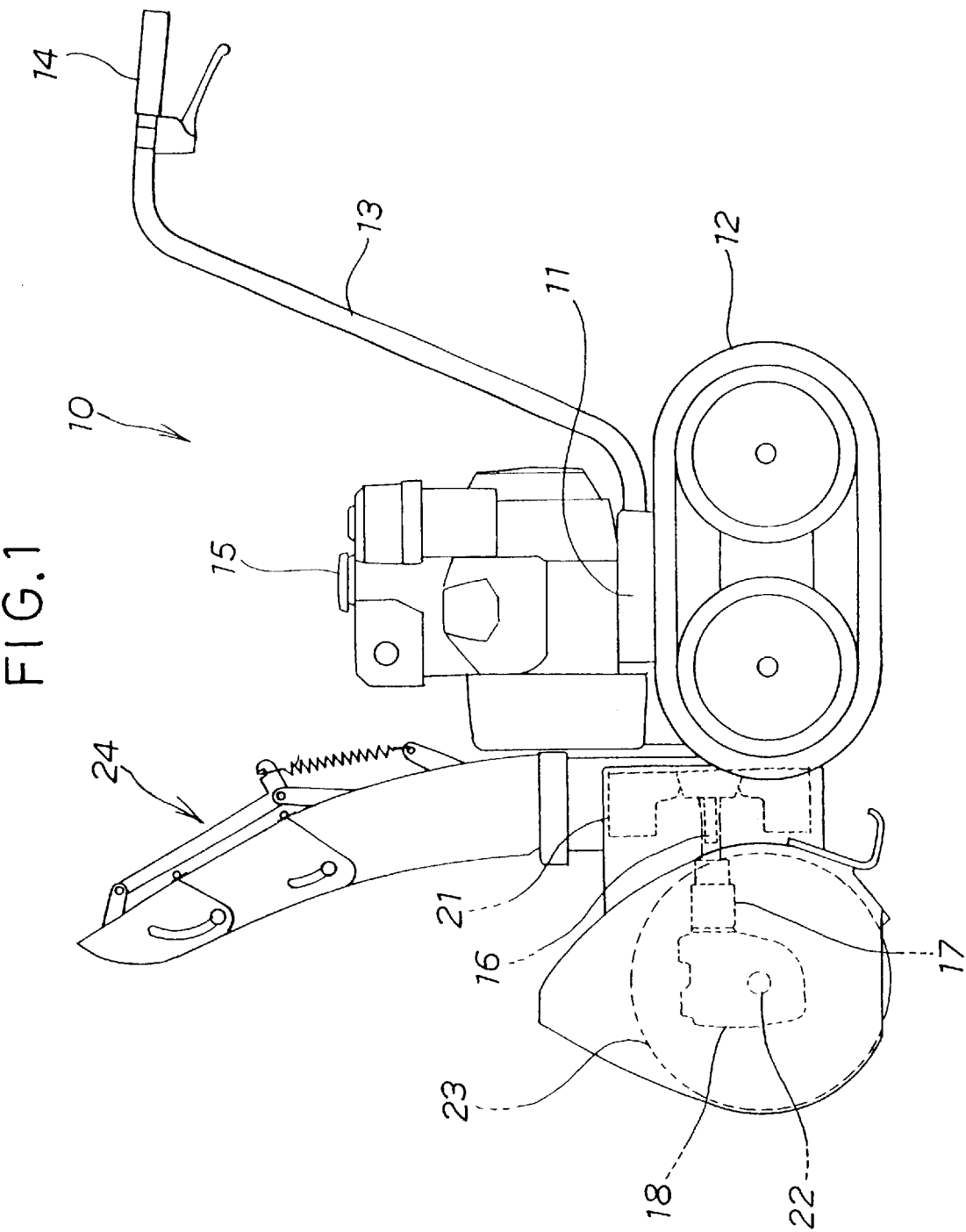
FIG. 1 is a side view of a snow-removing machine having a power transmission system according to a first embodiment of the present invention.

Referring now to FIG. 1, a self-propelled snow-removing machine, generally designated at 10, includes a pair of laterally spaced crawlers 12 (a right side crawler is not seen and hence not shown) which are rotatably supported by a body frame 11. Handles 13 are connected to a rear portion of the frame body 11 and extend upward and rearward. Extreme upward ends of the handles 13 have grip portions 14, respectively. A prime mover such as an engine 15 is mounted on the frame body 11 to drive the pairs of crawlers 12. The engine 15 has a main drive shaft 16 that extends in a longitudinal direction toward a front portion of the frame body 11. A rear end of the main drive shaft 16 supports thereon a snow blower 21. The main drive shaft 16 is connected to an auger transmission 18 via a friction coupling 17 that serves as an overload protecting mechanism. An auger 23 is mounted on an auger drive shaft 22 of the auger transmission 18. The engine 15 drives the main drive shaft 16, which rotates the snow blower 21 and also rotates the auger 23 located in front of the snow blower 21, via the auger transmission 18. The auger 23 rotates to collect snow, and collected snow is forced upward by the snow blower 21 and discharged far off via a shooter 24.

Figure 2:
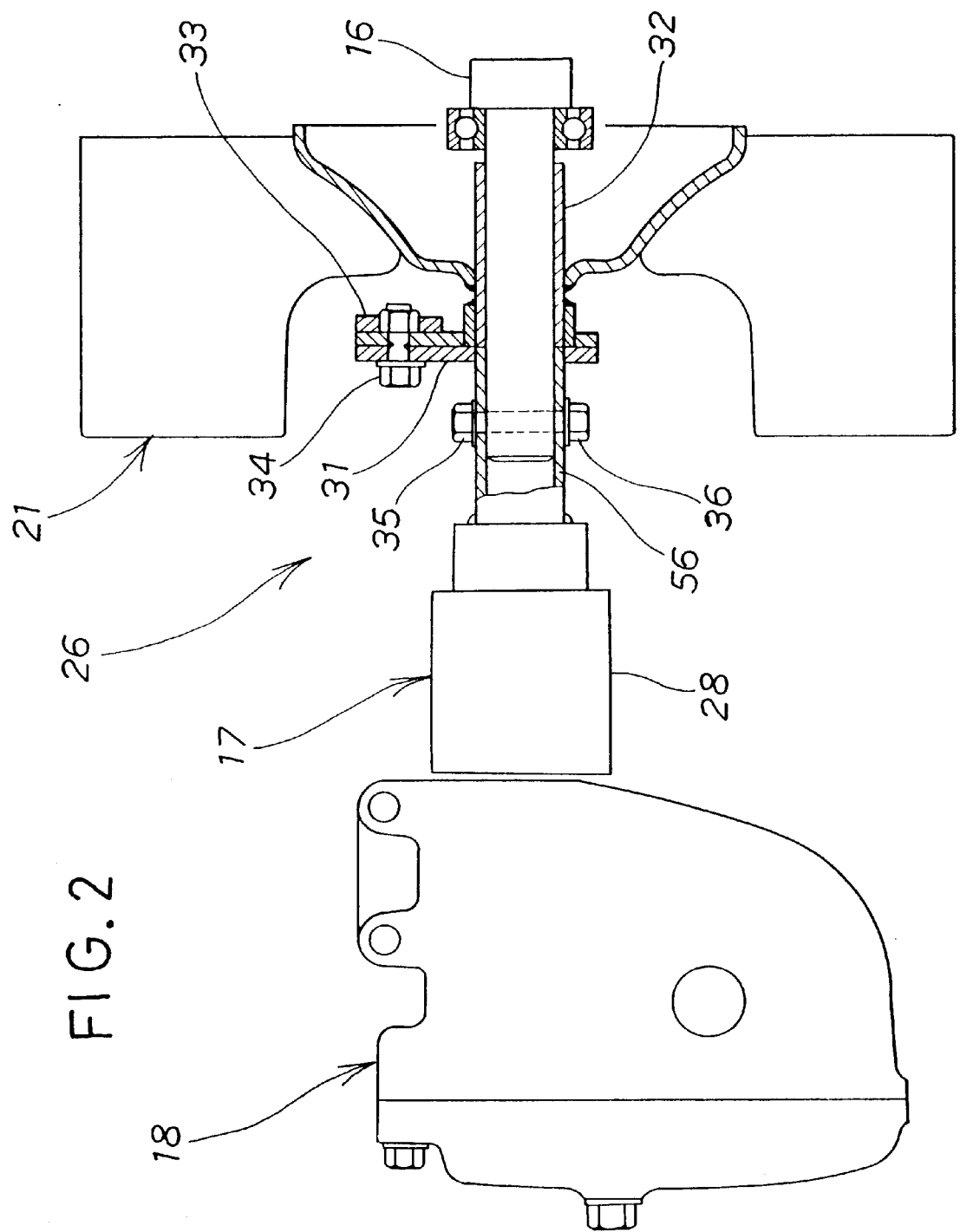
FIG. 2 is an enlarged view of the power transmission shown in FIG. 1, partly in cross section.

FIG. 2 shows in cross section a first preferred embodiment of a power transmission system according to the present invention. To prevent an overload to be applied to a power train mechanism between the main drive shaft 16 and the auger 23 (see FIG. 1), the friction coupling 17 is mounted on an input side of the auger transmission 18 in a space 26 between the auger transmission 18 and the snow blower 21.

The friction coupling 17 includes at its input side an outer cup 28 having a flange 31. The main drive shaft 16 is inserted to a hollow blower drive shaft 32 of the snow blower 21. The blower drive shaft 32 has a flange 33. The flanges 31 and 33 are coupled to one another with a bolt-shaped shear pin 34. The shear pin 34 functions to prevent the snow blower 21 from being damaged only when the snow blower 21 is applied with overload caused by obstacles such as stones or lumps of ice. Reference numerals 35 and 36 refer to a bolt and a nut, respectively, for coupling the outer cup 28 of the friction coupling 17 to the main drive shaft 16.

Figure 3:
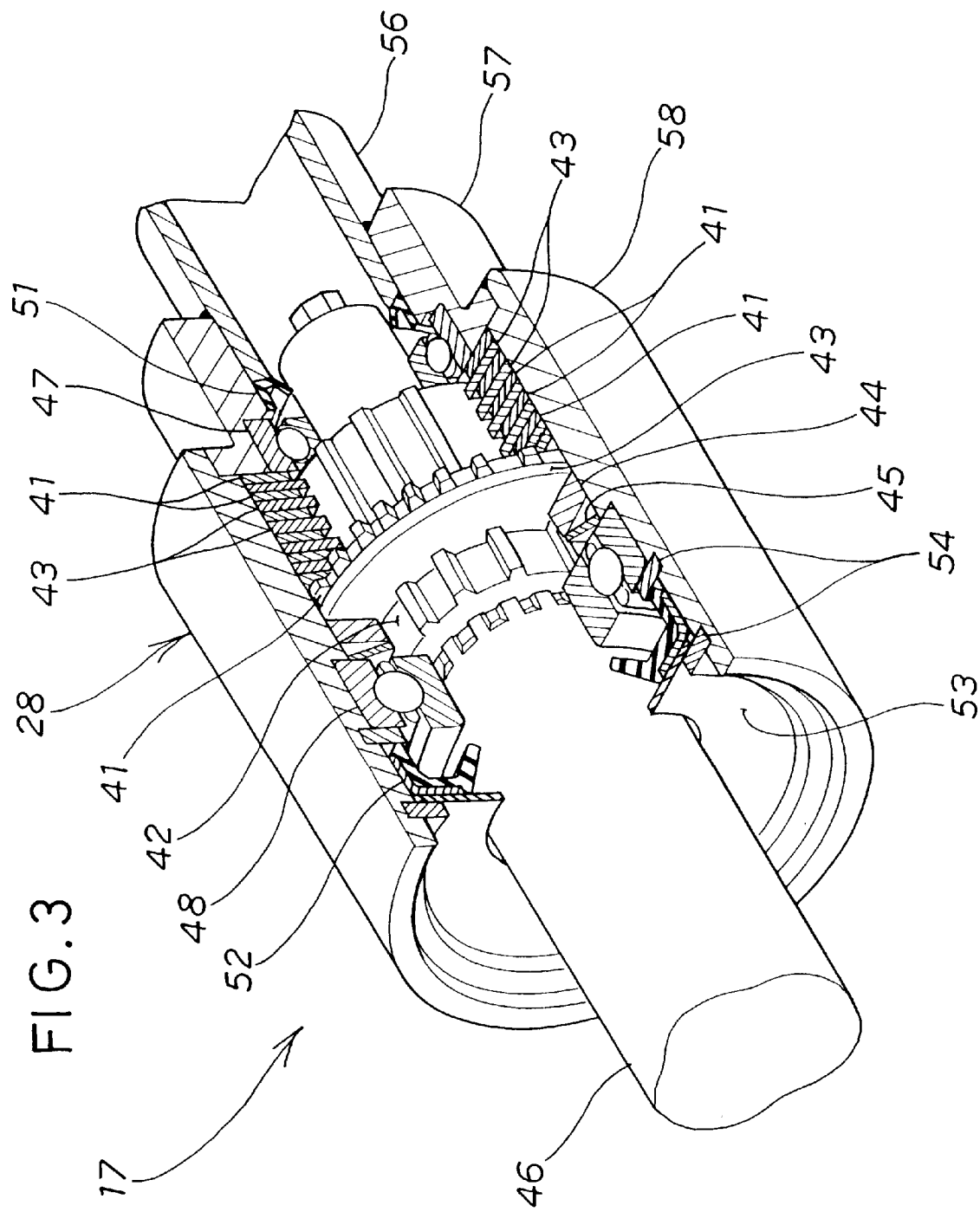
FIG. 3 is an enlarged perspective view of the power transmission system, partly in cross section, of FIG. 2.

FIG. 3 illustrates the friction coupling 17 shown in a perspective view, with certain parts being cut away for clarity. The friction coupling 17 includes the cylindrical outer cup 28, which serves as a casing for receiving a clutch coupling mechanism. An inner periphery of the outer cup 28 has a spline that meshes with a plurality of outer plates 41. A plurality of inner plates 43 is alternately interlaced with the plurality of outer plates 41 and mesh with an outer spline of a collar 42. Both the outer and inner plates 41 and 43 are urged by a dish spring 45 by means of an urging plate 44. Owing to the spring force of the dish spring 45, there exists friction between the outer and inner plates 41 and 43. An auger transmission input shaft 46 extends through the outer cup 28 in an axial direction and is coupled to an inner periphery of the collar 42 by spline coupling. The auger transmission input shaft 46 is rotatably supported in the outer cup 28 by means of bearings 47 and 48 supported therein. Oil seals 51 and 52 provide a seal for lubricating oil in a space between the bearings 47 and 48, while preventing entry of obstacles into the inside space from outside. A disc 53 is fixed in the outer cup 28 outwardly of the oil seal 52.

The friction coupling 17 includes a wet type friction coupling having the plurality of outer plates 41 and the plurality of inner plates 43.

In FIG. 3, one piece of the outer plates 41, the collar 42 and one piece of the inner plates 43 are shown, without cutout in these component parts for the sake of easy understanding of a spline coupling condition. Reference numerals 54,54 designate stationary rings for preventing the bearing 48 and the disc 53 to dislocate from the outer cup 28.

The outer cup 28 has a hollow outer cup shaft 56 that is connected to the main drive shaft (see FIG. 2), and a hollow cylinder 58 connected to the outer cup shaft 56 via a cylindrical interconnecting shaft 57. The hollow cylinder 58 is coupled to the outer periphery of the plurality of the outer plates 41 by spline connection.

Figure 4:
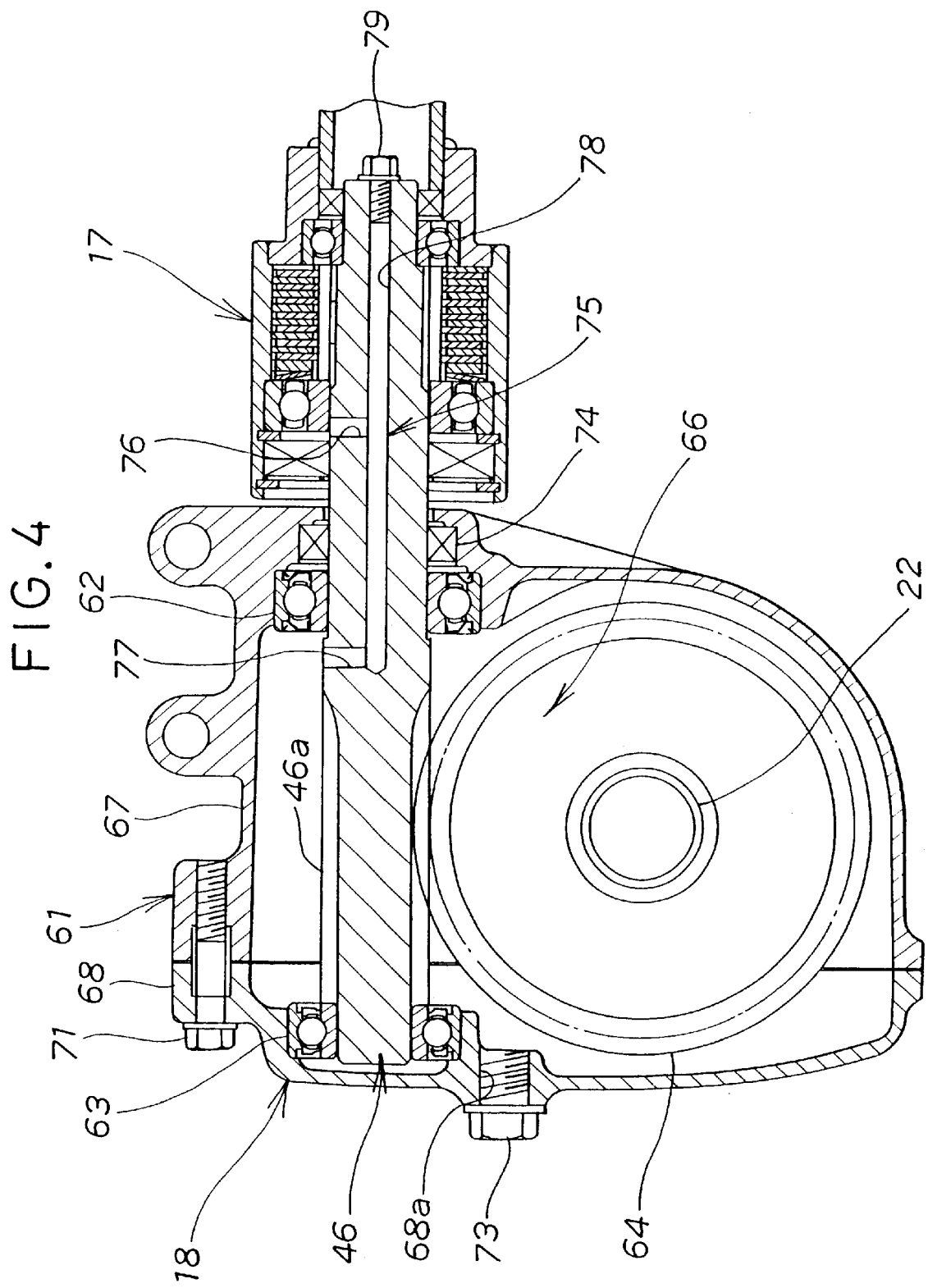
FIG. 4 is an enlarged cross sectional view illustrating the relationship between a friction coupling and an auger transmission shown in FIG. 2.

FIG. 4 shows the friction coupling 17 and the auger transmission 18, in cross section, which are incorporated in the first preferred embodiment. The auger transmission 18 includes a transmission case 61, an auger transmission input shaft 46 rotatably supported by bearings 62 and 63 fixed in the transmission case 61, a worm wheel 64 meshing with a worm 46*a* formed on an outer periphery of the auger transmission input shaft 46, and the auger drive shaft 22 fixedly secured to the center of the worm wheel 64.

The worm 46*a* and the worm wheel 64 constitute a worm gear 66.

The transmission case 61 has a case body 67 and a cover 68 for covering an opening of the case body 67. The cover 68 is fixedly secured to the case body 67 by bolts 71. Reference numeral 73 indicates a bolt that closes an oil supply bore 68*a* formed in the cover 68 after supplying oil to the transmission case 61. Reference numeral 74 indicates an oil seal.

The auger transmission shaft 46 has an oil passage 75 that interconnects an interior of the auger transmission 18 and the friction coupling 17.

The oil passage 75 includes an axial bore 78 formed in an axial direction of the auger transmission shaft 46 and radial bores 76 and 77 communicating with the axial bore 78, with an end of the axial bore 78 being closed with a bolt 79. The radial bore 76 is opened to an interior of the friction clutch coupling 17, and the radial bore 77 is opened to the interior of the auger transmission 18.

Figure 5:
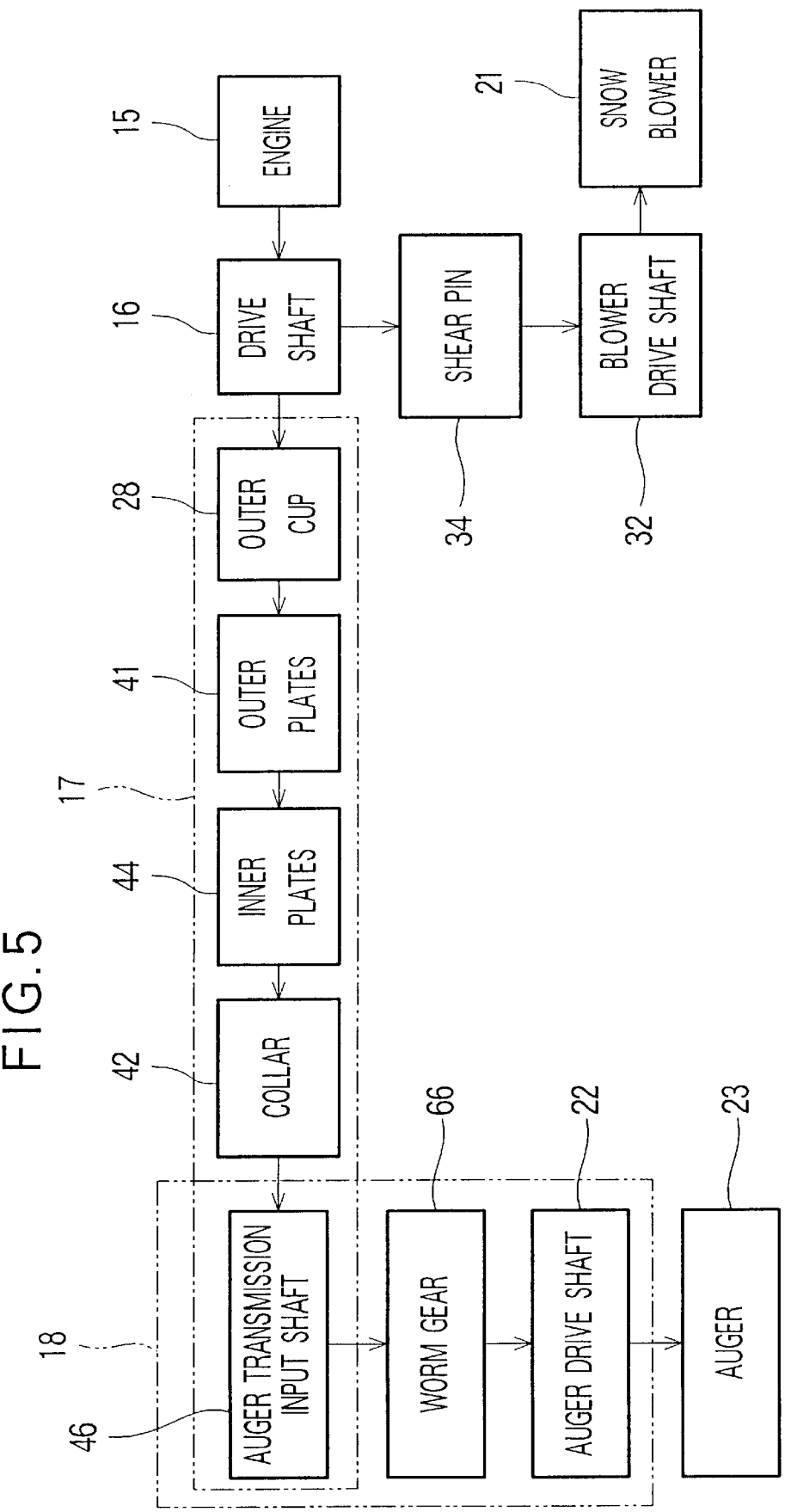
FIG. 5 is a block diagram illustrating a basic sequence of operation of the power transmission system according to the first embodiment.

FIG. 5 shows a basic sequence of power transmission in the power transmission system of the first preferred embodiment. Output power of the engine 15 is transmitted through the main drive shaft 16 to the snow blower 21 and the auger 23.

That is, output power of the engine 15 transmitted to the main drive shaft 16 is diverged to the friction coupling 17, and the shear pin 34 through which output power is delivered to the snow blower 21 via the blower drive shaft 32.

In the friction coupling 17, output power of the engine 15 is delivered through the outer cup 28, the outer plates 41, the inner plates 43 and the collar 42 to the auger transmission input shaft 46, from which output power is further transmitted to the auger 23 through the auger transmission 18. In the auger transmission 18, output power of the engine 15 is delivered through the auger transmission input shaft 46 and the worm gear 66 to the auger drive shaft 22 from which output power is finally supplied to the auger 23.

In a power delivery path described above, output power of the engine 15 is transmitted through the friction coupling 17 and the auger transmission 18 to the auger 23.

Now, operation of the power transmission system of the first preferred embodiment of present invention will be described in detail with reference to FIGS. 6A to 8.

Figure 6A:
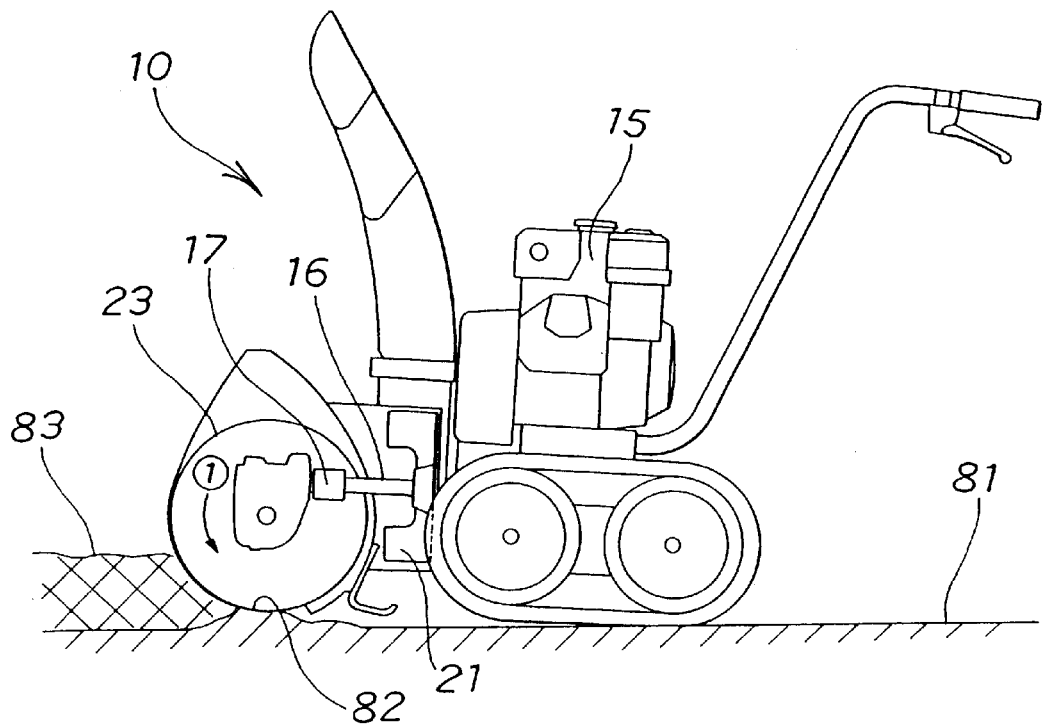

In FIG. 6A, when the auger 23 of the snow-removing machine 10 accidentally encounters or hits a projecting portion 82 of a road surface 81 during snow-removing operation (wherein snow bears a reference numeral 83), rotation of the auger 23 in a direction as indicated by an arrow ① is disturbed, and load exerted on the auger 23 and the power delivery path between the main drive shaft 16 and the auger 23 and the engine 15 rapidly increases.

Figure 6B:
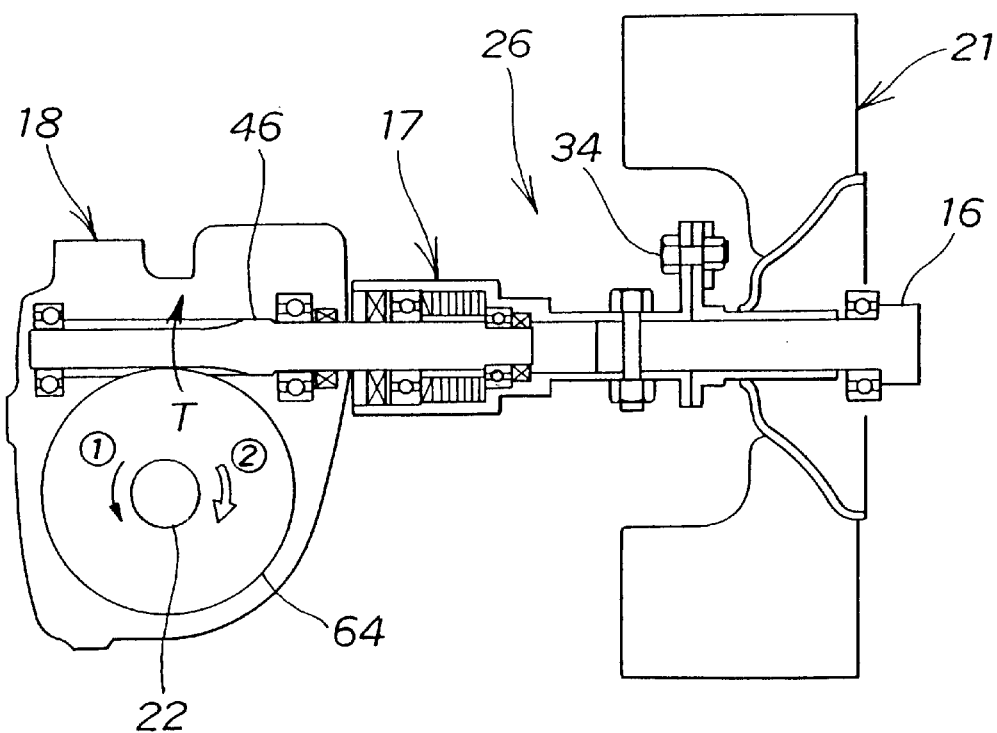

Owing to this rapid increase in load, the auger drive shaft 22 is subjected to a reacting force for rotation in a direction as indicated by an arrow ② opposite to a rotational direction as indicated by an arrow ① in FIG. 6B. Due to this reacting force and output power of the engine 15 (see FIG. 6A), a torsional momentum is produced between the auger transmission input shaft 46 and the main drive shaft 16 via the auger drive shaft 22 and the worm wheel 64.

Figure 7:
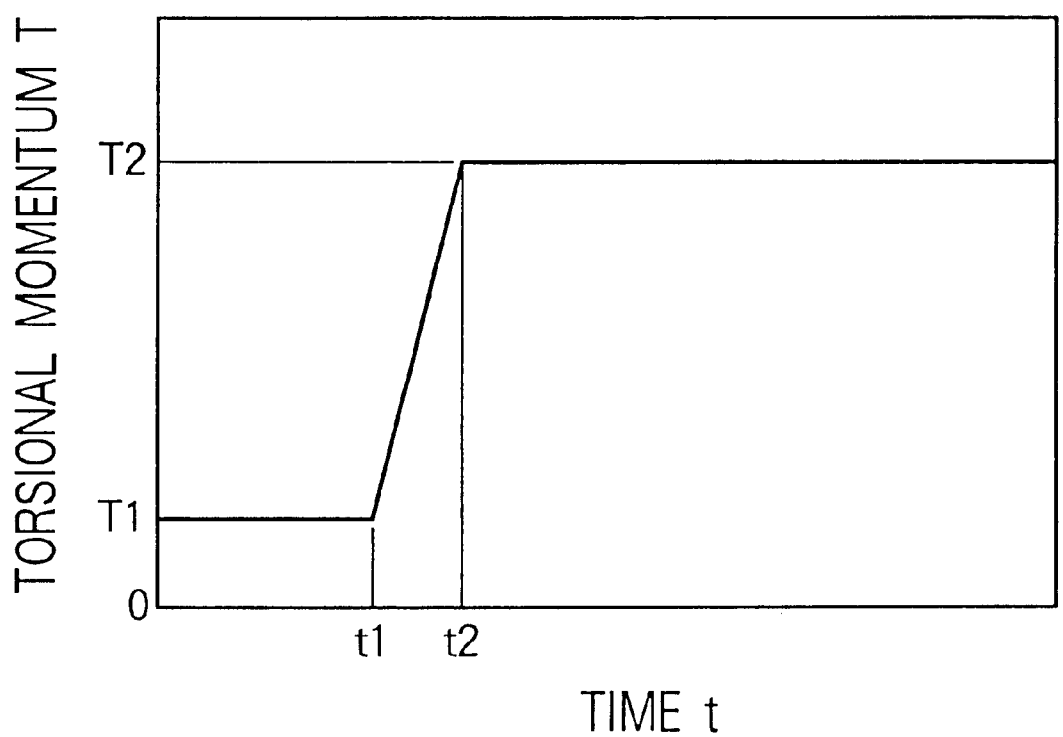
FIG. 7 is a graph illustrating the relationship between the torsional momentum exerted on an auger transmission input shaft and the time.

The torsional momentum T varies as shown in a graph of FIG. 7. In FIG. 7, vertical axis indicates the torsional momentum T, and abscissa indicates time t.

In FIG. 7, a symbol T1 refers to the torsional momentum produced in the input shaft 46 when the snow-removing machine 10 is in normal operation.

A symbol T2 refers to a given torsional momentum, that is determined with a frictional surface coefficient of the outer plates 41 and the inner plates 43 (see FIG. 3) of the friction coupling 17, a biasing force exerted on the outer plates 41 and the inner plates 43 by the dish spring 45, and a diameter of portions which are subjected to frictional forces caused by the outer plates 41 and the inner plates 43.

For example, when the auger 23 accidentally hits, at time instant t1 in FIG. 7, the projecting portions 82 of the road surface 81 as shown in FIG. 6A, the torsional momentum T sharply increases from T1 as viewed in FIG. 7. At time instant t2, the torsional momentum T reaches the given tortional momentum T2 and, when this occurs, the outer plates 41 and the inner plates 43 of the friction clutch coupling 17 (see FIG. 6B) begin to slip such that the given momentum does not exceeds a value T2. Thus, by presetting the torsional momentum T2 to a predetermined value below strengths of individual component parts of the power delivery path, it is possible to protect against inadvertent damage to the individual component parts of the power delivery path such as the main drive shaft 16, the friction coupling 17, the auger transmission 18, the auger 23 and the engine 15. As shown in FIG. 6B, since the friction coupling 17 is located in a large space 26 between the auger transmission 18 and the snow blower 21, the existing space 26 can be effectively utilized, enabling the snow removing machine 10 which is small-sized and compact in structure.

With such a structure wherein the friction coupling 17 is mounted closer to the auger transmission 18, there exists a big distance between the shear pin 34 and the friction coupling 17, providing ease of assembling or disassembling of the shear pin 34.

As seen in FIG. 6A, since the friction coupling 17 is located between the auger transmission 18 and the snow blower 21, the friction coupling 17 is efficiently cooled with snow collected by the auger 23 or air drawn by the snow blower 21, with an increased cooling efficiency for thereby extending life of the friction coupling 17.

During snow removing operation of the snow-removing machine 10, when frictional heat occurs in the friction coupling 17 due to slippage caused therein as discussed with reference to FIGS. 6 and 7 and oil in various parts of the friction coupling 17 and in the interior of the friction coupling 17 expands with frictional heat, oil overflows from the interior of the friction coupling 17 into the auger transmission 18 through the oil passage 75 formed in the auger transmission input shaft 46 in a direction as indicated by an arrow ② in FIG. 8.

Figure 8:
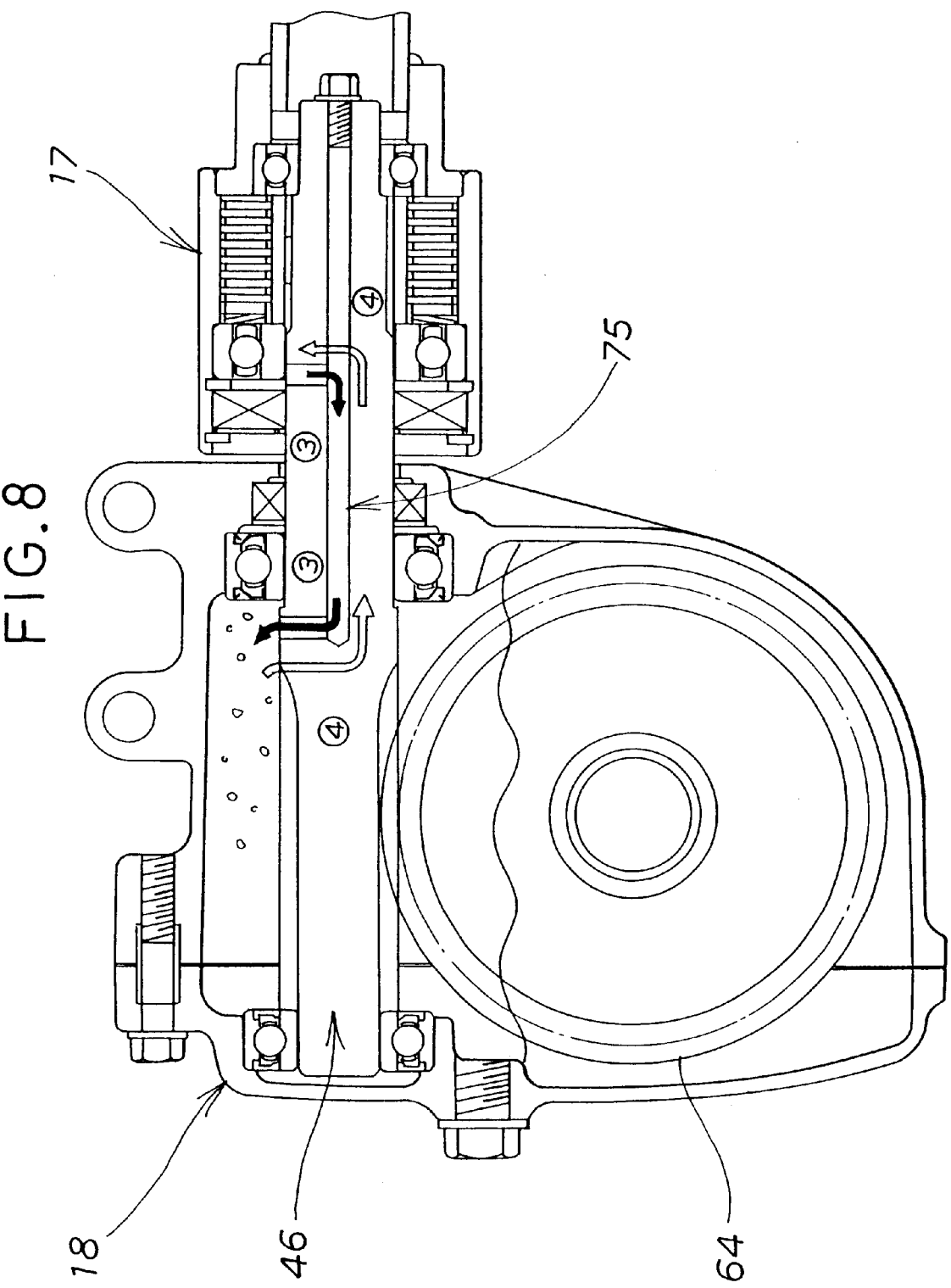
FIG. 8 is a view for illustrating a sequence of oil flow between an auger transmission and a friction coupling in the power transmission system according to the first embodiment.

Also, when heat in the friction coupling 17 is dissipated and the temperature thereof is lowered, oil delivered by the worm wheel 64 in the auger transmission 18 is caused to flow through the oil passage 75 in a direction as indicated by an arrow ④ in FIG. 8 into the friction coupling 17 at reduced pressure caused therein.

In this fashion, due to presence of the oil passage 75 in the auger transmission input shaft 46 to interconnect the interior of the auger transmission 18 and the interior of the friction coupling 17, flood oil flowing out of the friction coupling 17 is caused to escape through the oil passage 75 into the auger transmission 18, preventing oil from leaked to outside.

Since the auger transmission 18 also serves as an oil tank, it is not required to additionally provide a specific oil tank.

Figure 9:
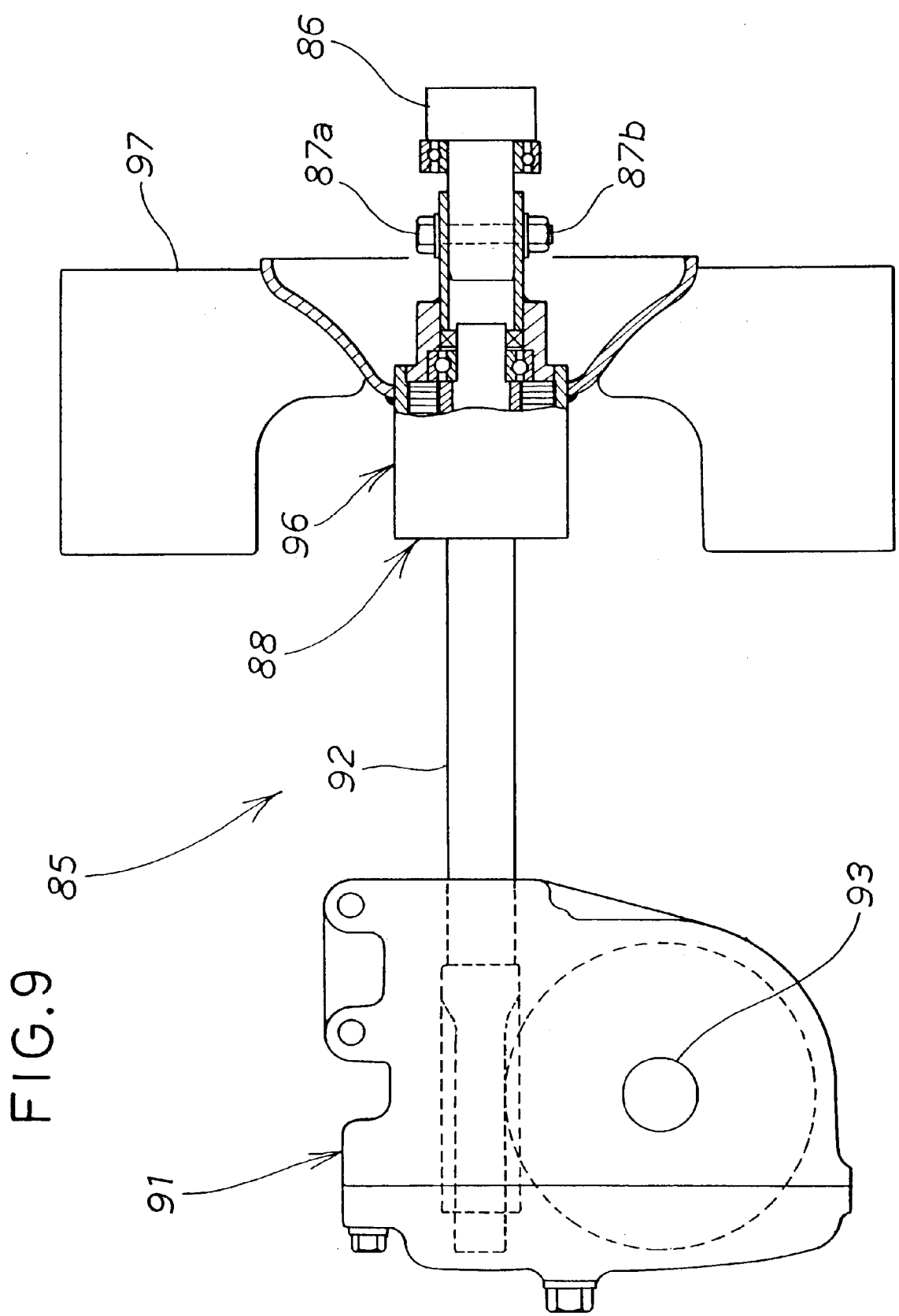
FIG. 9 is a side view of a modified form of the power transmission system according to the first embodiment, partly in cross section.

FIG. 9 shows a modified form of the power transmission system of the first preferred embodiment.

In the modified from of FIG. 9, a power transmission 85 includes a main drive shaft 86 connected to and driven by the engine 15 (see FIG. 1), a friction coupling 88 coupled to the main drive shaft 86 by means of bolt 87a and a nut 87b, an auger transmission input shaft 92 that serves as an output shaft of the friction coupling 88, and an auger transmission 91. Reference numeral 93 indicates an auger drive shaft for driving the auger (not shown).

The friction coupling 88 includes an outer cup 96 that serves as an input shaft of the friction coupling 88. The outer cup 96 directly carries thereon a slow blower 97. The friction coupling 88 is basically identical in structure to the friction coupling 17 shown in FIG. 3, except for the outer coupling 96.

With such a structure wherein the snow blower 97 is directly mounted on the outer coupling of the friction coupling 88, coupling elements such as bolts and nuts for mounting the blower drive shaft of the blower 97 to the main drive shaft and for mounting the blower drive shaft to the main drive shaft may be dispensed with, reducing the component parts. Thus, the manufacturing cost of the snow-removing machine can be reduced.

While, in the first preferred embodiment and the modified form of the present invention, the friction coupling has been shown and described as comprising a wet type friction coupling, the present invention is not limited thereto and may be of a dry type friction coupling that includes first and second single friction plates located at input and output sides, respectively.

Now, a second preferred embodiment of a power transmission system according to the present invention will be described with reference to FIGS. 10 to 17.

Figure 10:
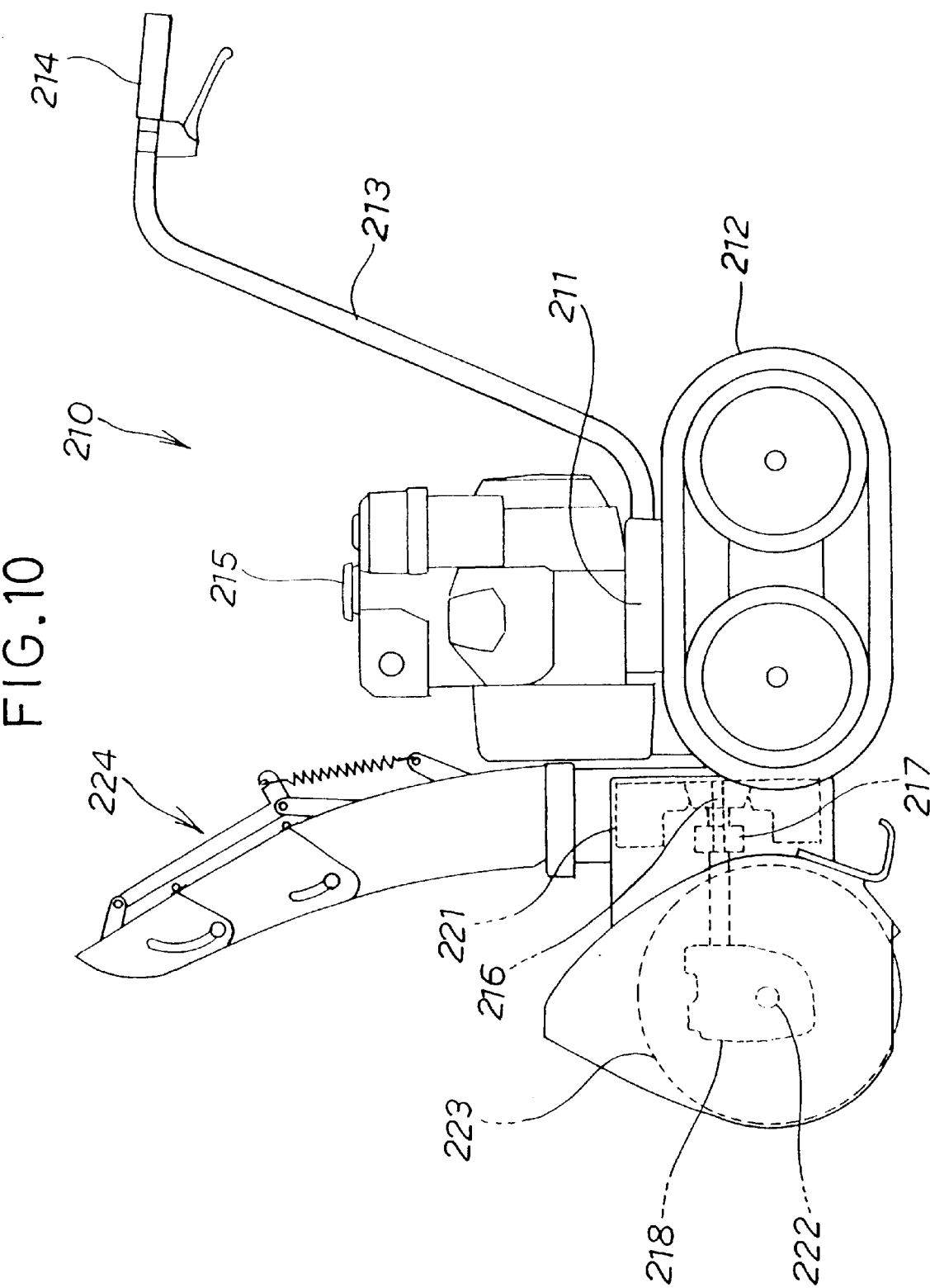
FIG. 10 is a side view of a snow-removing machine incorporating a power transmission system according to a second embodiment of the present invention.

FIG. 10 shows a snow-removing machine incorporating the second preferred embodiment of the power transmission system according to the present invention. In FIG. 10, the snow-removing machine, generally designated at 210, includes a pair of laterally spaced crawlers 212 (a right side crawler is not seen) which are rotatably supported by a body frame 211.

Handles 213 are connected to a rear portion of the frame body 211 and extend upward and rearward. Extreme upward ends of the handles 213 have grip portions 214, respectively. A prime mover such as an engine 215 is mounted on the frame body 211 to drive the pairs of crawlers 212. The engine 215 has a main drive shaft 216 that extends in a longitudinal direction toward a front portion of the frame body 211. A rear end of the main drive shaft 216 supports thereon a snow blower 221.

The main drive shaft 216 is connected to an auger transmission 218 via a rubber coupling 217 that serves as an overload protecting mechanism. An auger 223 is mounted on an auger drive shaft 222 of the auger transmission 218. The engine 215 drives the main drive shaft 216, which rotates the snow blower 221 and also rotates the auger 223 located in front of the snow blower 221, via the auger transmission 218.

The auger 223 rotates to collect snow, and collected snow is forced upward by the snow blower 221 and discharged far off via a shooter 224.

Figure 11:
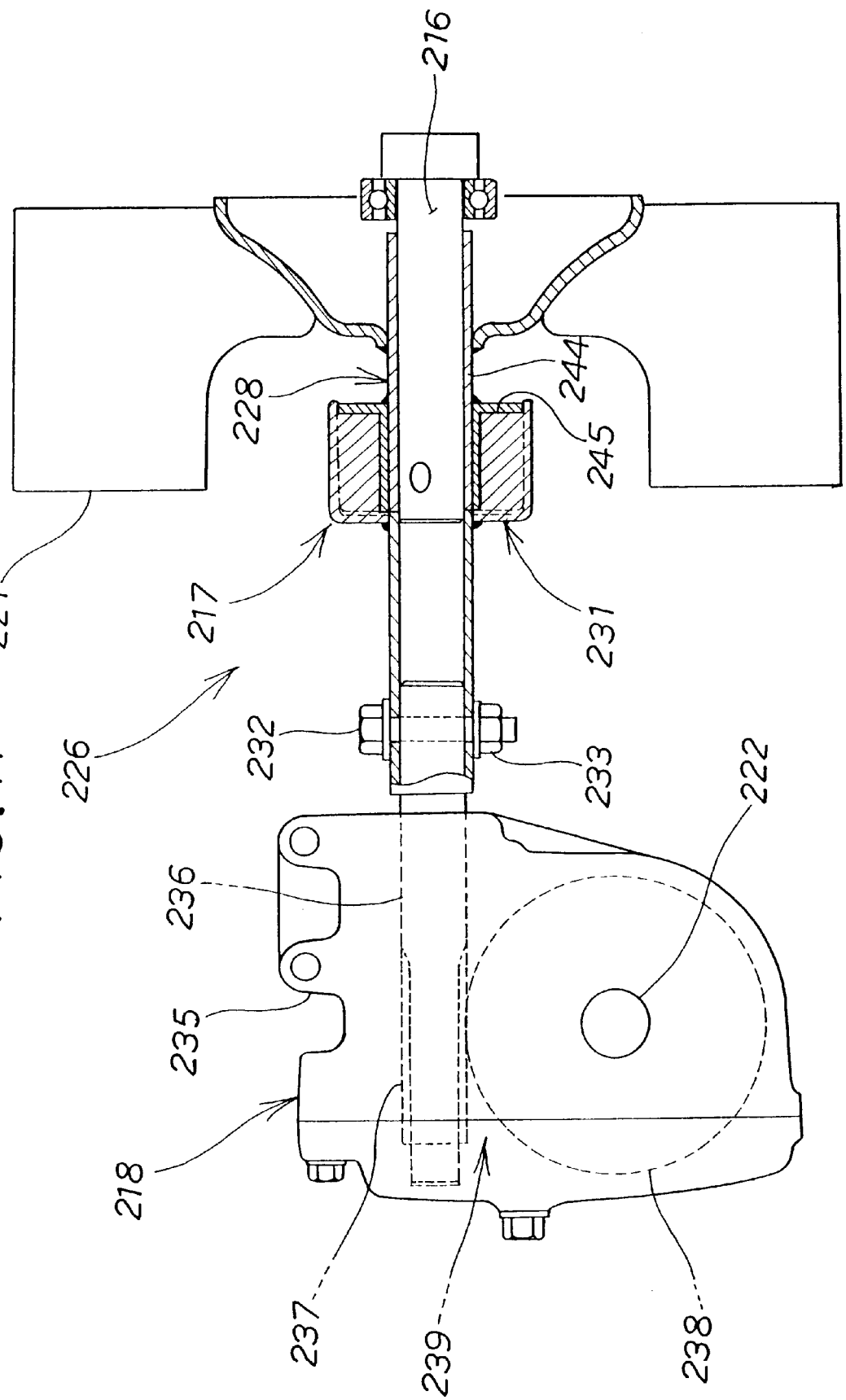
FIG. 11 is a side view of a portion of the snow-removing machine, with part of the power transmission system of FIG. 10 shown in cross section.

FIG. 11 shows the second preferred embodiment of the power transmission according to the present invention, partly in cross section. With a view to preventing the power transmission system extending from the main drive shaft 216 to the auger 223 (see FIG. 10) from being subjected to an overload, the rubber coupling 217 is mounted in a space 226 between the auger transmission 218 and the snow blower 221.

The rubber coupling 217 has an inner shaft 228 serving as an input shaft and directly carrying thereon the snow blower 221. The inner shaft 228 is coupled to the main drive shaft 216. An outer cup 231, that serves as an output shaft, of the rubber coupling 217 is interconnected with the auger transmission input shaft 236 by means of a bolt 232 and a nut 233.

The auger transmission 218 includes a transmission case 235, an auger transmission input shaft 236 rotatably supported in the transmission case 235, a worm wheel 238 meshing with a worm 237 formed on an outer periphery of the auger transmission input shaft 236, and the auger drive shaft 222 fixedly secured to the center of the worm wheel 238. The worm 237 and the worm wheel 238 constitute a worm gear 239.

Figure 12:
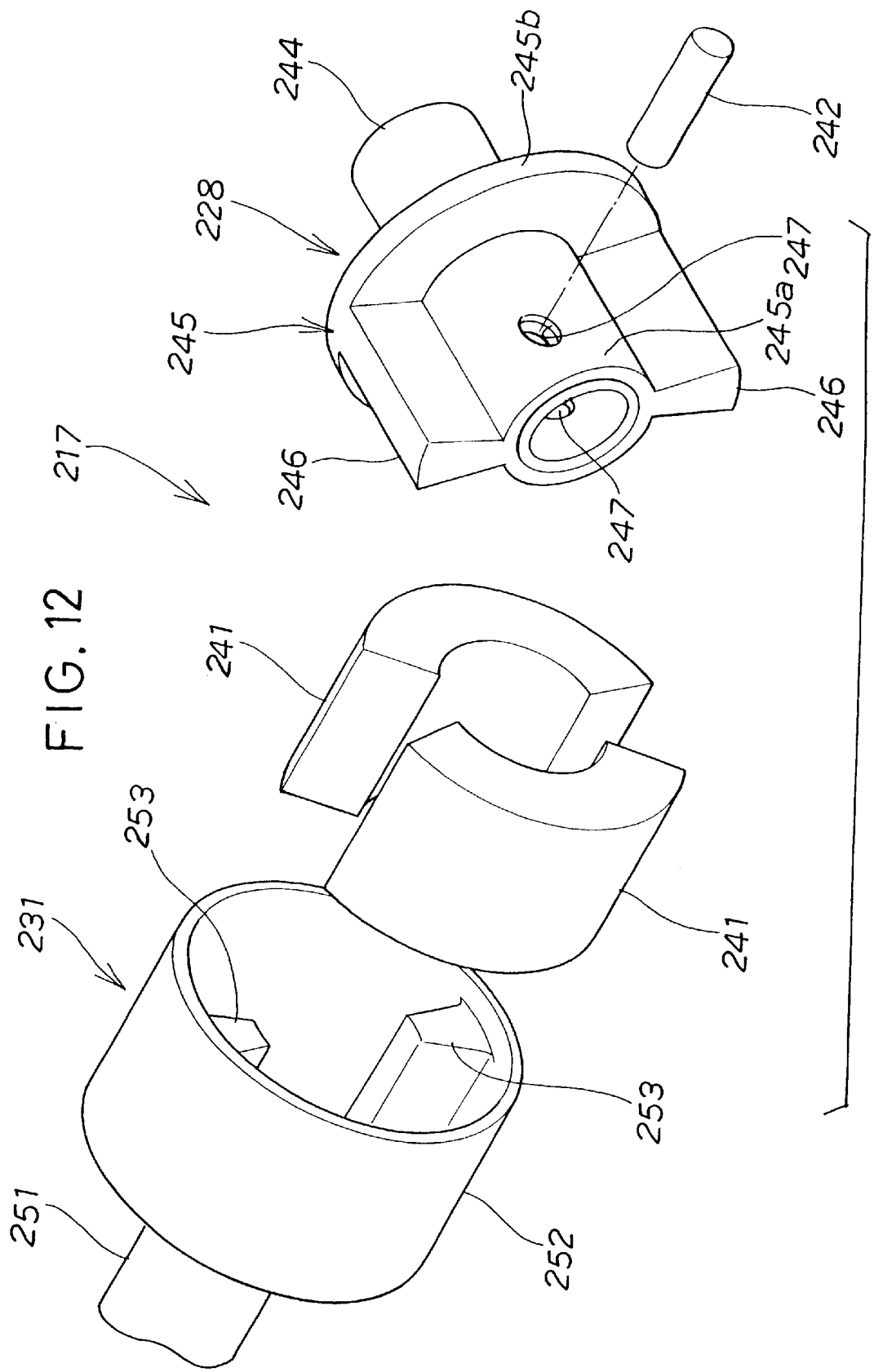
FIG. 12 is an exploded perspective view of a rubber coupling shown in FIG. 12.

FIG. 12 shows the rubber coupling 217 that forms part of the power transmission system shown in FIG. 11. The rubber coupling 217 includes the outer cup 231, the inner shaft 228 received in the outer cup 231, a pair of divided cushion rubbers 241 disposed in the outer cup 231, and a connecting pin 242 that interconnects the main drive shaft 216 shown in FIG. 11 and the inner shaft 228 with one another.

The inner shaft 228 has a hollow shaft 244 and a flange member 245 integral with the hollow shaft 244. The flange segment 245 includes a hollow shaft segment 245a for receiving the hollow shaft 244, a large size flange segment 245b formed at distal end of the hollow shaft segment 245a, and a pair of radially extending outer projections 246, 246 that axially project from the flange segment 245b. The hollow shaft 244 and the flange member 245 are coupled to one another by the connecting pin 242 inserted through pin insertion bores 247, 247 formed in the hollow shaft 244 and the flange member 245, respectively. In this event, the main drive shaft 216 (see FIG. 11) is inserted through the hollow shaft 244 and is also coupled to the hollow shaft 244 and the flange member 245.

The outer cup 231 includes a hollow shaft 251 and a cup member 252 connected to a distal end of the hollow shaft 251. The cup member 252 has a pair of inwardly, radially extending inner projections 253, 253 that project in an axial direction.

The rubber cushions 241 are made of two halves which are formed by dividing a cylindrical body along a longitudinal direction into two pieces.

Figure 13:
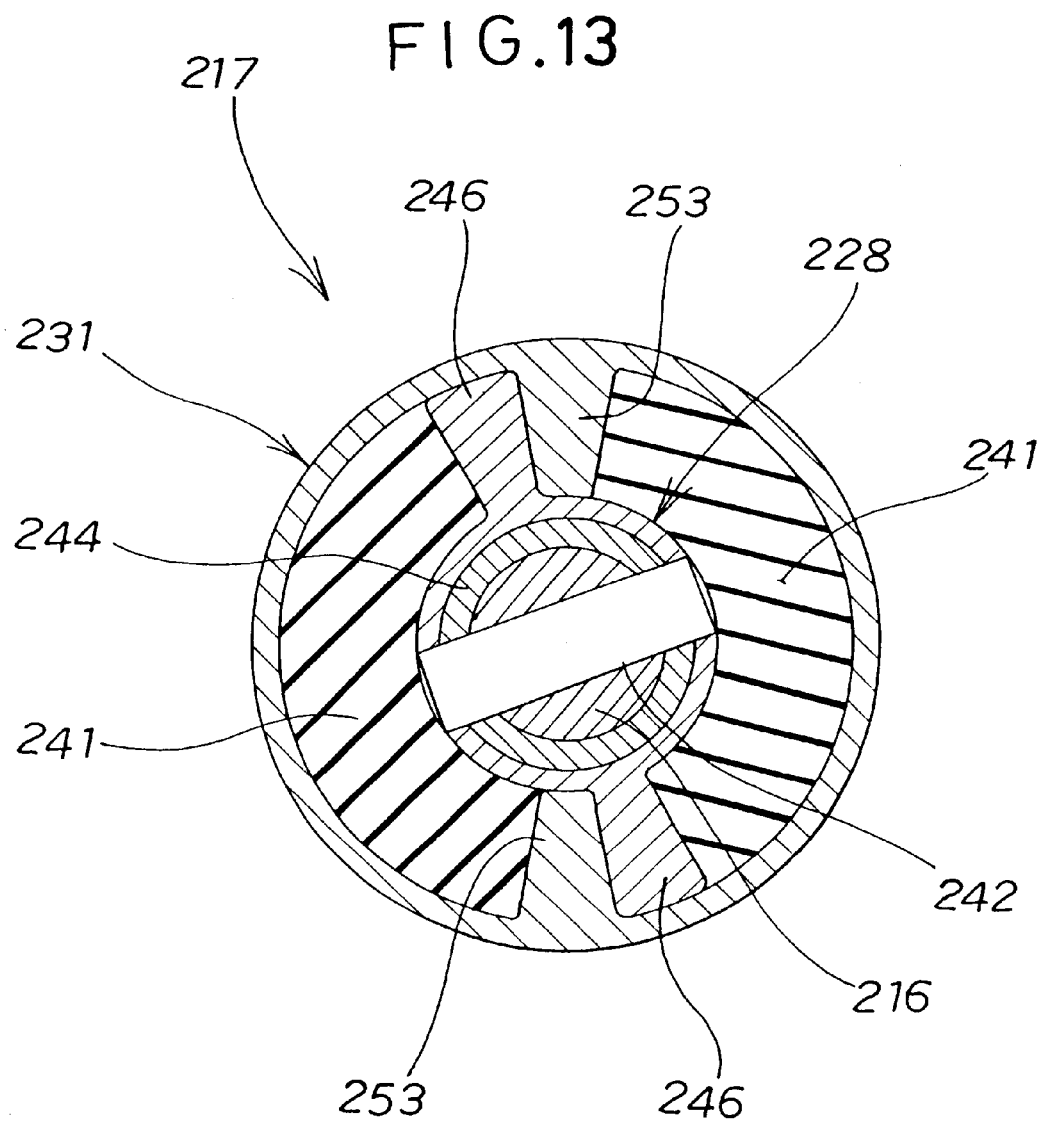
FIG. 13 is a cross sectional view of the rubber coupling shown in FIG. 12.

FIG. 13 shows in cross section the rubber coupling 217. The inner shaft 228 is inserted through the outer cup 231 such that the inner projections 253, 253 of the outer cup 231 are placed in contact with the outer projections 246, 246 of the inner shaft 228 at side surfaces, respectively. Next, the cushion rubbers 241 are inserted into respective spaces between the outer projections 246, 246 of the inner shaft 228 and the inner projections 253, 253 of the outer cup 231 in compressed state, thereby completing the rubber coupling 217. Thus, each cushion rubber 241 urges each of the inner projections 253 and each of the outer projections 246 toward each other with a given urging force (viz., with a preset load) in intimate contact with one another. That is, the cushion rubbers 241, 241 are maintained in a resiliently urged state to allow limited angular rotation to dissipate impact shocks during overload conditions.

Figure 14:
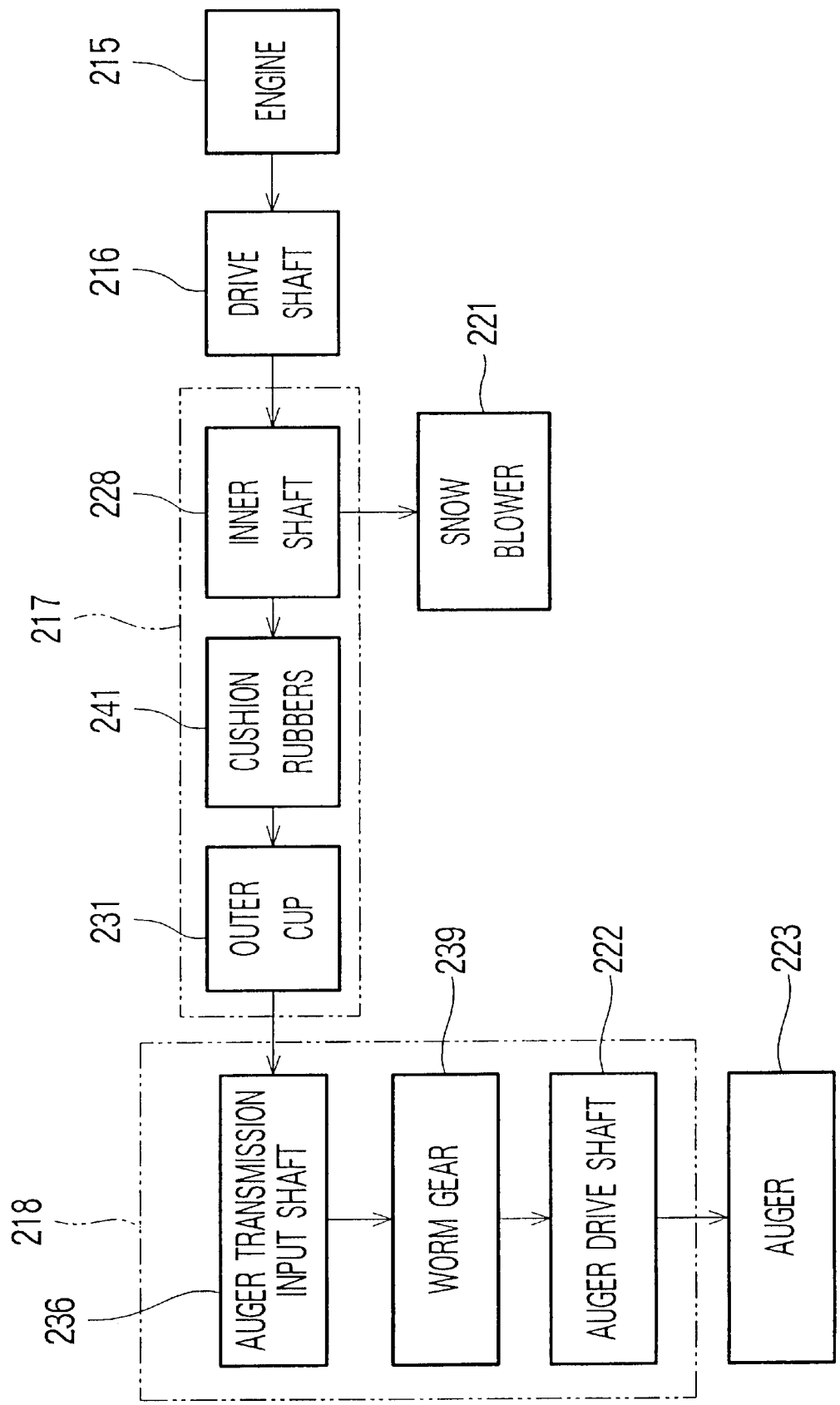
FIG. 14 is a block diagram illustrating a basic sequence of operation of the power transmission system according to the second embodiment of the present invention.

In FIG. 14, output power of the engine 215 transmitted to the main drive shaft 216 is delivered to the inner shaft 228, from which output power is diverged into the slow blower 221 and the rubber coupling 217 in which output power is transmitted from the inner shaft 228 to the outer cup 231 through the cushion rubbers 241.

In addition, output power transmitted to the outer cup 231 is delivered to the auger transmission 218, in which output power is delivered from the auger transmission input shaft 238 to the auger drive shaft 222 via the worm gear 239, with output power being transmitted to the auger 223 from the auger drive shaft 222.

That is, output power of the engine 215 is transmitted to the auger transmission 218 and the auger via the rubber coupling 217. The rubber coupling 217 functions to prevent overload from being applied to individual components such as the main drive shaft 216, the rubber coupling 217 and the auger transmission 218 of a power delivery path starting from the main drive shaft 216 to the auger 223, the auger 223 and the engine 215.

The operation of the second preferred embodiment of the power transmission system will be described below with reference to FIGS. 15A to 17.

Figure 15A:
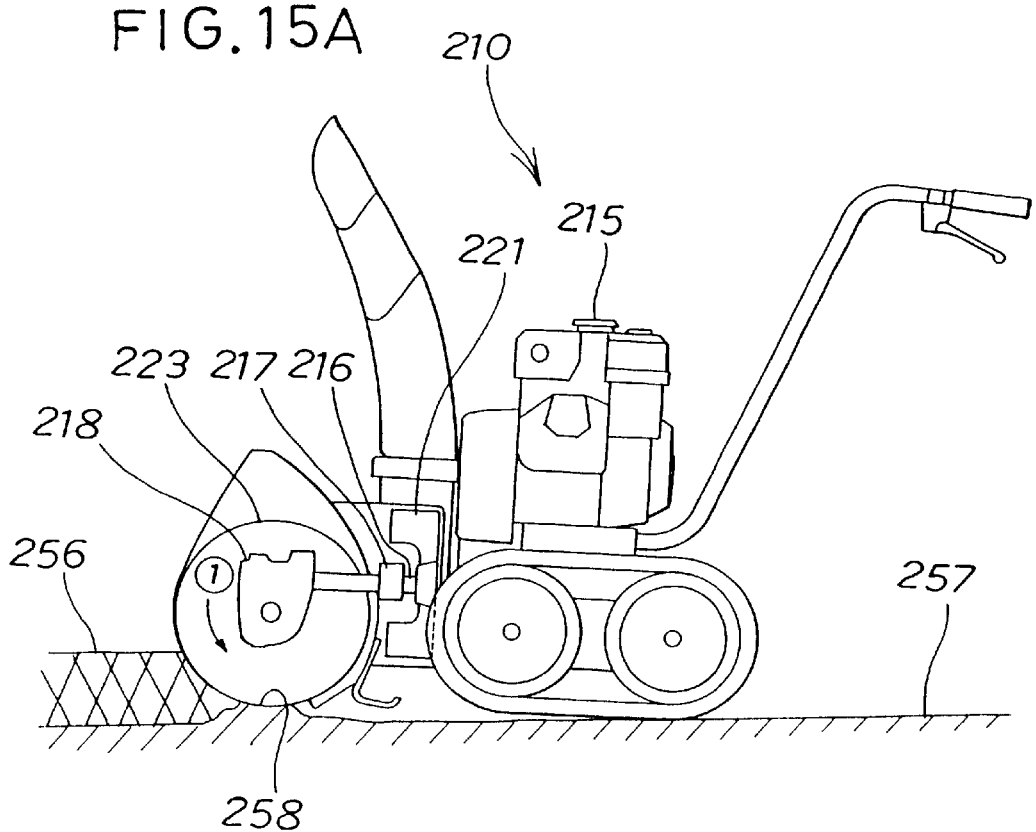

In FIG. 15A, when the auger 223 of the snow-removing machine 210 accidentally encounters or hits a projecting portion 258 of a road surface 257 during snow-removing operation (wherein snow bears a reference numeral 256), rotation of the auger 223 in a direction as indicated by an arrow ① is disturbed, and load exerted on the auger 223 and the power delivery path between the main drive shaft 216 and the auger 223 and the engine 215 rapidly increase.

Figure 15B:
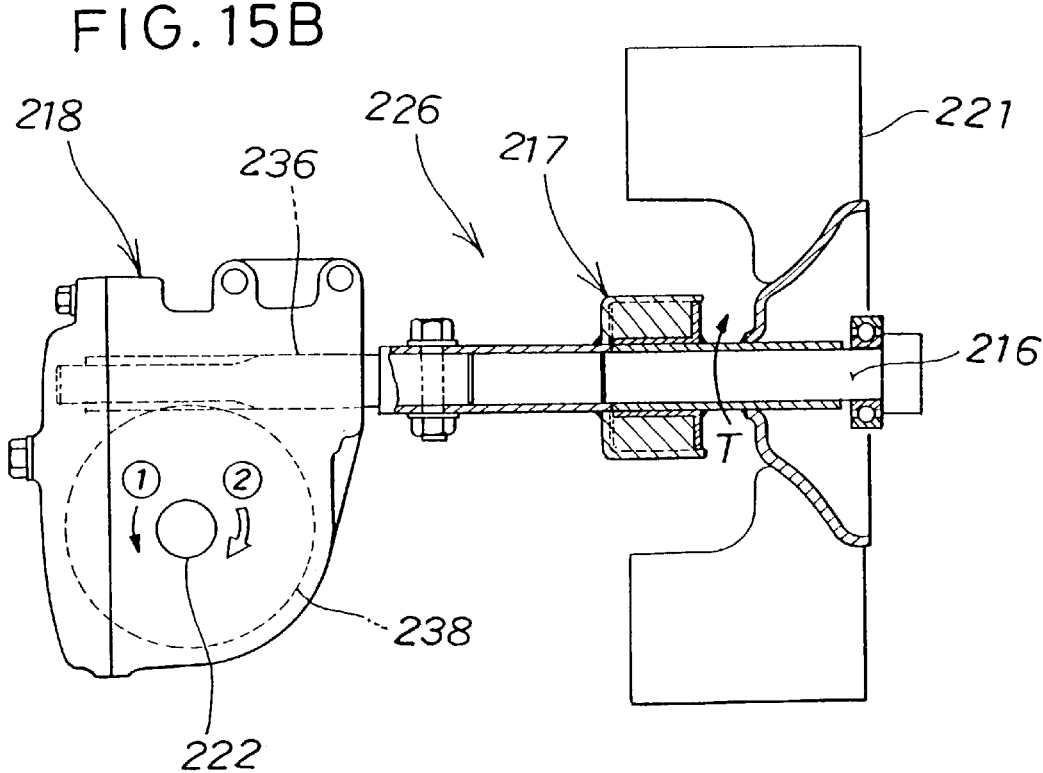

Owing to this rapid increase in load, the auger drive shaft 222 is subjected to a reacting force for rotation in a direction as indicated by an arrow ② opposite to a rotational direction as indicated by an arrow ① in FIG. 15B. Due to this reacting force and output power of the engine 215 (see FIG. 15A), a torsional momentum is produced between the auger transmission input shaft 236 and the main drive shaft 216 via the auger drive shaft 222 and the worm wheel 238.

Figure 16:
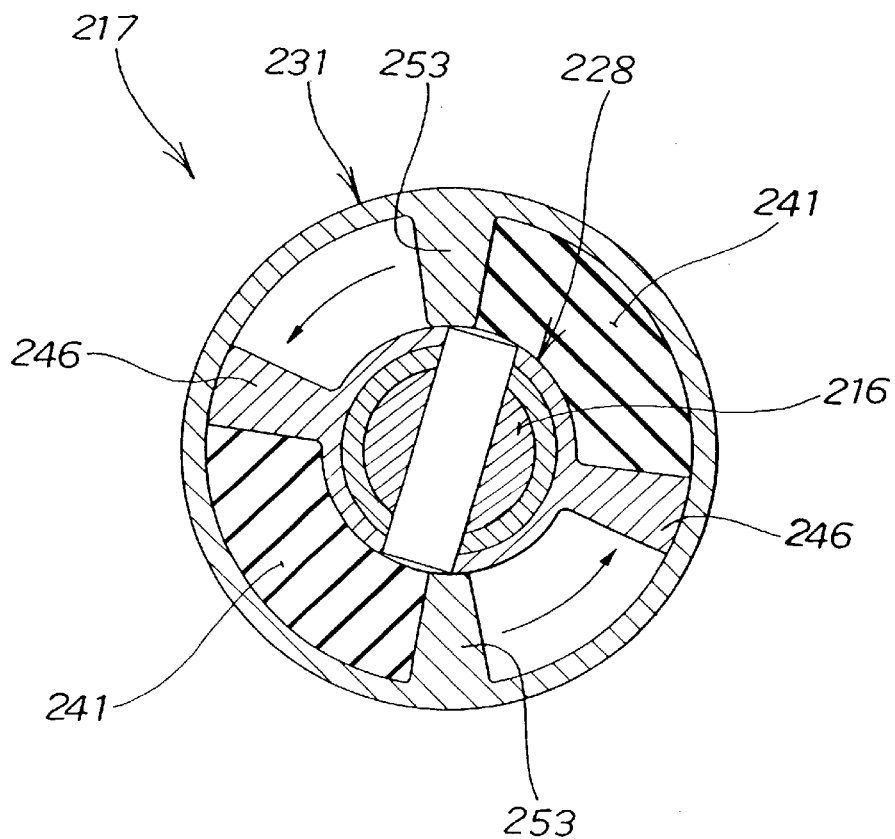
FIG. 16 is across sectional view for illustrating the operation of the rubber coupling of the power transmission system when an auger of the snow-removing machine is brought into contact with the projecting portion of the road surface.

When the torsional momentum T exceeds the torsional momentum determined by the urging force (viz., the preset load) exerted on the outer projections 217 and the inner projections 253 of the rubber coupling 217 that has been discussed above with reference to FIG. 13, the rubber coupling 17 is rotated at a limited angle such that the rubber cushions 241, 241 of the rubber coupling 217 are compressed between the inner projections 253, 253 and the outer projections 246, 246 in a manner as shown in FIG. 16.

With such a compression stroke, it is possible to absorb impact shocks or overload to be exerted on the auger 223 shown in FIG. 15A, the auger transmission 218, the auger transmission input shaft 236 and the main drive shaft 216 shown in FIG. 15B, and the engine.

Figure 17:
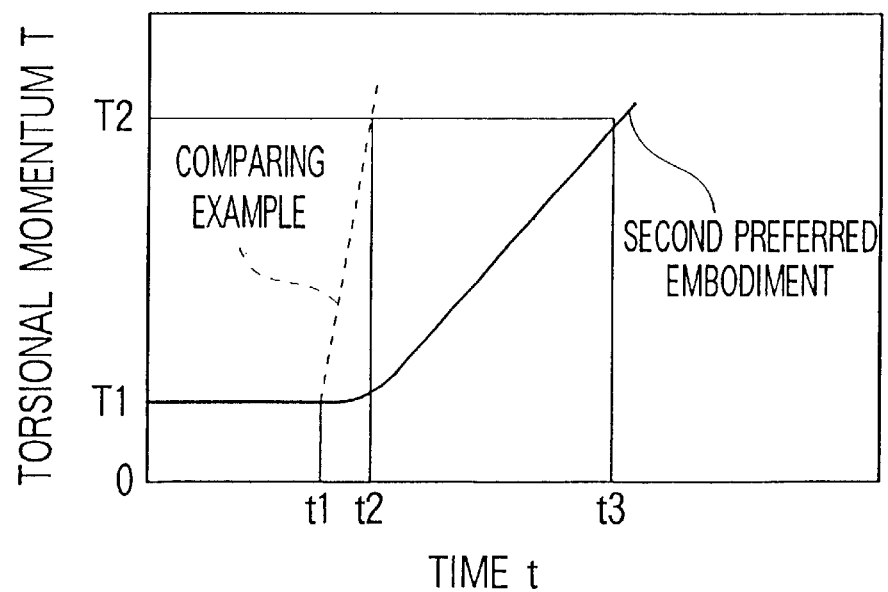
FIG. 17 is a graph illustrating the operation of the power transmission system according to the second embodiment.

The torsional momentum T varies as shown in a graph of FIG. 17. In FIG. 17, vertical axis indicates the torsional momentum T, and abscissa indicates time t.

In FIG. 17, the torsional momentum T produced between the auger transmission input shaft 236 and the main drive shaft 216, when the snow-removing machine 10 is in normal operation, is expressed as T=T1 as shown in the graph of FIG. 7 related to the first preferred embodiment.

In the second preferred embodiment, for example, when the auger 223 is brought into contact, at time instant t1 in FIG. 17, with the projecting portions 258 of the road surface 257 as shown in FIG. 15A, the torsional momentum T gradually increases from T1 along a gently inclined slope as viewed in FIG. 17. At time instant t2, the torsional momentum T reaches the given torsional momentum T2.

In a comparison case (as shown by a curve plotted by dotted line) wherein the rubber coupling 217, viz., the overload protecting mechanism is omitted in the power transmission system of the direct coupling type interconnecting the input and output shafts to one another, when the auger is brought into contact with the projections of the road surface at time instant t1, the torsional momentum T rapidly increases from T1 and reaches the level T2 within a short time period between times t1 and t2.

Thus, in the comparison case, although the torsional momentum T rapidly increases from T1 to T2 within the short time period between t1 and t2, in the second preferred embodiment, the torsional momentum T varies in a longer time period between t1 and t3. Accordingly, it is difficult to absorb the impact shocks in the comparison case, but, in the second preferred embodiment, the impact shocks can be absorbed by the rubber coupling 217 in an extended time period in an efficient manner, thereby preventing individual component parts in the power transmission path from being applied with overload.

In the second preferred embodiment, further, it is possible to avoid complex working such as replacement of the shear pin as would required in the prior art practice to prevent overload, thereby improving workability.

As shown in FIG. 15B, further, since the rubber coupling 217 is located in a large space 226 between the auger transmission 218 and the snow blower 221, the existing space 226 can be effectively utilized, resulting in the snow removing machine 210 having a small size and compact structure. Since, also, the rubber coupling 217 can be easily assembled in such a large spacing 226, providing an improved productivity of the snow-removing machine 210.

In FIG. 11, further, since the rubber coupling 217 is mounted between the auger transmission 218 and the snow blower 221, the rubber coupling 217 is efficiently cooled with snow collected by the auger 223 or air drawn by the snow blower 221, with an increased cooling efficiency for thereby preventing overheating of the rubber coupling 217. Thus, it is possible to extend the life of the rubber coupling 217, especially, the cushion rubbers 241,241.

It should noted that the cushion rubbers 241, 241 are not limited to the shape shown in FIG. 12.

A power transmission system according to a third preferred embodiment of the present invention will be described in detail with reference to FIGS. 18 to 22B.

Figure 18:
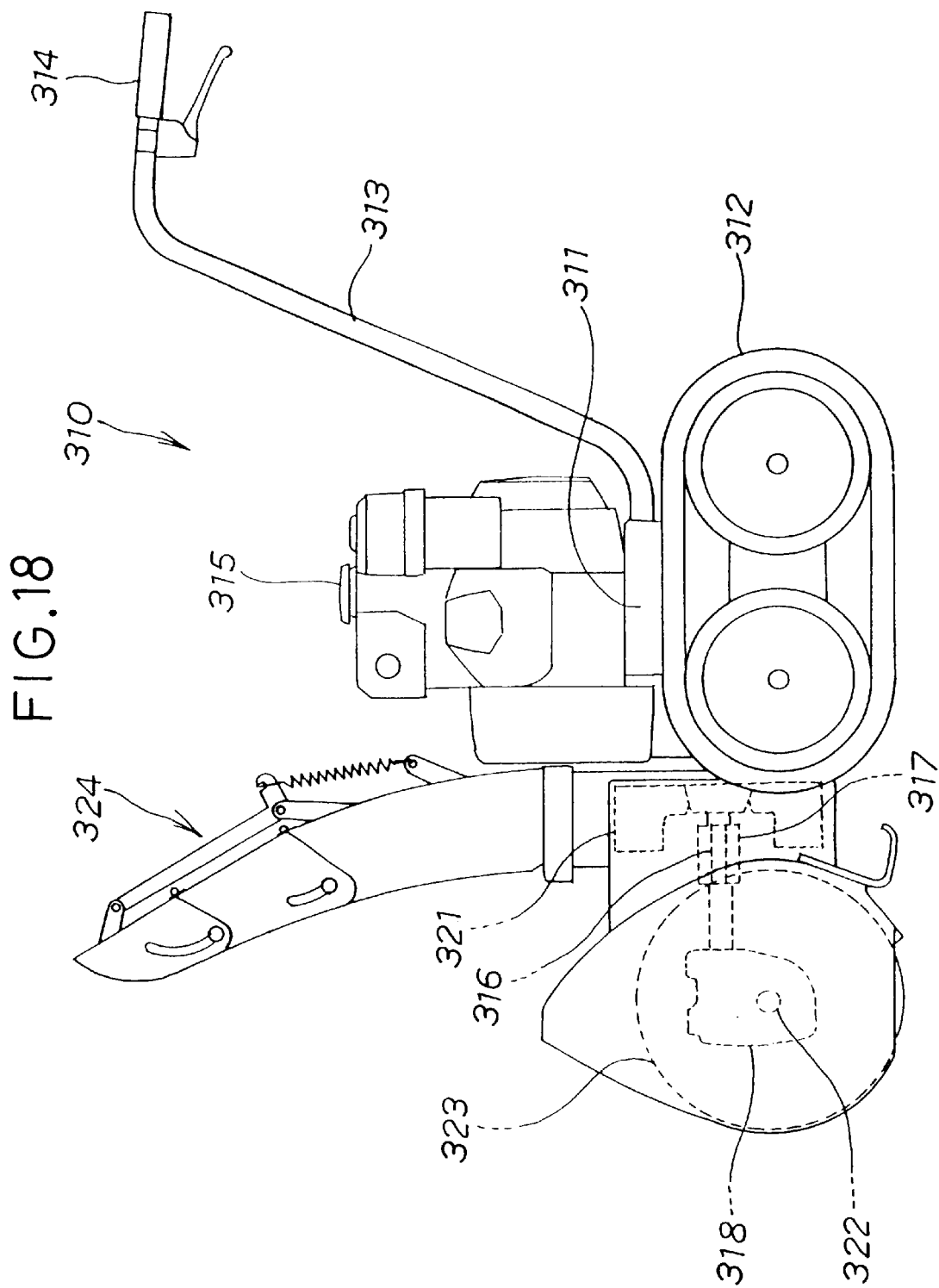
FIG. 18 is a side view of a snow-removing machine incorporating a power transmission system according to a third embodiment of the present invention.

FIG. 18 shows a snow-removing machine incorporating the third preferred embodiment of the power transmission system according to the present invention. In FIG. 18, the snow-removing machine, generally designated at 310, includes a pair of laterally spaced crawlers 312 (a right side crawler is not seen) which are rotatably supported by a body frame 311. Handles 313 are connected to a rear portion of the frame body 311 and extend upward and rearward. Extreme upward ends of the handles 313 have grip portions 314, respectively. A prime mover such as an engine 315 is mounted on the frame body 311. The engine 315 has a main drive shaft 316 that extends in a longitudinal direction toward a front portion of the frame body 311. A rear end of the main drive shaft 316 supports thereon a snow blower 321. The main drive shaft 316 is connected to an auger transmission 318 via a friction clutch coupling 317 that serves as an overload protecting mechanism. An auger 323 is mounted on an auger drive shaft 322 of the auger transmission 218. The engine 315 drives the main drive shaft 316, which rotates the snow blower 321 and also rotates the auger 323 located in front of the snow blower 321, via the auger transmission 318. The auger 323 rotates to collect snow, and collected snow is forced upward by the snow blower 321 and discharged far off via a shooter 324.

Figure 19:
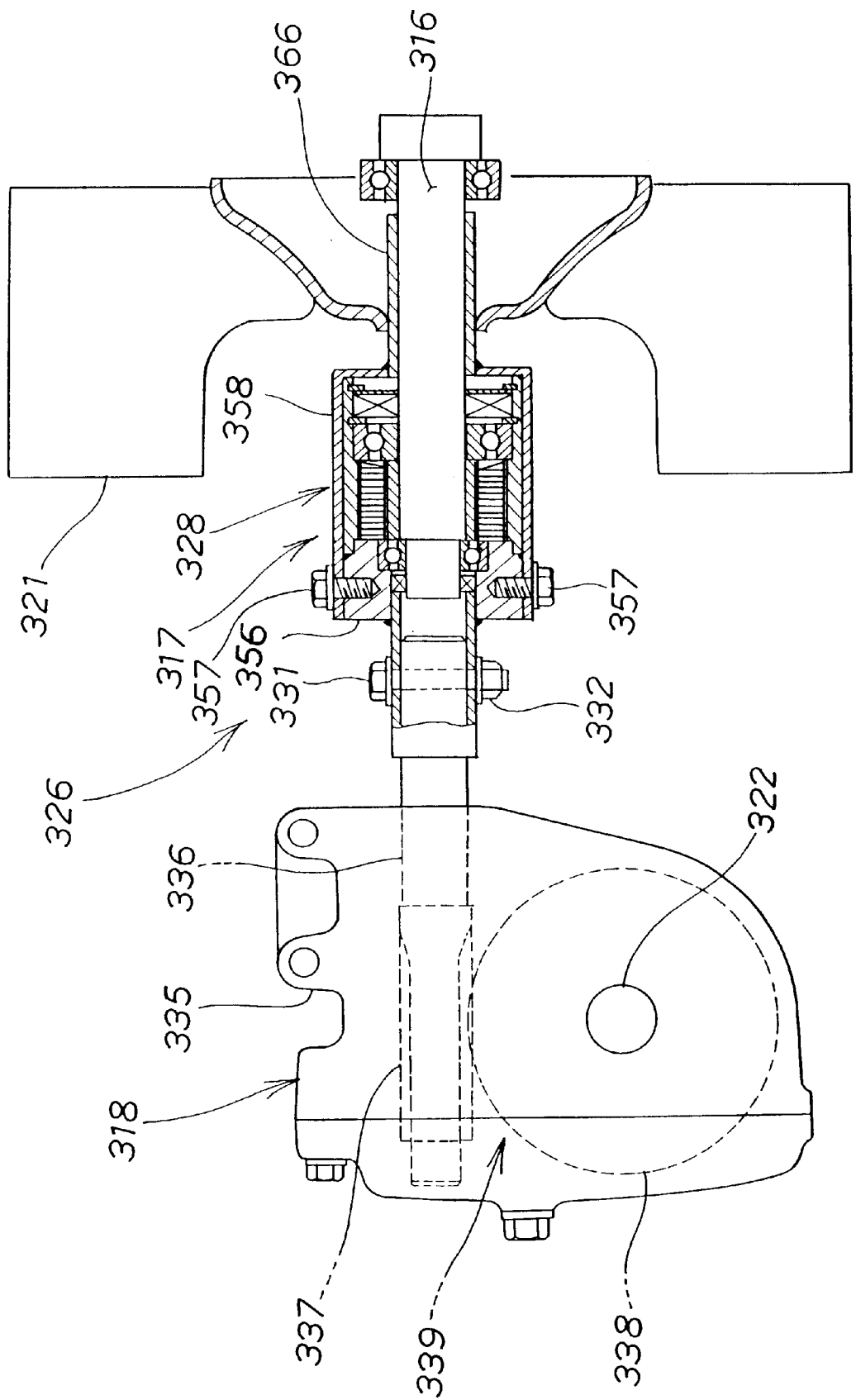
FIG. 19 is a side view of the power transmission system according to the third embodiment, partly in cross section.

FIG. 19 shows the third preferred embodiment of the power transmission according to the present invention, partly in cross section. With a view to preventing the power transmission system extending from the main drive shaft 316 to the auger 323 (see FIG. 18) from being subjected to an overload, a friction coupling 317 is mounted in a space 326 between the auger transmission 318 and the snow blower 321.

The friction coupling 317 has an inner shaft member formed by the main drive shaft 316 and an output shaft member formed by an outer cup 328, with the outer cup 328 directly carrying thereon the snow blower 321. The outer cup 328 is coupled to the auger transmission input shaft 336 by means of a bolt 331 and a nut 332.

The auger transmission 318 includes a transmission case 335, an auger transmission input shaft 336 rotatably supported in the transmission case 335, a worm wheel 338 meshing with a worm 337 formed on an outer periphery of the auger transmission input shaft 236, and the auger drive shaft 322 fixedly secured to the center of the worm wheel 338. The worm 337 and the worm wheel 338 constitute a worm gear 339.

Figure 20:
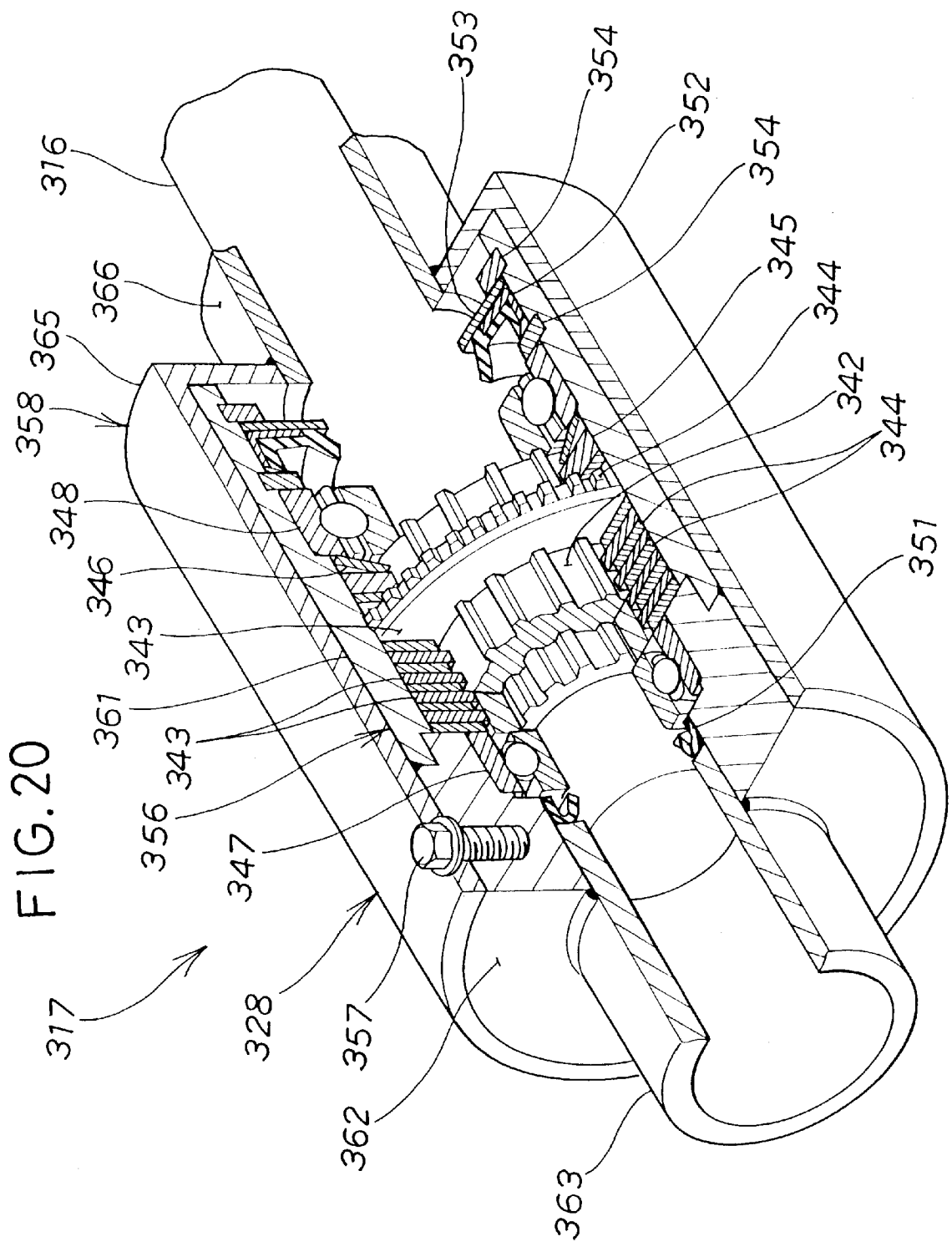
FIG. 20 is a perspective view of a friction coupling, partly in cross section, shown in 19.

FIG. 20 illustrates the friction coupling 317 shown in a perspective view and forming part of the third preferred embodiment, with certain parts being cut away for clarity. The friction coupling 317 has a collar 342 connected to a main drive shaft 316 by a spline coupling. An outer periphery of the collar 342 meshes with a plurality of inner plates 343, which serve as friction plates. A plurality of outer plates 344 are alternately interposed with the plurality of inner plates 343 and serve as friction plates. Both the outer and inner plates 341 and 343 are urged by a dish spring 346 by means of an urging plate 345. Owing to the spring force of the dish spring 346, there exists friction between the outer and inner plates 341 and 343. An auger transmission input shaft 46 extends through the outer cup 28 in an axial direction and is coupled to an inner periphery of the collar 42 by spline coupling. The main drive shaft 316 is rotatably supported in the outer cup 328 by means of bearings 347 and 348 fixed therein. Oil seals 351 and 352 provide a seal for lubricating oil in a space between the bearings 347 and 348, while preventing entry of obstacles into the inside space from outside. A disc 353 is fixed in the outer cup 328 outwardly of the oil seal 352.

The friction coupling 317 includes a wet friction coupling having the plurality of inner plates 343 and the plurality of outer plates 344.

In FIG. 20, one piece of the inner plates 343 and one piece of the outer plates 344 are shown in a state such that it is easy to understand a spline coupling condition. Also, the collar 342 is shown without cutout for the sake of easy understanding of a spline coupling condition. Reference numerals 354,354 designate stationary rings for preventing the bearing 348 and the disc 353 to dislocate from the outer cup 328.

The outer cup 328 includes a first outer cup shaft 356 to be connected to the plurality of the outer plates 344 and serving as an inner cylindrical member, and a second outer cup 358 detachably connected to the first outer cup 356 by means of a bolt 357. The first outer cup 356 includes a cylindrical segment 361, a bottom segment 362 connected to one of opening distal ends of the cylindrical segment 361, and a hollow shaft 363 mounted on the bottom segment 362 to be connected to the auger transmission input shaft 336 (see FIG. 19).

The second outer cup 358 includes a cylindrical segment 365 and a blower drive shaft 366 connected thereto.

FIG. 21 shows a basic sequence of power transmission in the power transmission system of the third preferred embodiment, wherein output power of the engine 315 is transmitted to the snow blower 321 and the auger 323.

That is, output power of the engine 315 is transmitted first to the friction coupling 317, from which output power is transmitted to the blower drive shaft 366 and the auger transmission 318.

In the friction coupling 317, output power of the engine 315 is delivered from the main drive shaft 316 through the collar 342, the inner plates 343, the outer plates 344 and the first outer cup 356 to the second outer cup 358 and is also delivered from the first outer cup 356 to the auger transmission 318, from which output power is further transmitted to the auger transmission 318, with output power delivered to the second outer cup 358 being transmitted through the blower drive shaft 366 to the snow blower 321. In the auger transmission 318, output power of the engine 315 is delivered through the auger transmission input shaft 336,the worm gear 339 to the auger drive shaft 322 from which output power is finally supplied to the auger 323.

In a power delivery path described above, output power of the engine 315 is transmitted through the friction coupling 317 to the auger transmission 318 and the snow blower 321, and is also transmitted through the auger transmission 318 to the auger 323. The friction coupling 317 prevents power delivery component parts starting from the engine 315 to the snow blower 321 and the auger 323, viz., the engine 315, the friction coupling 317, the blower drive shaft 366, the snow blower 321, the auger transmission 318 and the auger 323, from being applied to overload.

Now, operation of the power transmission system of the third preferred embodiment of present invention will be described in detail with reference to FIGS. 22A and 22B.

Figure 22A:
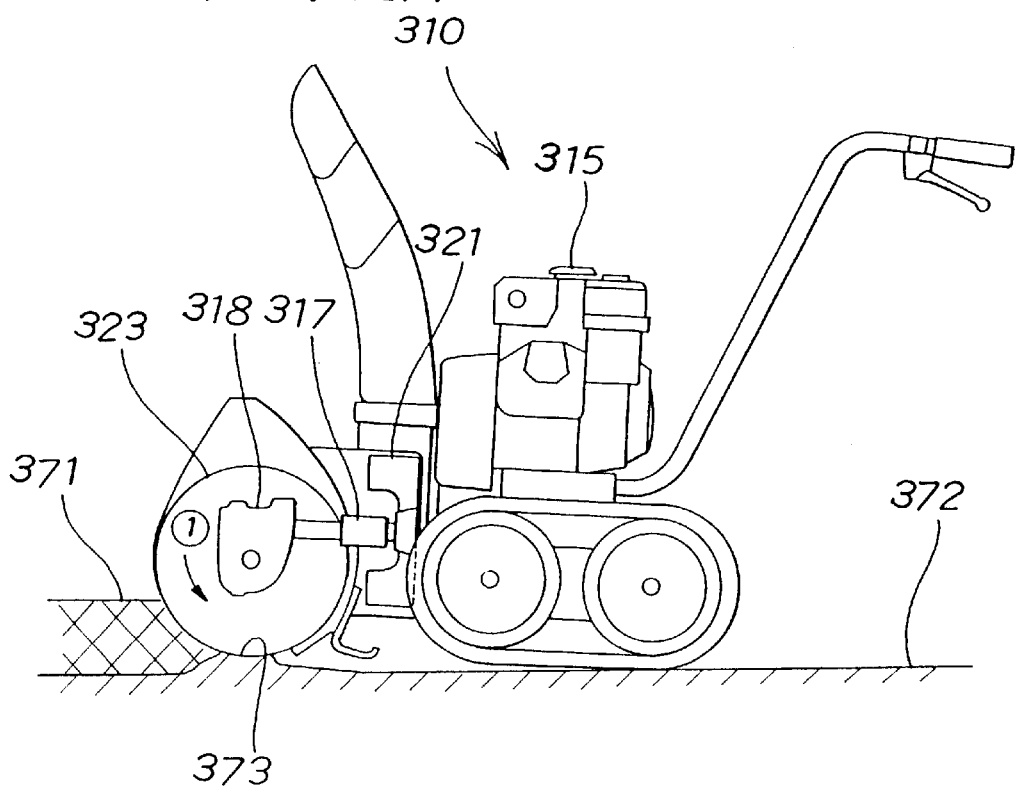

In FIG. 22A, when the auger 323 of the snow-removing machine 310 accidentally encounters or hits a projecting portion 373 of a road surface 372 during snow-removing operation (wherein snow bears a reference numeral 371), rotation of the auger 323 in a direction as indicated by an arrow ① is disturbed, and load exerted on the auger 323 and the power delivery path between the engine 315 and the auger 323 rapidly increases.

Figure 22B:
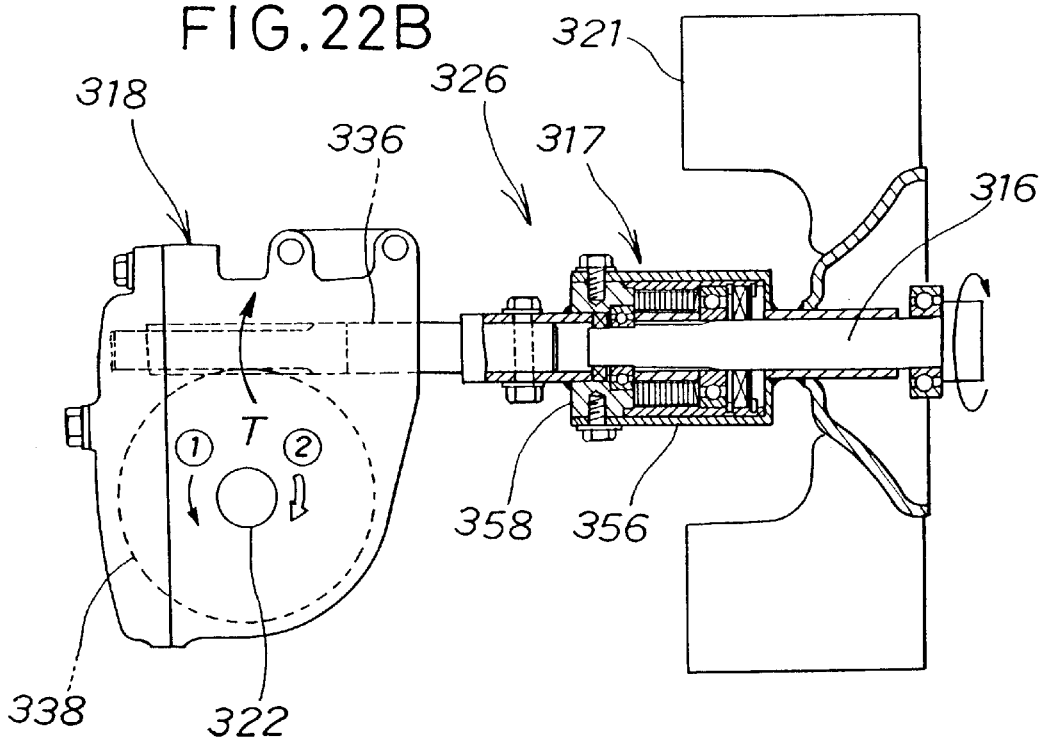

Owing to this rapid increase in load, the auger drive shaft 322 is subjected to a reacting force for rotation in a direction as indicated by an arrow ② opposite to a rotational direction as indicated by an arrow ① in FIG. 22B. Due to this reacting force, a torsional momentum is produced between the auger transmission input shaft 336 and the main drive shaft 316. The torsional momentum T varies in the same manner as shown in a graph of FIG. 7.

In conjunction with the graph of FIG. 7, a symbol T1 refers to the torsional momentum T produced in the auger transmission input shaft 336 when the snow-removing machine 310 is in normal operation.

A symbol T2 refers to a given torsional momentum, that is determined with a frictional surface coefficient of the inner plates 343 and the outer plates 344 (see FIG. 20) of the friction coupling 317, a biasing force applied to the inner plates 343 and the outer plates 344 by the dish spring 346, and a diameter of portions which are subjected to frictional forces caused by the inner plates 4343 and the outer plates 344.

For example, when the auger 323 hits, at time instant t1 in FIG. 7, the projecting portions 373 of the road surface 372 as shown in FIG. 22A, the torsional momentum T sharply increases from T1 as viewed in FIG. 7. At time instant t2, the torsional momentum T reaches the given tortional momentum T2 and, when this occurs, the inner plates 343 and the outer plates 344 (see FIG. 20) of the friction coupling 317 shown in FIG. 22B begin to slip such that the given momentum does not exceeds a value T2 as shown in FIG. 7. Thus, by presetting the torsional momentum T2 to a predetermined value below strengths of individual component parts of the power delivery path, it is possible to provide protection against damage to the individual component parts of the power delivery path.

As shown in FIG. 19, since the outer cup 328 serving as the cylindrical segment of the friction coupling 317 is connected to the snow blower 321 and the auger 323, it is possible to prevent damage when the snow blower 321, the auger 322 and the power delivery path encounter overload.

In the third preferred embodiment discussed above, further, the outer cup 328 serving as the cylindrical segment has a structure wherein the first outer cup 356 and the second outer cup 358 covering an outer periphery of the first outer cup 356 are firmly coupled to one another by the bolt 357. That is, the outer cup 328 has a divided structure having the first outer cup 356 and the second outer cup 358. For this reason, the first outer cup 356 is directly connected to the auger 323, while the second outer cup 358 can be directly coupled to the snow blower 321, providing ease of assembly of the power transmission system.

If it is tried to fabricate the outer cup 328 in a unitary fashion without dividing the outer cup 328 into the first and second outer cups 356 and 358, it is extremely difficult to fabricate the outer cup 328. This difficulty can be solved by separately fabricating the first and second outer cups 356 and 358 and assembling these components, with a resultant ease of manufacturing the outer cup 328. With such a structure, it is possible to maintain the whole outer size of the outer cup 328 in a highly accurate value.

A fourth preferred embodiment of a power transmission according to the present invention is described below with reference to FIGS. 23 to 28.

Figure 23:
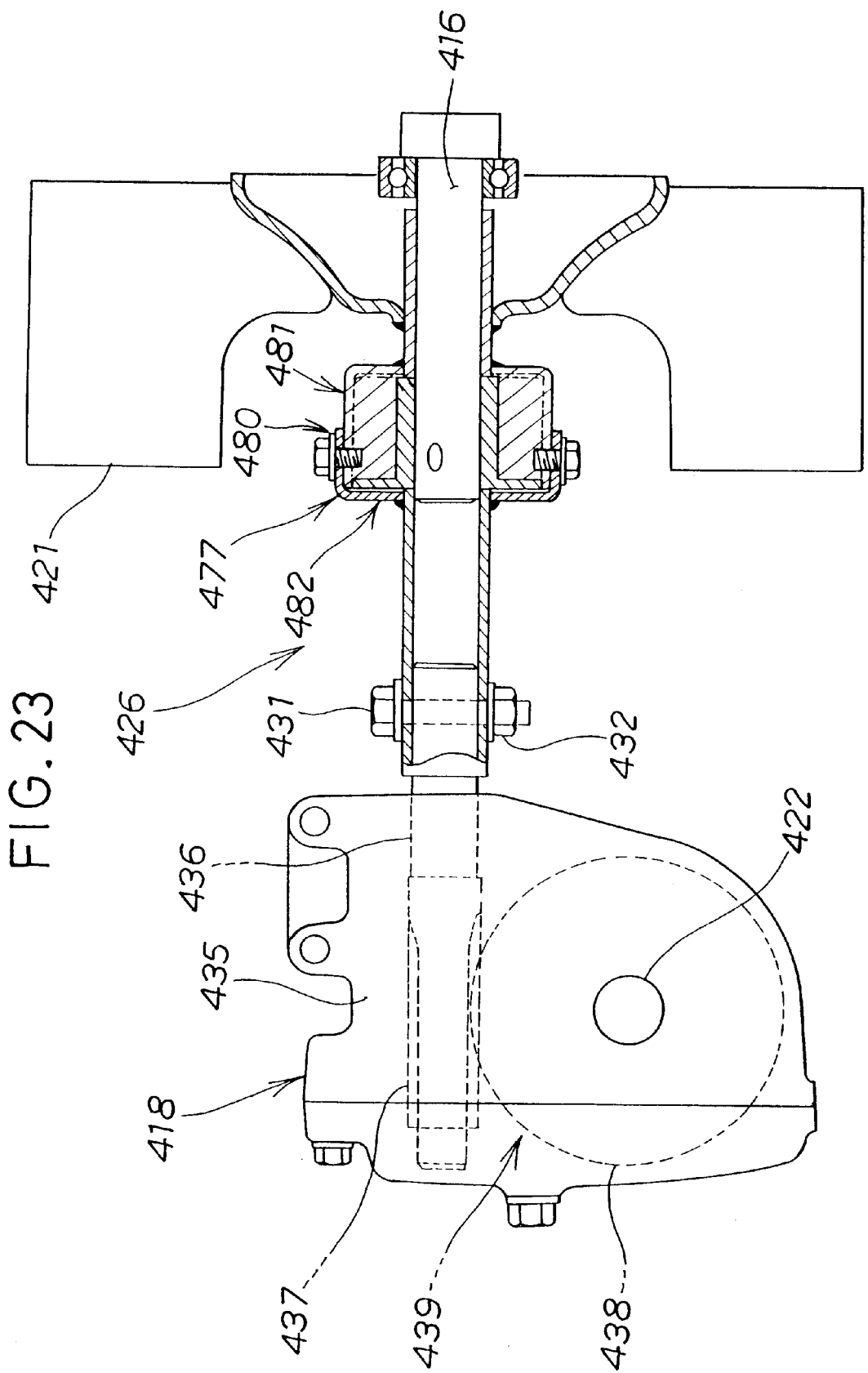
FIG. 23 is a side view of a power transmission system, partly in cross section, according to a fourth embodiment of the present invention.

As seen in FIG. 23, a rubber coupling 477 is connected in a space 426 between the an auger transmission 418 and a snow blower 421 and serves as an overload protecting mechanism that prevents a power delivery path starting from a main drive shaft 416 to the auger 423 (see FIG. 27A) from being applied with overload.

The rubber coupling 477 includes an input member composed of the main drive shaft 416, and an output member composed of an outer cup 480, to which the snow blower 421 is coupled and which is interconnected with an auger transmission input shaft6 436 by means of a bolt 431 and a nut 432.

The auger transmission 418 includes a transmission case 435, the auger transmission input shaft 436 rotatably supported in the transmission case 435 and serving as an input shaft, a worm wheel 438 meshing with a worm formed on an outer periphery of the auger transmission input shaft 436, and an auger drive shaft 422 secured to the center of the worm wheel 438. The worm 437 and the worm wheel 438 form a worm gear 439.

Figure 24:
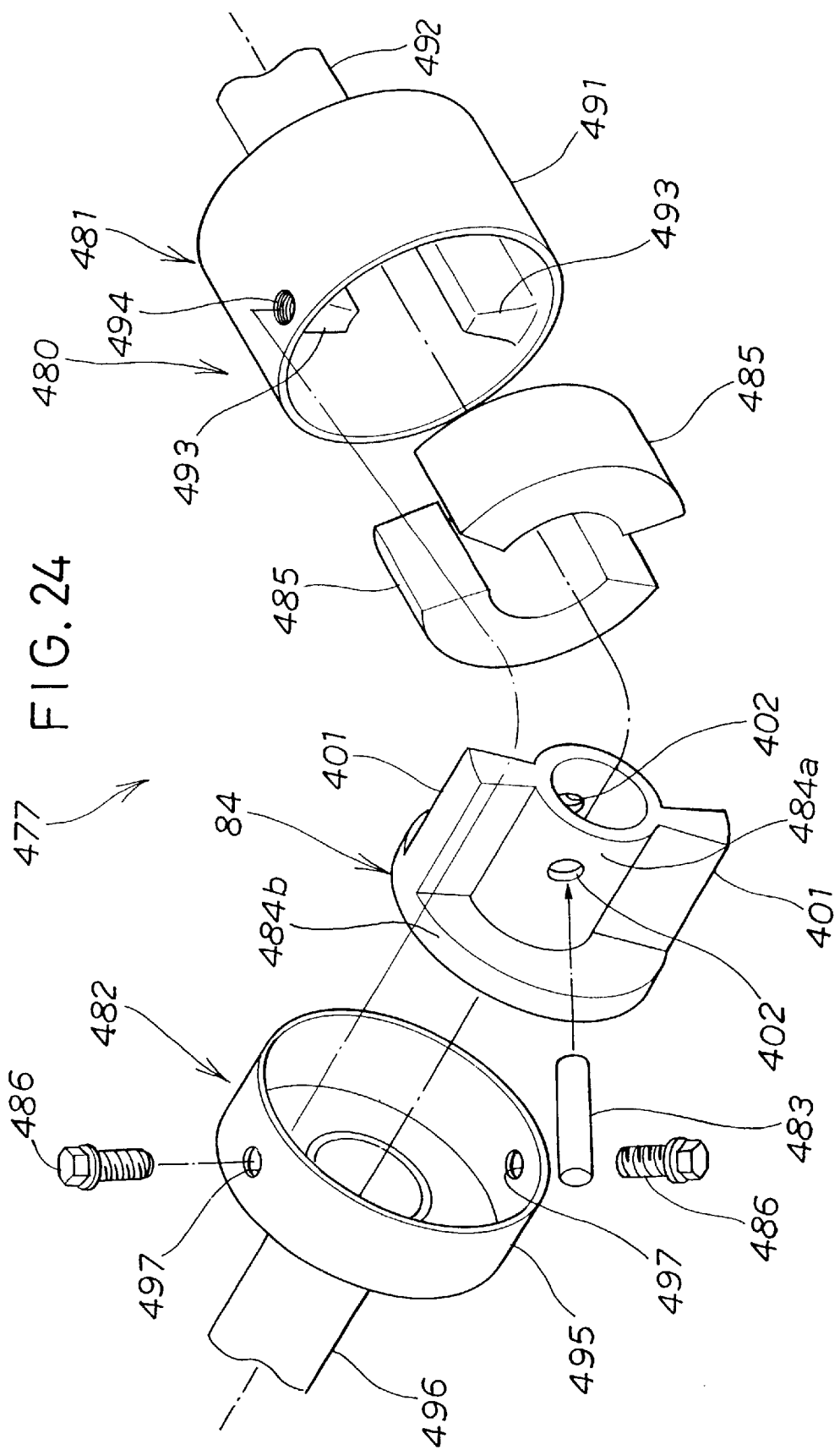
FIG. 24 is an exploded perspective view of the rubber coupling shown in FIG. 23.

FIG. 24 shows the rubber coupling 477 that forms part of the fourth preferred embodiment of the power transmission system. The rubber coupling 477 includes a first outer cup 481 serving as an inner cylinder, and a second outer cup 482 serving as an outer cylinder. The main drive shaft 416 shown in FIG. 23 and a flange member 484 are coupled to one another with a connecting pin 483.

A unitary cylindrical rubber body is divided into two halves, namely, a pair of cushion rubbers 485, 485 which is located in spaces between the first outer cup 481 and the flange member 484. The first and second outer cups 481 and 482 are coupled to one another with two bolts 486, 486.

The first outer cup 481 includes a cup segment 491, and a hollow blower drive shaft 492 connected thereto. The blower drive shaft 492 is designed to allow the main drive shaft 416 shown in FIG. 23 to be received. The cup segment 491 includes a pair of integral inner projections 493, 493 that radially extend inward in a direction opposite one another. The inner projections 493 have female threads 494, respectively, (with the other one being not shown). The female threads 494, 494 serves to receive the aforementioned bolts 486, 486.

The second outer cup 482 includes a cup segment 495, and a hollow shaft 496 connected thereto. The cup segment 495 has a pair of bolt insertion bores 497, 497 to allow insertion of the aforementioned bolts 486, 486. The pair of bolt insertion bores 497, 497 are located in positions that are aligned with the female threads 494, 494 of the cup segment 491 of the first outer cup 481.

The flange member 484 includes a cylindrical segment 484a, and a flange segment 484b formed at one of distal ends of the cylindrical segment 484a at a side closer to the second outer cup 482. The cylindrical segment 484a has a pair of outer projections 401, 401 that project radially outward in opposite direction. The cylindrical segment 484a has a pair of pin insertion bores 402, 402 to allow the connecting pin 483 to be inserted therein for connecting the main drive shaft 416 shown in FIG. 23.

Figure 25:
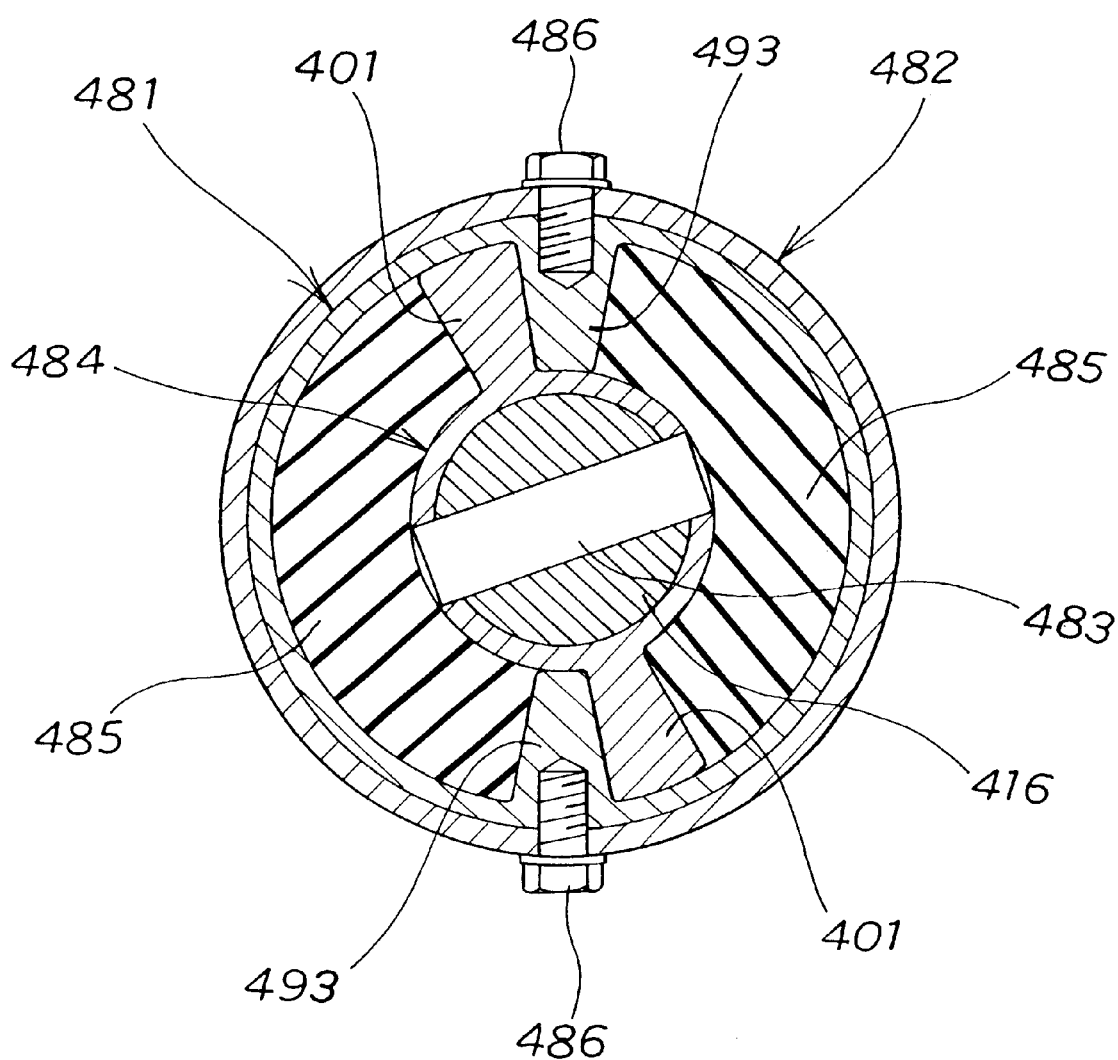
FIG. 25 is a cross sectional view of the rubber coupling shown in FIG. 24.

As shown in FIG. 25, the first and second outer cups 481 and 482 are coupled to one another with the bolts 486, 486. The cushion rubbers 485, 485 are located between the first outer cup 481 and the flange segment 484 in the same manner as discussed above with reference to the second preferred embodiment shown in FIG. 13. Accordingly, each cushion rubber 485 functions to urge the inner projection 493 and the outer projection 401 toward each other with a given compression force (i.e., with a preset load).

Figure 26:
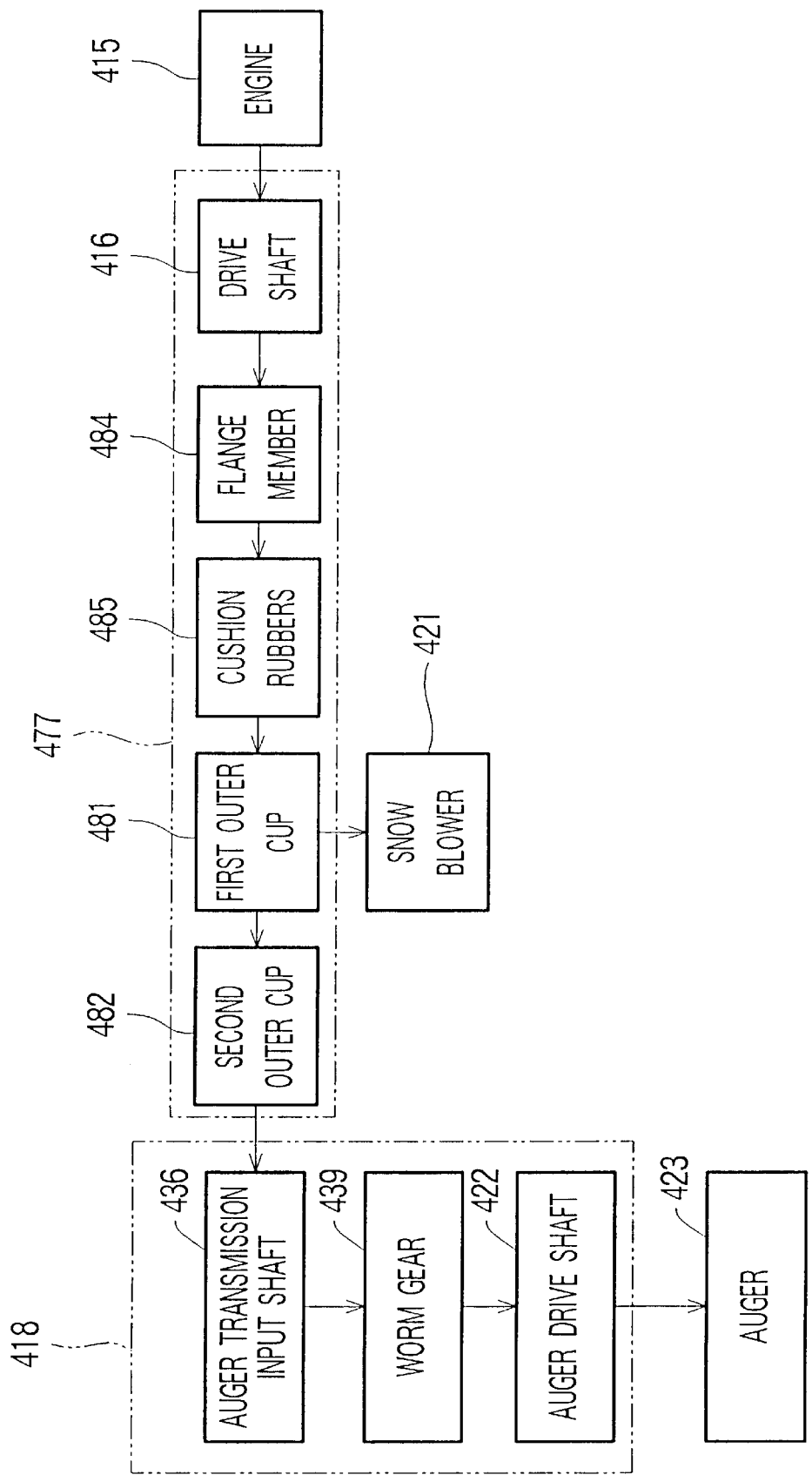
FIG. 26 is a block diagram illustrating a basic sequence of operation of the power transmission system according to the fourth embodiment of the present invention.

FIG. 26 shows a basic sequence of power transmission in the power transmission system of the fourth preferred embodiment. Output power of the engine 415 is transmitted first to the rubber coupling 417, from which output power is transmitted to the snow blower 421.

In the rubber coupling 477, output power of the engine 415 is delivered through the main drive shaft 416, the flange member 484, the cushion rubbers 485 and the first outer cup 481 to the second outer cup 482. Output power delivered to the first outer cup 481 is then applied to the snow blower 421.

Further, output power of the engine 415 delivered to the second outer cup 482 is then delivered to the auger transmission 418. In the auger transmission 418, output power is delivered through the auger transmission input shaft 436, the worm gear 439 to the auger drive shaft 422 from which output power is finally supplied to the auger 423.

Now, operation of the power transmission system of the fourth preferred embodiment of present invention will be described in detail with reference to FIGS. 27A to 28.

Figure 27A:
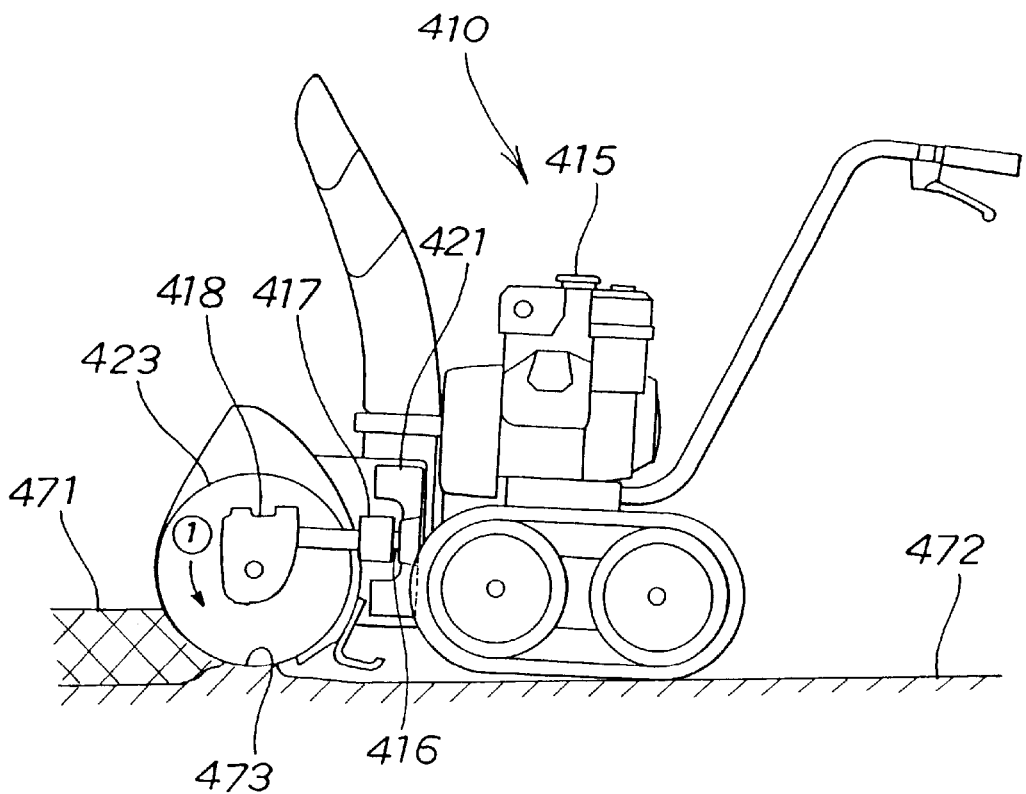
Figure 28:
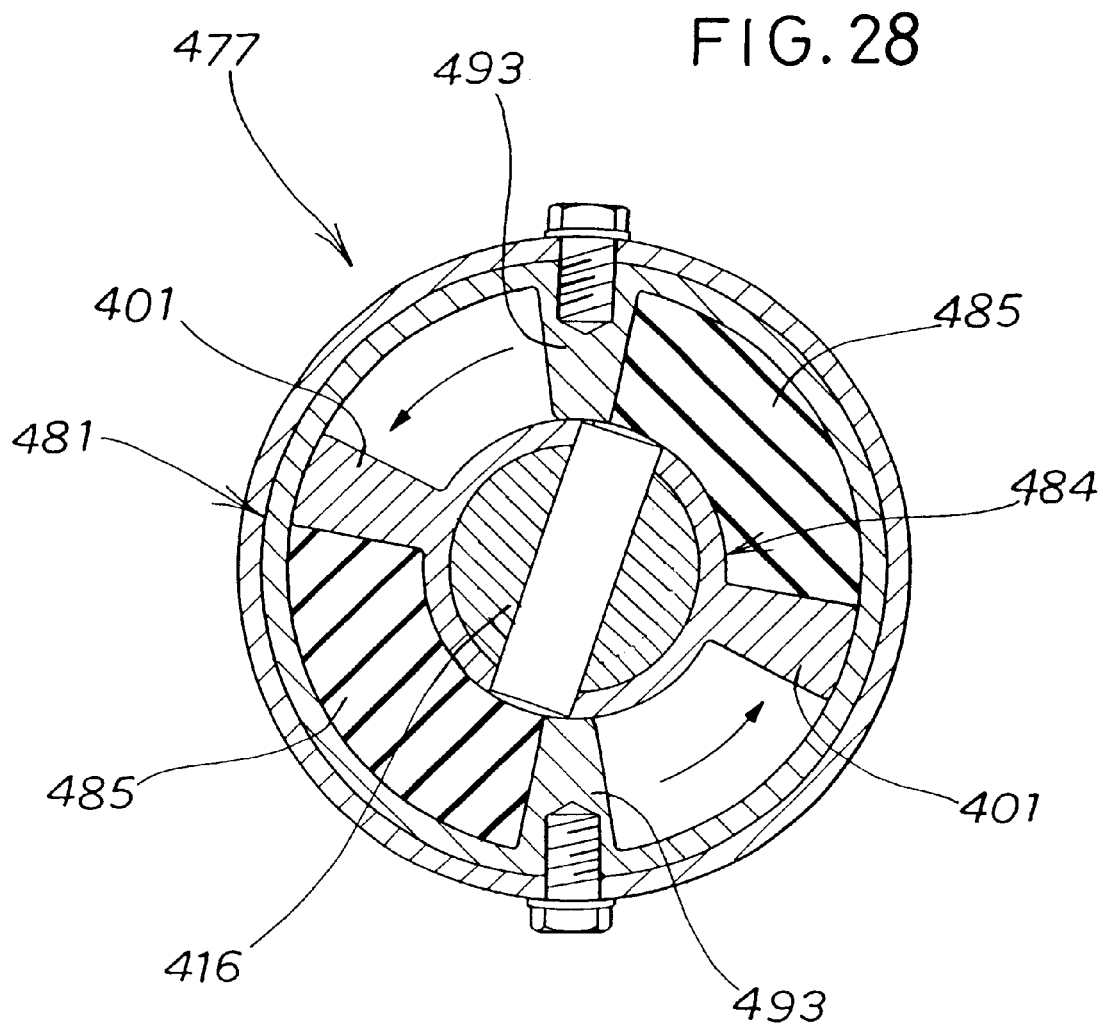
FIG. 28 is a cross sectional view illustrating the operation of the rubber coupling of the power transmission system when an auger of the snow-removing machine is brought into contact with the projecting portion of the road surface.

In FIG. 27A, when the auger 423 of the slow removing machine 410 is brought into contact with a projecting portion 473 of a road surface 472 during snow removing operation (wherein snow bears a reference numeral 471), rotation of the auger 423 in a direction as indicated by an arrow ① is disturbed, and load acting on the auger 423 and the power delivery path between the engine 415 and the auger 423 rapidly increases.

Figure 27B:
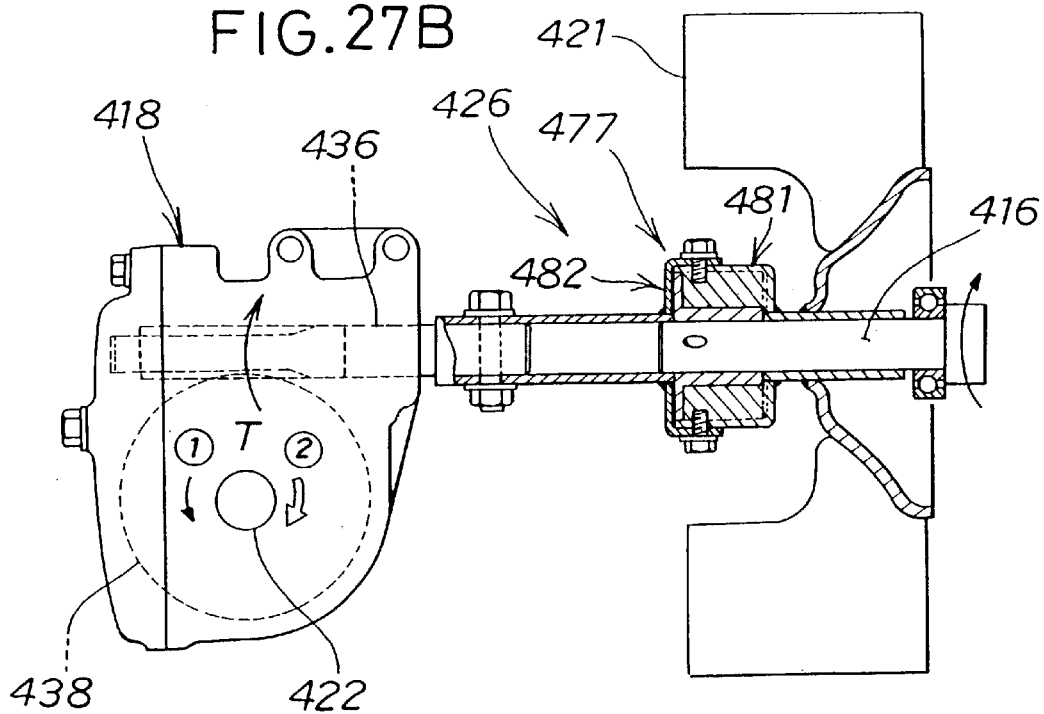

Owing to this rapid increase in load, the auger drive shaft 322 is subjected to a reacting force for rotation in a direction as indicated by an arrow ② opposite to a rotational direction as indicated by an arrow ① in FIG. 27B. Due to this reacting force and output power of the engine 415 (see FIG. 27A), a torsional momentum T is produced between the auger transmission input shaft 436 and the main drive shaft 416.

When the torsional momentum T exceeds a given torsional momentum obtained from the urging force (a preset load) acting on the inner projections 493 and the outer projections 401 which have been discussed above with reference to FIG. 25, the rubber coupling 477 is twisted, and the cushion rubbers 485, 485 of the rubber coupling 477 are compressed between the inner projections 493 of the first outer cup 481 and the outer projection 401 of the flange member 484.

Due to this compression, the rubber cushions can absorb impact shock, that is, the overload to be applied to the auger 423, the power delivery path between the auger transmission and the main drive shaft 416 via the auger transmission input shaft 436, and the engine 415.

When the torsional momentum T exceeds the torsional momentum determined by the urging force (viz., the preset load) applied to the outer projections 217 and the inner projections 253 of the rubber coupling 217 that has been discussed above with reference to FIG. 13, the rubber coupling 17 is twisted such that the rubber cushions 241, 241 of the rubber coupling 217 are compressed between the inner projections 253, 253 and the outer projections 246, 246 in a manner as shown in FIG. 16.

With such a compression stroke, it is possible to absorb impact shocks or overload to be applied to the auger 223 shown in FIG. 15A, the auger transmission 218, the auger transmission input shaft 236 and the main drive shaft 216 shown in FIG. 15B, and the engine.

There is the same relationship between the torsional momentum T and the time t as that shown in a graph of FIG. 17 that is plotted in conjunction with the second preferred embodiment.

As shown in FIG. 17, the torsional momentum T produced between the auger transmission input shaft 436 and the main drive shaft 416 during normal snow-removing operation is expressed as T=T1.

Taking FIG. 17 into account in conjunction with the fourth preferred embodiment, for example, when the auger 423 is brought into contact, at time instant t1 in FIG. 17, with the projecting portions 473 of the road surface 472 as shown in FIG. 27A, the torsional momentum T gradually increases from T1. At time instant t3, the torsional momentum T reaches the given torsional momentum T2.

In a comparison case wherein the rubber coupling 477, viz., the overload protecting mechanism is omitted in the power transmission system of the direct coupling type in which the input and output shafts are directly connected to one another, when the auger is brought into contact with the projections of the road surface at time instant t1, the torsional momentum T rapidly increases from T1 and reaches the level T2 within a short time period between times t1 and t2.

Thus, in the comparison case, although the torsional momentum T rapidly increases from T1 to T2 within the short time period between t1 and t2, in the fourth preferred embodiment, the torsional momentum T varies in a longer time period between t1 and t3. Accordingly, it is difficult to absorb the impact shocks in the comparison case, but, in the fourth preferred embodiment, the impact shocks can be absorbed by the rubber coupling 477 in an extended time period in an efficient manner, thereby preventing individual component parts, such as the rubber coupling 477, the snow blower 421 and the auger transmission forming part of the power delivery path, the auger 423 and the engine 415 from being applied with overload.

A fifth preferred embodiment of a power transmission system according to the present invention is described below with reference to FIGS. 29 to 32B.

Figure 29:
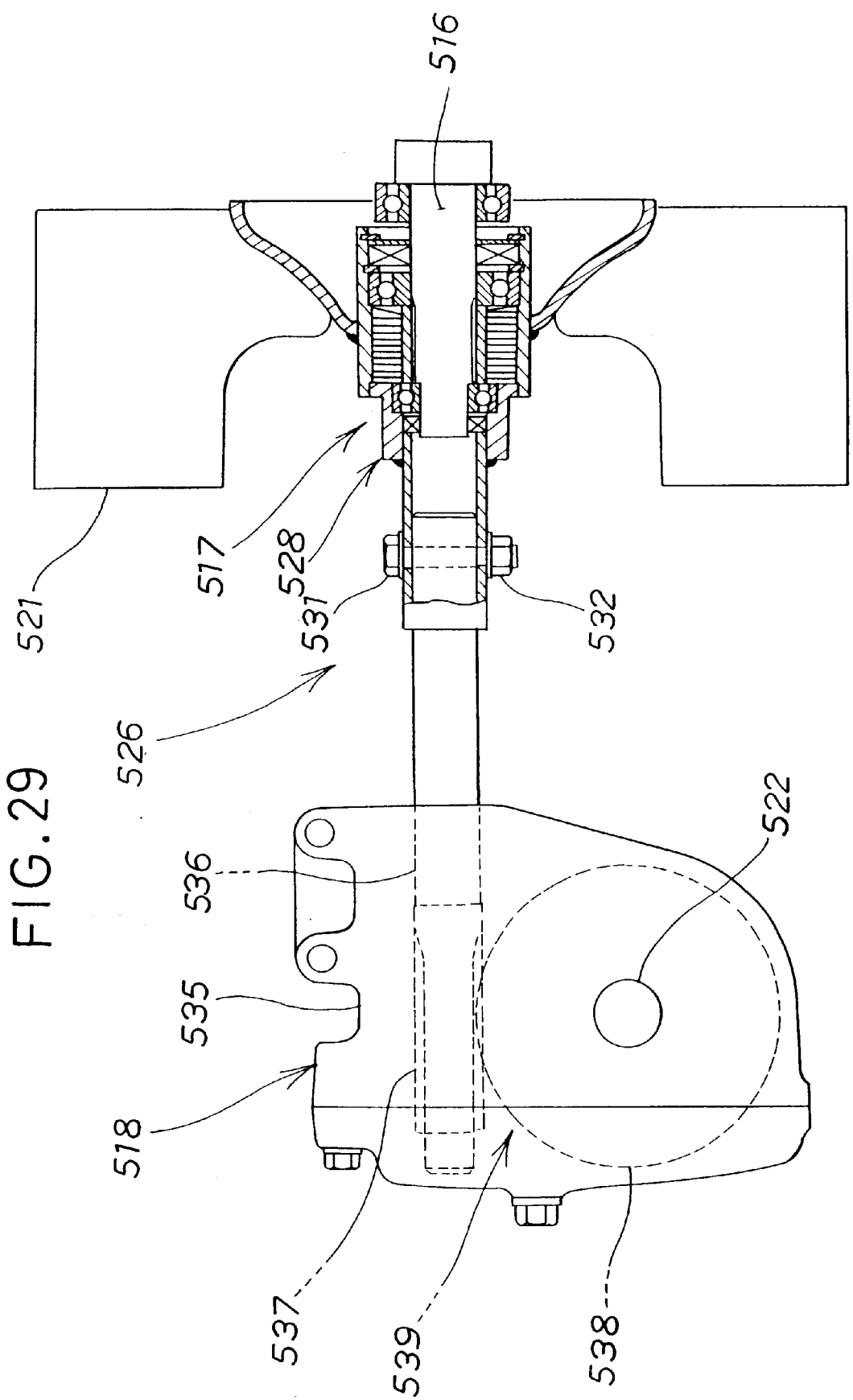
FIG. 29 is a side view of a power transmission system, partly in cross section, according to a fifth embodiment of the present invention.

In FIG. 29, a friction coupling 517 is mounted in a space 526 between an auger transmission 518 and a snow blower 521 and functions as an overload protecting mechanism for preventing power delivery path between the main drive shaft 516 and the auger (see FIG. 32A) from being applied with overload.

The friction coupling 517 has an inner member formed by the main drive shaft 516 and an output member formed by an outer cup 528, with the outer cup 528 directly carrying thereon the snow blower 521. The outer cup 528 is coupled to the auger transmission input shaft 536 by means of a bolt 531 and a nut 532.

The auger transmission 518 includes a transmission case 535, an auger transmission input shaft 536 rotatably supported in the transmission case 535, a worm wheel 538 meshing with a worm 537 formed on an outer periphery of the auger transmission input shaft 536, and the auger drive shaft 522 fixedly secured to the center of the worm wheel 538. The worm 537 and the worm wheel 538 constitute a worm gear 539.

Figure 30:
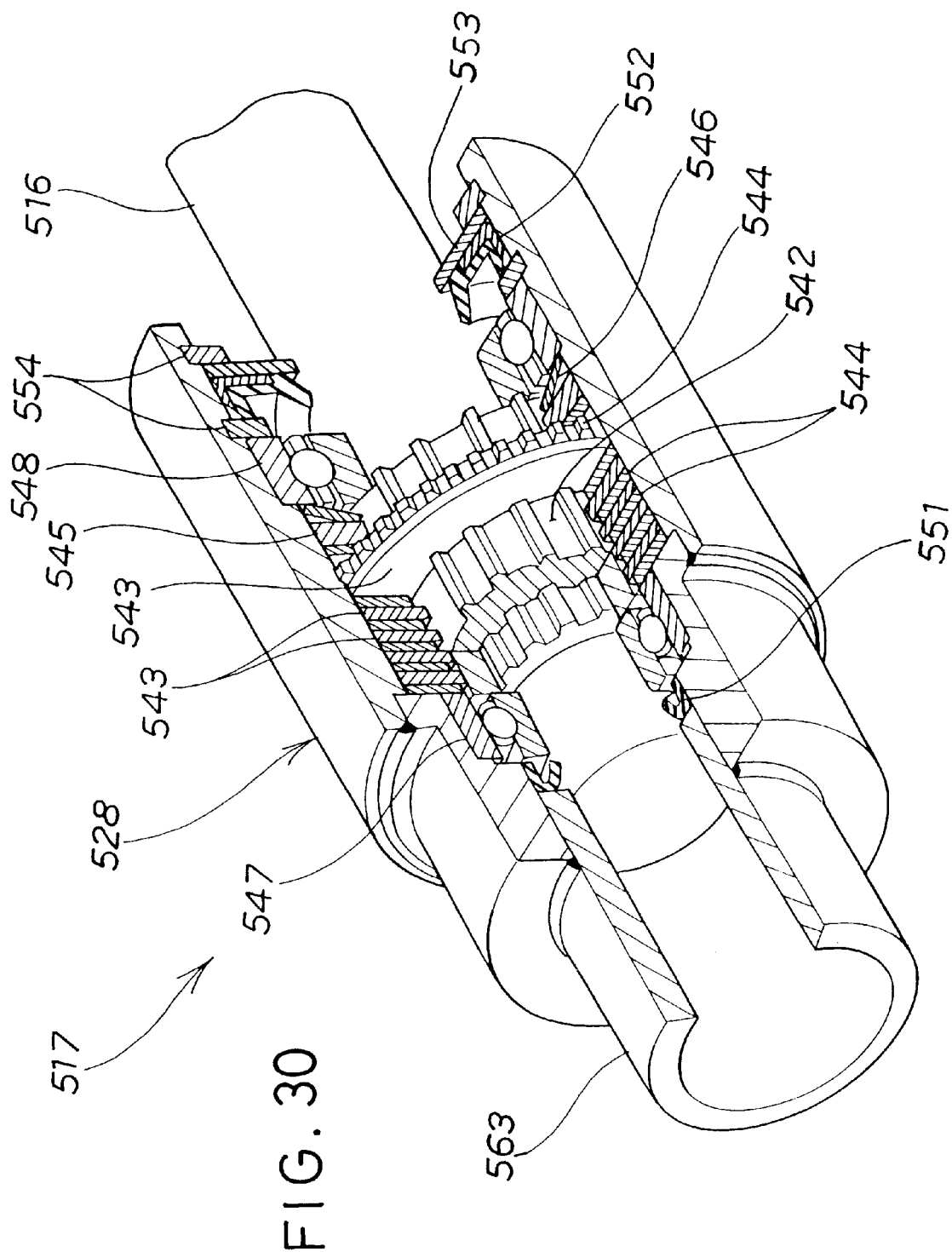
FIG. 30 is an enlarged perspective view illustrating the power transmission system, partly in cross section, of FIG. 29.

FIG. 30 illustrates the friction clutch coupling 517 of the fifth preferred embodiment of the present invention shown in a perspective view, with certain parts being cut away for clarity. The friction clutch coupling 517 includes a collar 542 which meshes with the main drive shaft 516 with a spline connection. An outer periphery of the collar 542 carries thereon a plurality of inner plates 543 by spline connection, which inner plates serve as friction plates. A plurality of outer plates 544 is alternately interlaced with the plurality of inner plates 543 and mesh with an inner periphery of the outer cup 528 with spline connection. Both the inner and outer plates 543 and 544 are urged by a dish spring 546 by means of an urging plate 545. Owing to the spring force of the dish spring 546, there exists friction between the inner and plates 543 and 544. The main drive shaft 516 is rotatably supported in the outer cup 528 by means of bearings 547 and 548. Oil seals 551 and 552 provide a seal for lubricating oil in a space between the bearings 547 and 548, while preventing entry of obstacles into the inside space from outside. A disc 553 is fixed in the outer cup 528 outwardly of the oil seal 552. Reference numerals 554, 554 indicate retainer rings for firmly holding the bearing 548 and the disc 553 in a fixed place. Reference numeral 563 indicates a hollow shaft that forms part of the outer cup 528.

The friction coupling 517 is the same wet type friction coupling which includes the inner plates 543 and the outer plates 544, as those of the first preferred embodiment shown in FIG. 3 and the third preferred embodiment shown in FIG. 20.

Figure 31:
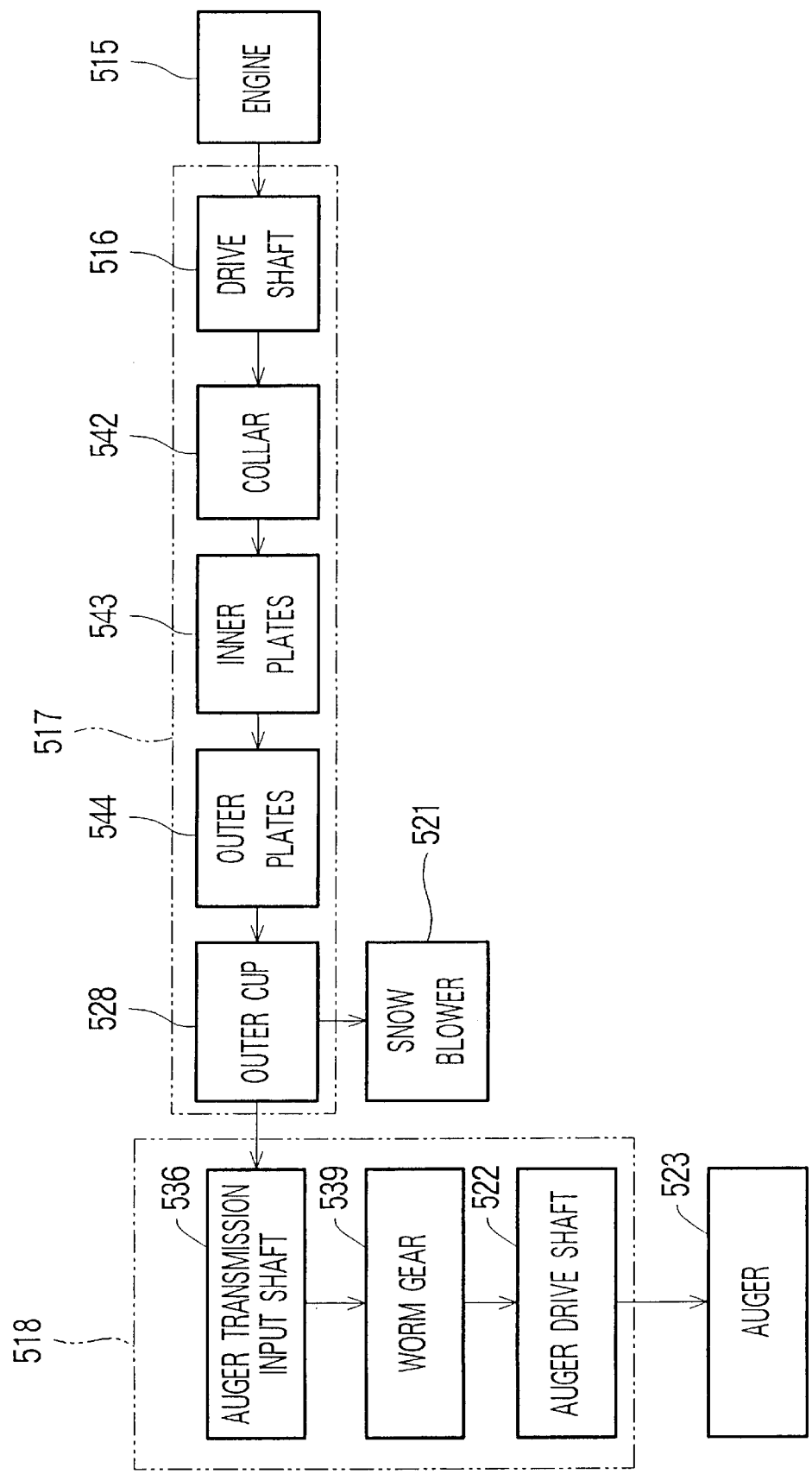
FIG. 31 is a block diagram illustrating a basic sequence of operation of the power transmission system according to the fifth embodiment.

FIG. 31 shows a basic sequence of power transmission in the fifth preferred embodiment of the power transmission system wherein output power of the engine 515 is transmitted to the snow blower 521 and the auger 523.

Output power of the engine 515 is transmitted first to the friction coupling 517, from which output power is diversified to the snow blower 521 and an auger transmission 518.

In the friction coupling 517, output power of the engine 515 is transmitted through the main drive shaft 516, the collar 542, the inner plates 543 and the outer plates 544 to the outer cup 528, from which output power is delivered to the snow blower 521. Further, output power is transmitted from the outer cup 528 to the auger transmission 518, in which output power is delivered through the auger transmission input shaft 536 and the worm gear 539 to the auger drive shaft 522, from which output power is transmitted to the auger 523.

The operation of the fifth preferred embodiment of the power transmission system is described below with reference to FIGS. 32A and 32B.

Figure 32A:
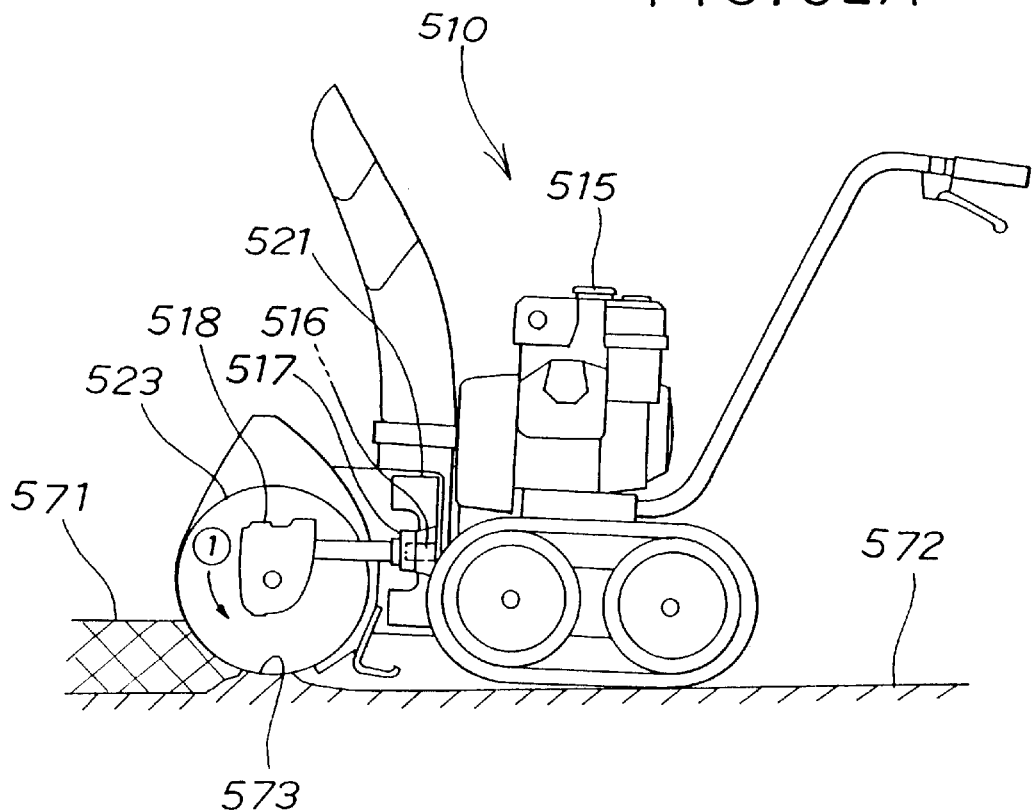
Figure 32B:
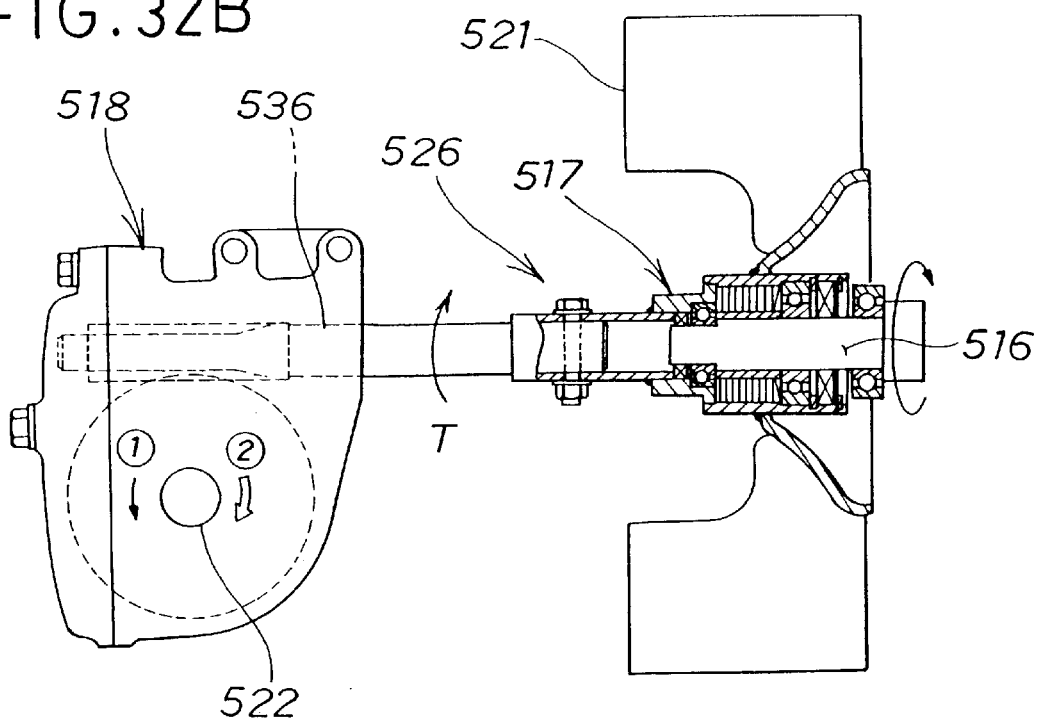

In FIG. 32A, when the auger 523 of the snow-removing machine 510 accidentally encounters or hits a projecting portion 573 of a road surface 572 during snow-removing operation (wherein snow bears a reference numeral 571), rotation of the auger 523 in a direction as indicated by a narrow ① is disturbed, and load exerted on the auger 523 and the power delivery path between the main drive shaft 516 and the auger 523 and the engine 515 rapidly increases.

Owing to this rapid increase in load, the auger drive shaft 522 is subjected to a reacting force for rotation in a direction as indicated by an arrow ② opposite to a rotational direction as indicated by an arrow ①. Due to this reacting force, a torsional momentum T is produced between the auger transmission input shaft 536 and the main drive shaft 516. The torsional momentum T varies in the same manner as in the first preferred embodiment discussed in conjunction with the graph of FIG. 7.

In conjunction with the graph of FIG. 7, when the auger 523 is brought into contact, at time instant t1, with the projecting portions 573 of the road surface 572 as shown in FIG. 32A, the torsional momentum T sharply increases from T1 as viewed in FIG. 7. Within time period between t1 and t2, the torsional momentum T shortly reaches the given torsional momentum T2, and the inner plates 543 and the outer plates 544 (see FIG. 30) of the friction coupling 517 shown in FIG. 32B begin to slip such that the torsional momentum T does not exceed the level T2 in FIG. 7. Accordingly, the torsional momentum T2 is designed to a lower level than the strengths of individual component parts of the power delivery path such that each component part of the power delivery path is prevented from being applied with overload.

It will now be understood in the fifth preferred embodiment of the power transmission system that, as shown in FIG. 29, the outer cup 528 of the friction coupling 517 is directly coupled to the snow blower 521, thereby allowing the bolt and nut to be dispensed with for fixing the main drive shaft to the snow blower to provide ease of assembly.

A sixth preferred embodiment of a power transmission system according to the present invention is described below with reference to FIGS. 33 to 35B. The sixth preferred embodiment differs from the second preferred embodiment of the power transmission system shown in FIG. 11 in which an outer cup 631 of a rubber coupling 617 is directly coupled to a snow blower 621.

Figure 33:
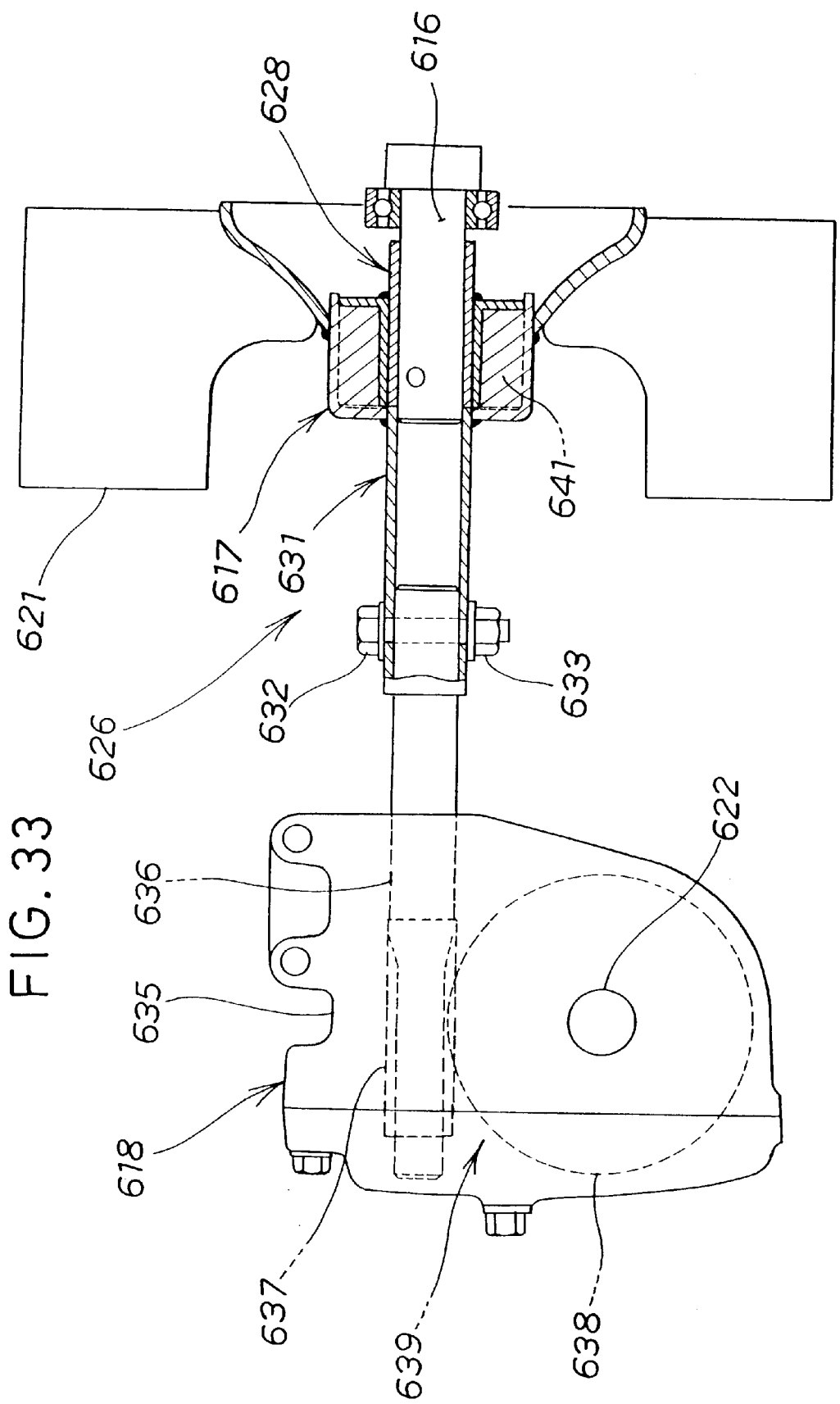
FIG. 33 is a side view of a power transmission system according to a sixth embodiment of the present invention.

In FIG. 33, the friction coupling 617 is mounted in a space 626, i.e., in an inside of the snow blower 621, between an auger transmission 618 and the snow blower 21 to prevent a power delivery path starting from a main drive shaft 616 to an auger 523 (see FIG. 32A) from being applied with overload.

The rubber coupling 617 has an inner member formed by an input shaft 628 coupled to the main drive shaft 616. An output member of the rubber coupling 617 includes an outer cup 631 to which the snow blower 621 is coupled. The outer cup 631 is interconnected with an input shaft 636 of the auger transmission 618 by means of a bolt 632 and a nut 633.

The auger transmission 618 includes a transmission case 635, the auger transmission input shaft 636 rotatably supported in the transmission case 635, a worm wheel 638 meshing with a worm 637 formed on an outer periphery of the auger transmission input shaft 636, and the auger drive shaft 622 fixedly secured to the center of the worm wheel 638. The worm 637 and the worm wheel 638 constitute a worm gear 639.

The rubber coupling 617 forming part of the sixth preferred embodiment of the power transmission system has the same structure as that 217 of the second preferred embodiment of the power transmission system shown in FIG. 12, detailed description of the same is here in omitted for the sake of simplicity by merely referring to FIGS. 12 and 13.

Figure 34:
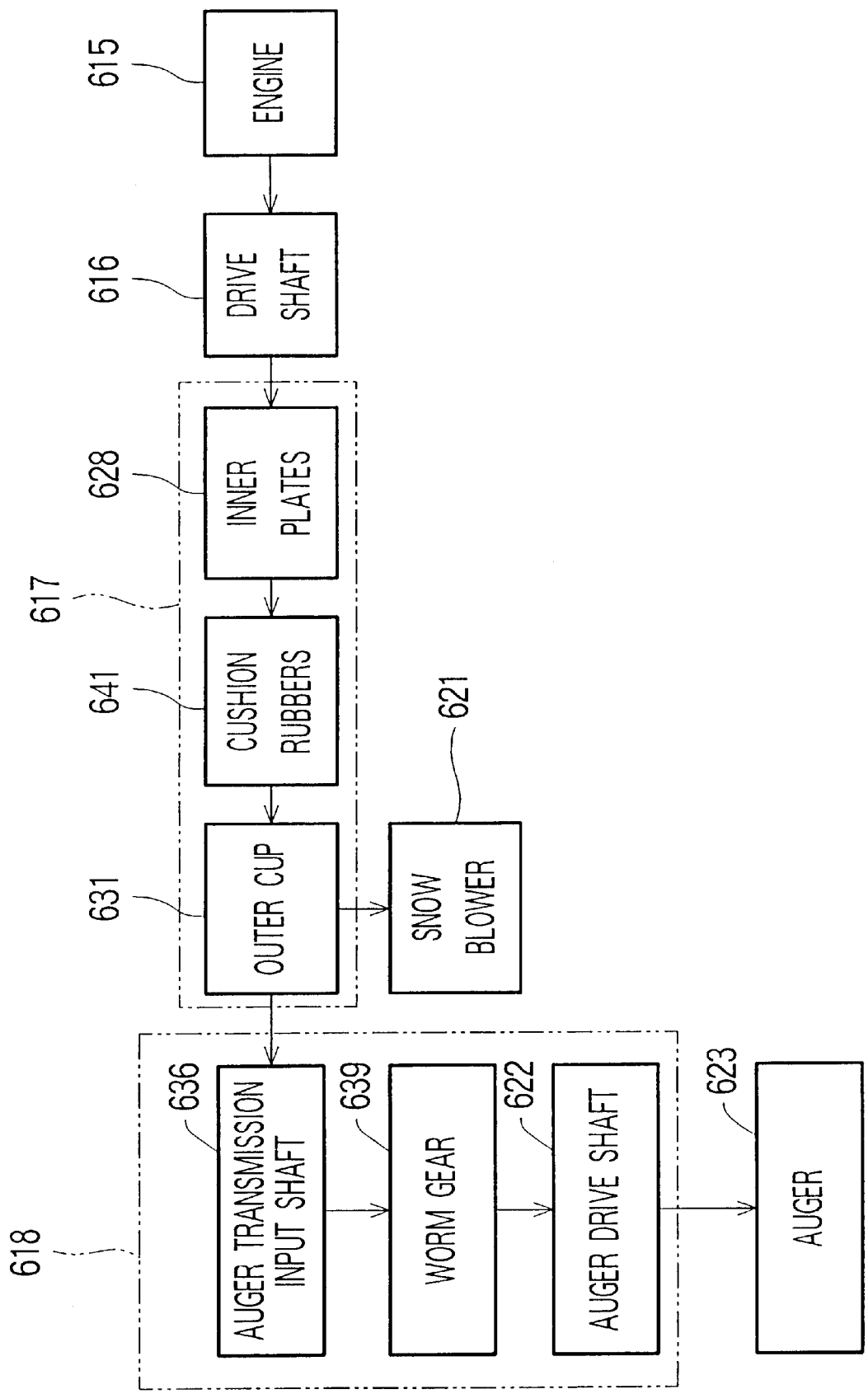
FIG. 34 is a block diagram illustrating a basic sequence of power delivery in the sixth embodiment.

FIG. 34 shows basic sequence of power delivery path in the sixth preferred embodiment of the power transmission system, wherein output power of the engine 615 is transmitted to the snow blower 621 and the auger 623.

Output power of the engine 615 is transmitted through the main drive shaft 616 and the rubber coupling 617 to the snow blower 621 and the auger transmission 618. In the rubber coupling 617, output power is transmitted through the inner shaft 628 and the cushion rubbers 641 to the outer cup 631. Since the outer cup 631 is directly coupled to the snow blower 621, output power of the engine 615 is coupled through the outer cup 631 to the snow blower 621.

In addition, output power is delivered from the outer cup 631 to the auger transmission 618, in which output power is delivered from the auger transmission input shaft 636 to the auger drive shaft 622 via the worm gear 639, with output power being transmitted to the auger 623 from the auger drive shaft 622.

That is, output power of the engine 615 is transmitted from the main drive shaft 616 to the snow blower 621 and the auger 623 via the rubber coupling 617.

The operation of the sixth preferred embodiment of the power transmission system will be described below with reference to FIGS. 35A and 35B.

Figure 35A:
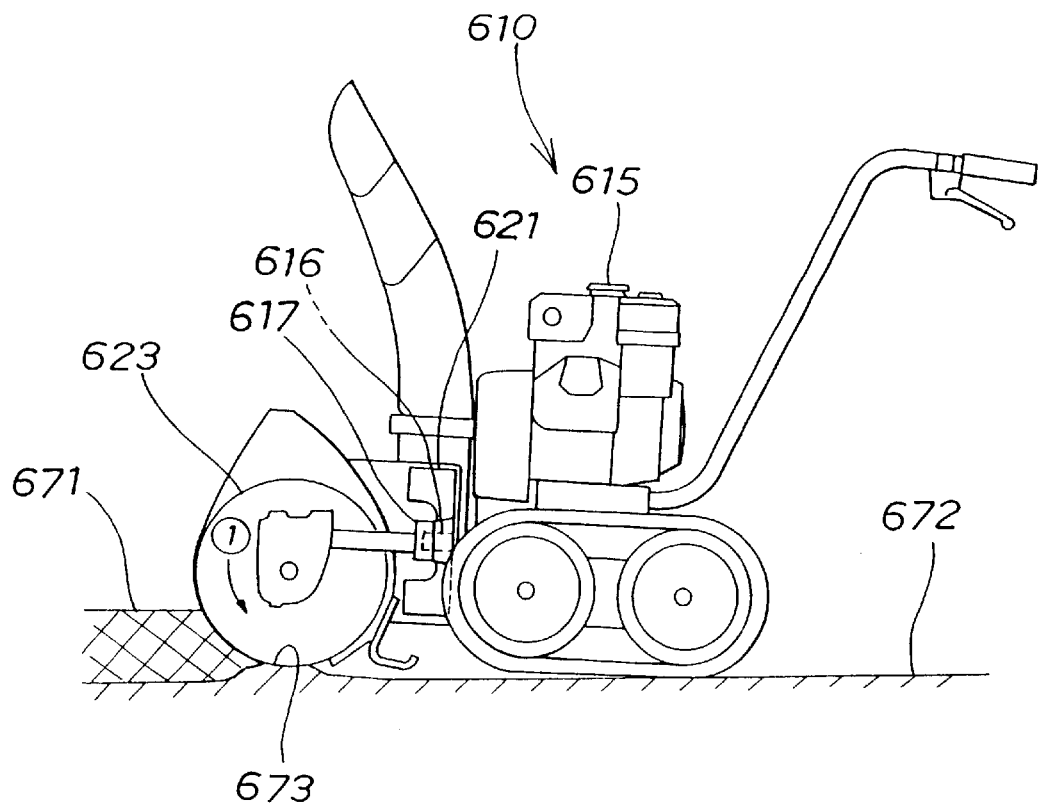

In FIG. 35A, when the auger 623 of the slow removing machine 610 accidentally encounters or hits a projecting portion 673 of a road surface 672 during snow removing operation (wherein snow bears a reference numeral 671), rotation of the auger 623 in a direction as indicated by an arrow ① is disturbed, and load exerted on the auger 623 and the power delivery path between the main drive shaft 616 and the auger 623 and the engine 615 rapidly increases.

Figure 35B:
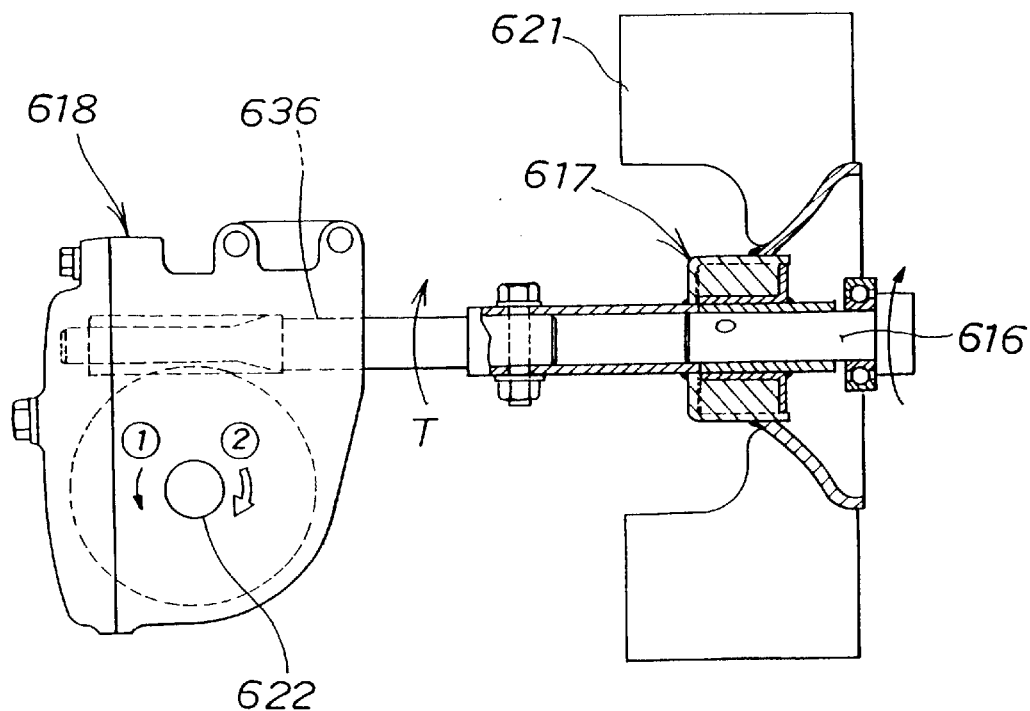

In FIG. 35B, owing to the rapid increase in load, the auger drive shaft 622 is subjected to a reacting force for rotation in a direction as indicated by an arrow ② in FIG. 35B opposite to a rotational direction as indicated by an arrow ①. Due to this reacting force, a torsional momentum T is produced between the auger transmission input shaft 636 and the main drive shaft 616.

The torsional momentum T gradually varies to a given torsional momentum T2 owing to the rubber coupling 641 in the same manner as shown in FIG. 17 which has been discussed above with reference to the second preferred embodiment. For this reason, it is possible to absorb impact shocks in an efficient manner, thereby preventing individual component parts of the power delivery path from being applied with overload.

A seventh preferred embodiment of a power transmission system according to the present invention is described below with reference to FIGS. 36 to 38B.

Figure 36:
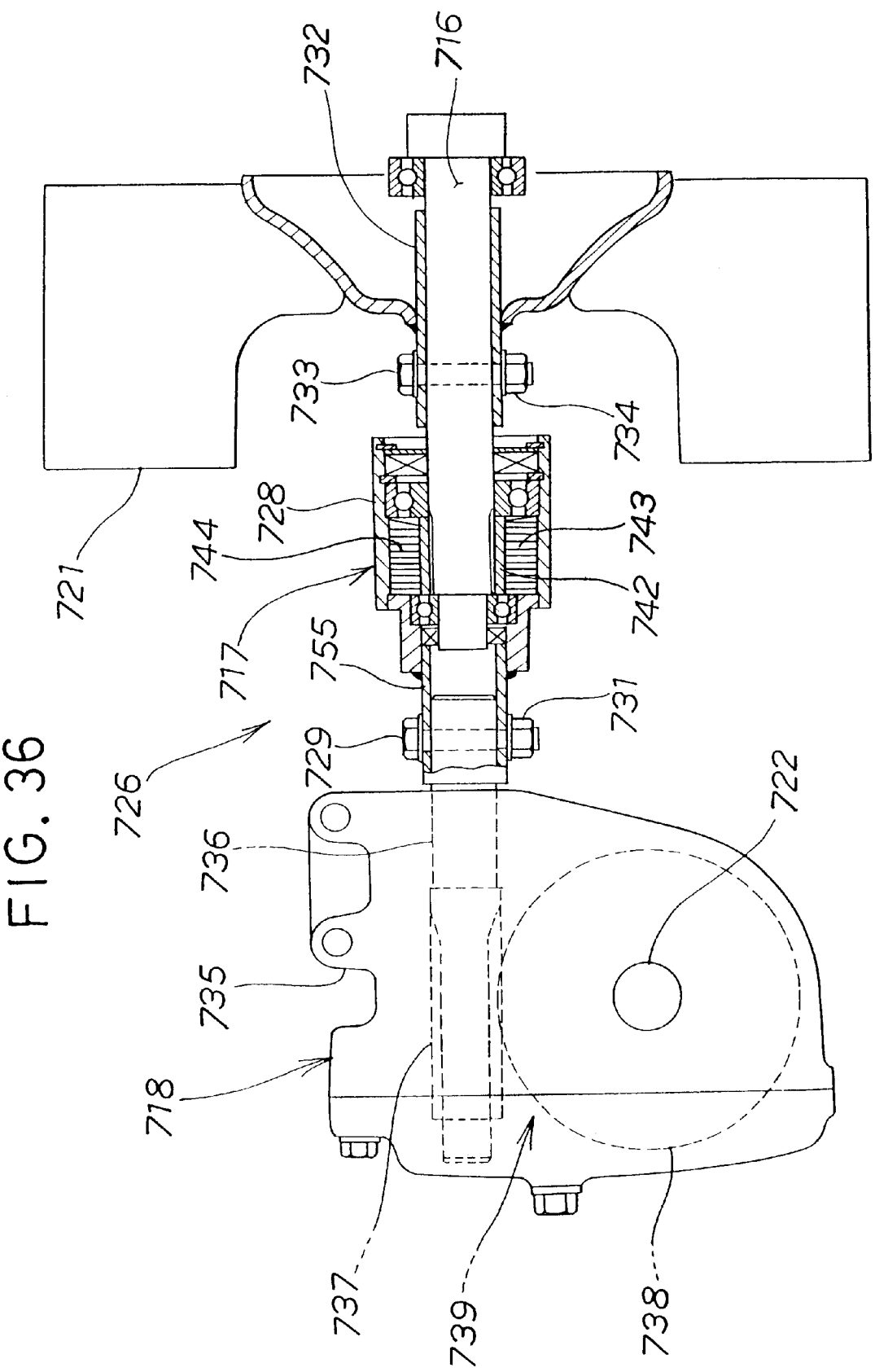
FIG. 36 is a side view of a power transmission system according to a seventh embodiment of the present invention.

In FIG. 36, a friction coupling 717 is mounted in a space 726 between an auger transmission 718 and a snow blower 721 to prevent a power delivery path starting from a main drive shaft 716 to an auger 723 (see FIG. 38A) from being applied with overload.

The friction coupling 717 has an input member formed by the main drive shaft 716, and an output member formed by an outer cup 728. The outer cup 728 is coupled to the auger transmission input shaft 736 by means of a bolt 729 and a nut 731 via a hollow shaft 755 coupled to the outer cup 728. A blower drive shaft 732 includes a hollow shaft, to which the main drive shaft 716 is fitted and detachably fixed in place by means of the bolt 733 and the nut 734. The snow blower 721 is coupled to an outer periphery of the blower drive shaft 732. Consequently, the snow blower 721 is detachably mounted on the main drive shaft 716.

The auger transmission 718 includes a transmission case 735, an auger transmission input shaft 736 rotatably supported in the transmission case 735, a worm wheel 738 meshing with a worm 737 formed on an outer periphery of the auger transmission input shaft 736, and the auger drive shaft 722 fixedly secured to the center of the worm wheel 738. The worm 737 and the worm wheel 738 constitute a worm gear 739.

The friction coupling 717 includes a wet type friction coupling having the same structure as that of the wet friction coupling 517 forming part of the fifth preferred embodiment shown in FIG. 30 and, therefore, a detailed description of the same is herein omitted for the sake of simplicity. That is, basically, the friction clutch 717 includes a collar 742 coupled to the main drive shaft 716 by spline coupling, a plurality of inner plates 743 coupled to an outer periphery of the collar 742 by spline coupling and serving as friction plates. A plurality of outer plates 744 are alternately interposed with the plurality of inner plates 743 and are coupled to an inner periphery of the outer cup 728 by spline coupling. The collar 742 corresponds to that 42 shown in FIG. 30. The inner plates 743 correspond to those 43 shown in FIG. 30, and the outer plates 744 correspond to those 44 shown in FIG. 30.

When the snow blower 721 is damaged and it is required to be replaced with new one, since the main drive shaft 716 and the collar 742 of the friction coupling 717 are interconnected one another merely by spline coupling, the friction coupling 717 is first removed from the main drive shaft 716 in the forward direction (that is, leftward in FIG. 36). Subsequently, the bolt 733 and the nut 734 are unfastened, and the snow blower 732 is pulled off from the main drive shaft 716, which is consequently removed in a simple manner. Further, a new snow blower 721 equipped with a blower drive shaft 732 is fitted to the main drive shaft 716 in a sequence opposite to that of disassembling the damaged snow blower, providing ease of replacement of the damaged snow blower 721 with a new one 721.

Figure 37:
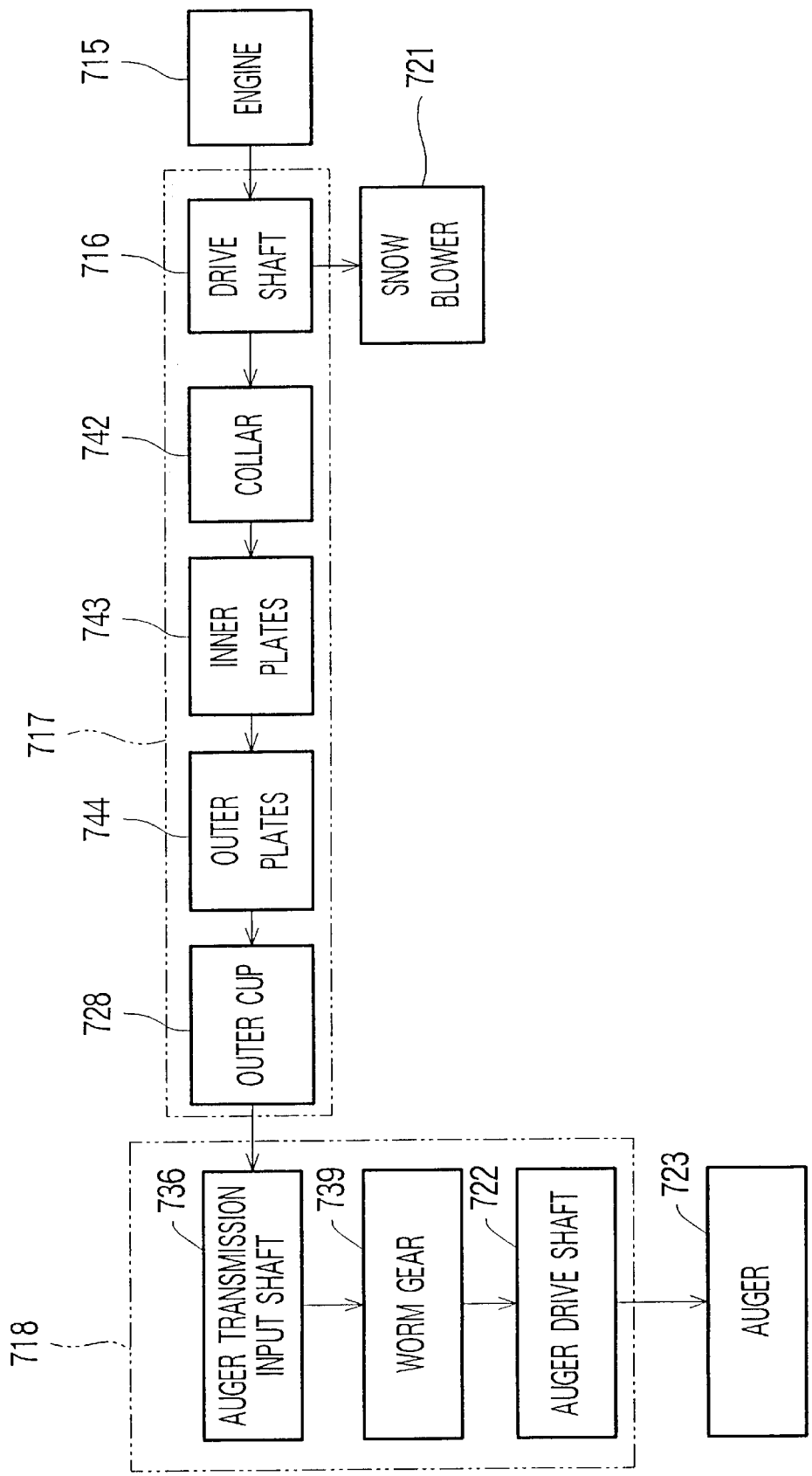
FIG. 37 is a block diagram illustrating a basic sequence of power delivery in the seventh embodiment.

FIG. 37 shows a basic sequence of power transmission in the seventh preferred embodiment of the power transmission system wherein output power of the engine 715 is transmitted to the snow blower 721 and the auger 723.

Output power of the engine 715 is transmitted first to the friction coupling 717, from which output power is delivered to the snow blower 721 and an auger transmission 718.

In the friction coupling 717, outpout power of the engine 715 is transmitted through the main drive shaft 716, the collar 742, the inner plates 743 and the outer plates 744 to the outer cup 728, and output power is also delivered through the main drive shaft 716 to the snow blower 721. Further, output power is transmitted from the outer cup 728 to the auger transmission 718, in which output power is delivered through the auger transmission input shaft 736 and the worm gear 739 to the auger drive shaft 722, from which output power is transmitted to the auger 723.

The operation of the seventh preferred embodiment of the power transmission system will be described below with reference to FIGS. 38A and 38B.

Figure 38A:
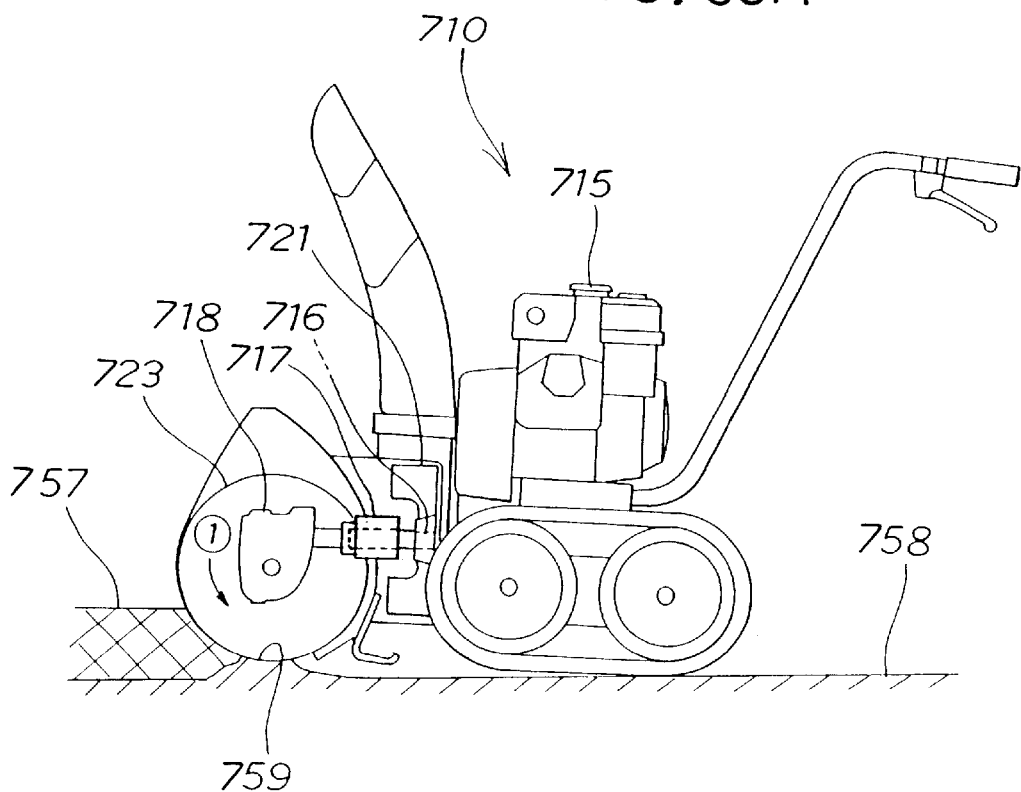
Figure 38B:
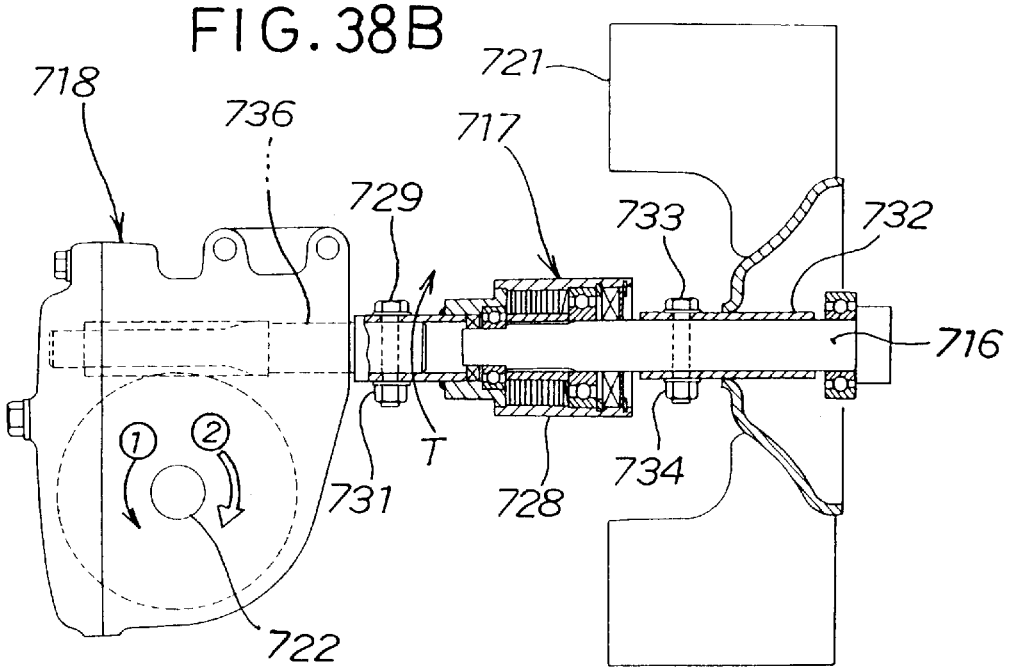

In FIG. 38A, when the auger 723 of the snow-removing machine 710 is brought into contact with a projecting portion 759 of a road surface 758 during snow-removing operation (wherein snow bears a reference numeral 757), rotation of the auger 723 in a direction as indicated by an arrow ① is disturbed, and load acting on the auger 723 and the power delivery path between the auger 723 and the engine 715 rapidly increases.

Owing to this rapid increase in load, the auger drive shaft 722 is subjected to a reacting force for rotation in a direction as indicated by an arrow ② opposite to a rotational direction as indicated by an arrow ①. Due to this reacting force, a torsional momentum T is produced between the auger transmission input shaft 736 and the main drive shaft 716. The torsional momentum T varies in the same manner as in the first preferred embodiment discussed in conjunction with the graph of FIG. 7.

In conjunction with the graph of FIG. 7, when the auger 723 encounters, at time instant t1, the projecting portions 759 of the road surface 758 as shown in FIG. 38A, the torsional momentum T sharply increases from T1 as viewed in FIG. 7. Within time period between t1 and t2, the torsional momentum T shortly reaches the given torsional momentum T2, and the inner plates 743 and the outer plates 744 of the friction coupling 717 begin to slip such that the torsional momentum T does not exceed the level T2 in FIG. 7. Accordingly, the torsional momentum T2 is designed to a lower level than the strengths of individual component parts of the power delivery path such that each component part of the power delivery path is prevented from being applied with overload.

In FIG. 38A, further, when the auger 723 encounters an obstacle such as a relatively large stone or a lump of ice, during collecting snow, between the snow blower 721 and the frame body of the snow-removing machine 710, rotation of the snow blower 721 is disturbed, with a resultant damage being caused in the snow blower 721. When this occurs, the bolt 733 and the nut 734 can be removed and the damaged snow blower 721 can be replaced with a new one in an easy manner as discussed above.

It will now be understood in the seventh preferred embodiment of the power transmission system that since the snow blower 721 is fixedly secured to the main drive shaft 716 with the bolt 733 and the nut 734 in a detachable manner, it is possible to replace the damaged snow blower with the new one in an easy fashion.

An eighth preferred embodiment of a power transmission system according to the present invention is described below with reference to FIGS. 39 to 41B. The power transmission system of the eighth preferred embodiment differs from the second preferred embodiment shown in FIG. 11 in which a snow blower is detachably mounted on a main drive shaft.

Figure 39:
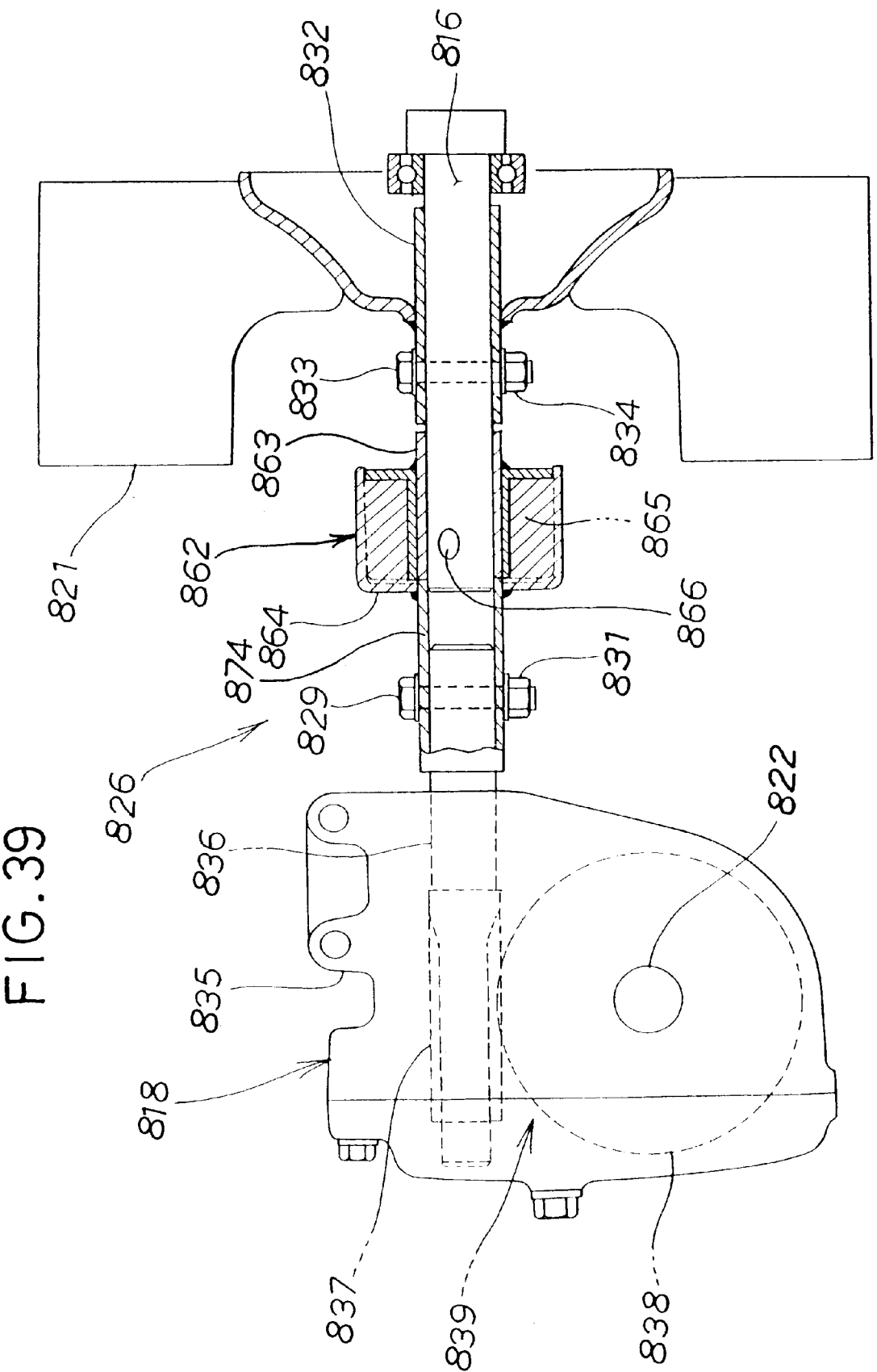
FIG. 39 is a side view of a power transmission system, partly in cross section, according to an eighth embodiment of the present invention.

In FIG. 39, with a view to preventing the power transmission system extending from the main drive shaft 816 to an auger 823 (see FIG. 41A) from being subjected to overload, a rubber coupling 862 is mounted in a space 826 between the auger transmission 818 and the snow blower 821.

The rubber coupling 862 has an inner shaft 863 serving as an input member and mounted on the main drive shaft 816. An outer cup 864, that serves as an output member, of the rubber coupling 862 includes a hollow shaft 874 integrally formed with the outer cup 864 and interconnected with the auger transmission input shaft 836 by means of a bolt 829 and a nut 831.

The blower drive shaft 832 includes a hollow shaft, to which the main drive shaft 816 is fitted and fixedly secured with suitable fixing means such as a bolt 833 and a nut 834 in a detachable manner. The snow blower 821 is firmly secured to an outer periphery of the blower drive shaft 832. Consequently, the snow blower 821 can be mounted on the main drive shaft 816 in a detachable manner.

The auger transmission 818 includes a transmission case 835, an auger transmission input shaft 836 rotatably supported in the transmission case 835, a worm wheel 838 meshing with a worm 837 formed on an outer periphery of the auger transmission input shaft 836, and the auger drive shaft 822 fixedly secured to the center of the worm wheel 838. The worm 837 and the worm wheel 838 constitute a worm gear 839.

The rubber coupling 862 has the same structure as the rubber coupling 217 of the second preferred embodiment shown in FIGS. 12 and 13 and, therefore, a detailed description of the same is herein omitted for the sake of simplicity. Basically, the main drive shaft 816 and the inner shaft 863 are connected to one another with a connecting pin 866, with the inner shaft 863 and a pair of cushion rubbers 865 being received in the outer cup 864. The inner shaft 863 corresponds to the inner shaft 228 shown in FIG. 12, the cushion rubbers 865 correspond to the cushion rubbers 241 shown in FIG. 12, and the outer cup 864 corresponds to the outer cup 231 shown in FIG. 12.

When the snow blower 821 is damaged and it is required to be replaced with new one, the connecting pin 866 is removed first, and the rubber coupling 862 is separated from the main drive shaft 816. Subsequently, the bolt 833 and the nut 834 are unfastened, and the snow blower 832 is pulled off from the main drive shaft 816, which is consequently removed in a simple manner. Further, a new snow blower 821 equipped with a blower drive shaft 832 is fitted to the main drive shaft 816 in a sequence opposite to that of disassembling the damaged snow blower, providing ease of replacement of the damaged snow blower 821 with a new one 821.

Figure 40:
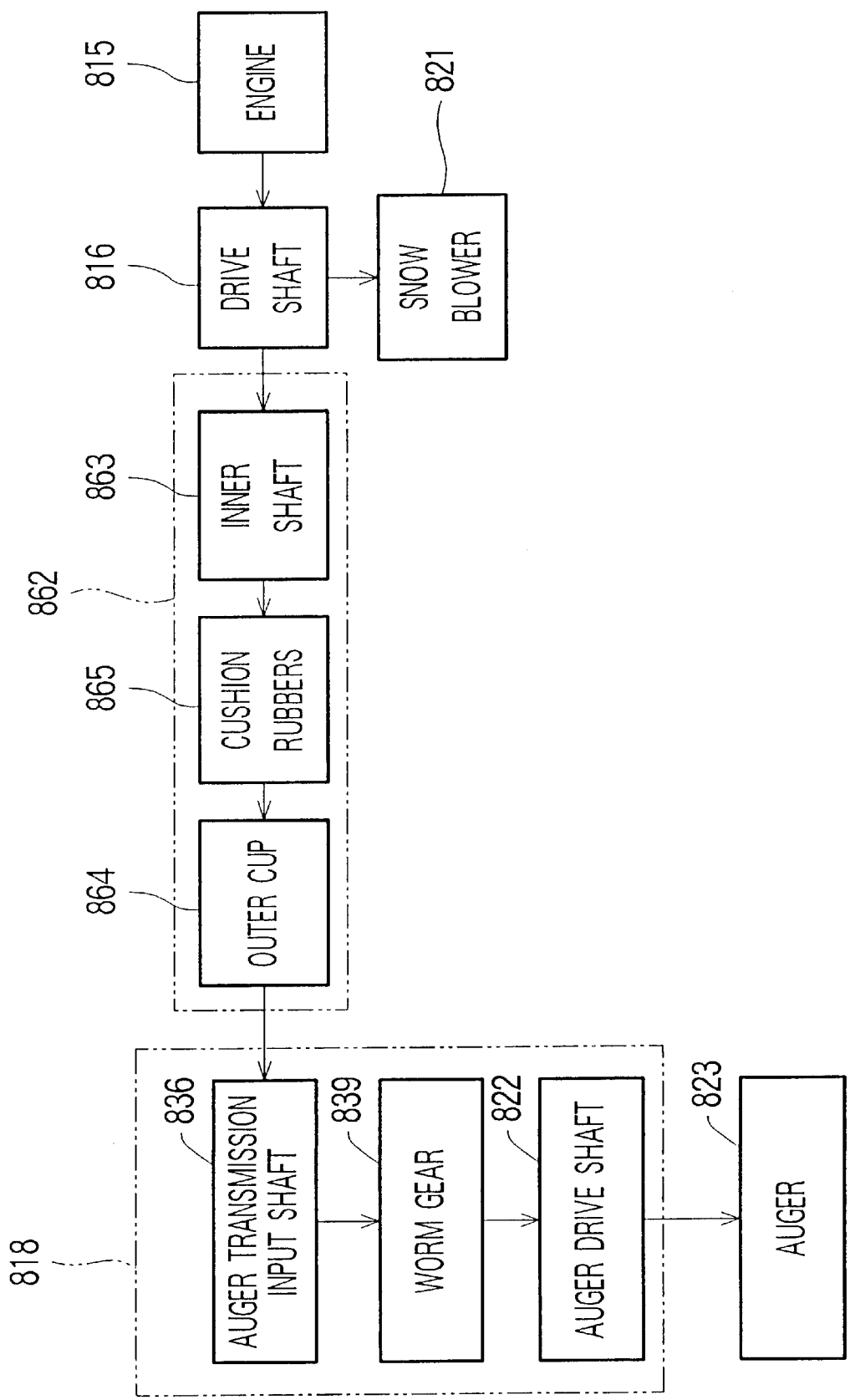
FIG. 40 is a block diagram illustrating the operation of the power transmission system according to the eighth embodiment.

FIG. 40 shows a basic sequence of power delivery path in the eighth preferred embodiment of the power transmission system, wherein output power of the engine 815 is transmitted to the snow blower 821 and the auger 823.

Since the snow blower 821 is directly connected to the main drive shaft 816, output power of the engine 815 is directly transmitted to the snow blower 821 through the main drive shaft 816. Output power of the engine 815 is transmitted through the main drive shaft 816 and the rubber coupling 862 to the auger transmission 818. In the rubber coupling 862, output power is transmitted through the inner shaft 863 and the cushion rubbers 865 to the outer cup 864.

In addition, output power is delivered from the outer cup 864 to the auger transmission 818, in which output power is delivered from the auger transmission input shaft 836 to the auger drive shaft 822 via the worm gear 839, with output power being transmitted to the auger 823 from the auger drive shaft 822.

The operation of the eighth preferred embodiment of the power transmission system is described below with reference to FIGS. 41A and 41B.

Figure 41A:
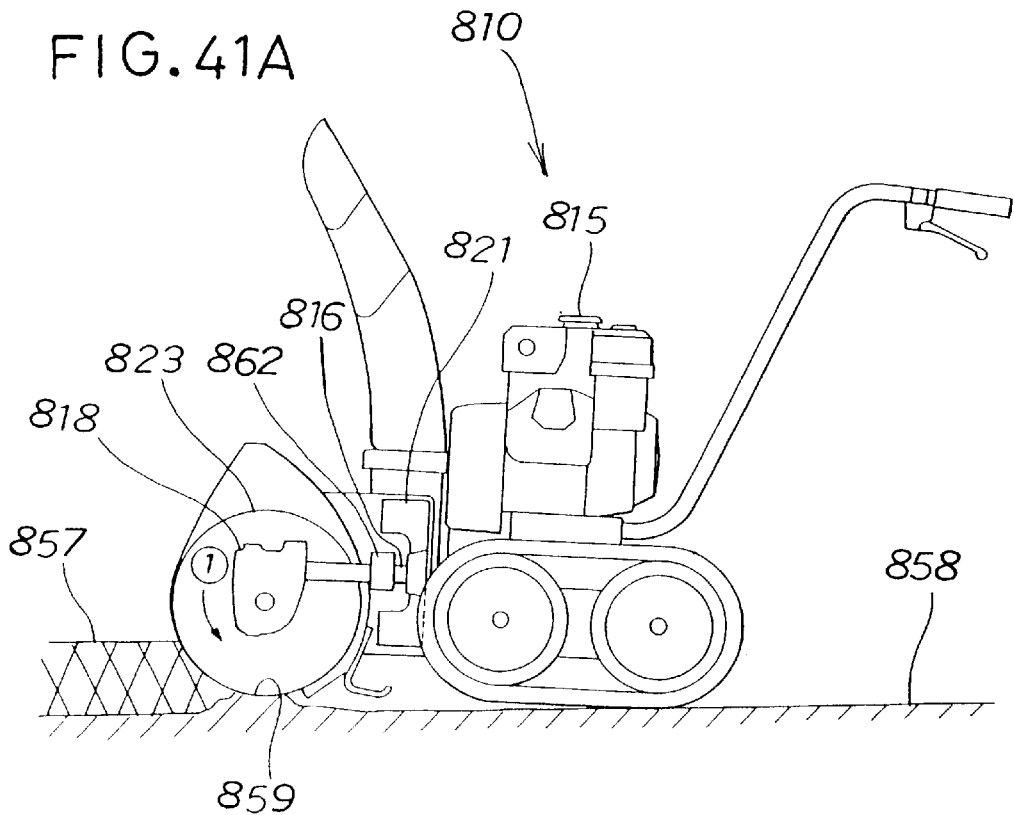

In FIG. 41A, when the auger 823 of the snow-removing machine 810 accidentally encounters or hits a projecting portion 859 of a road surface 858 during snow-removing operation (wherein snow bears a reference numeral 857), rotation of the auger 823 in a direction as indicated by an arrow ① is disturbed, and load exerted on the auger 823 and the power delivery path between the main drive shaft 816 and the auger 823 and the engine 815 rapidly increases.

Figure 41B:
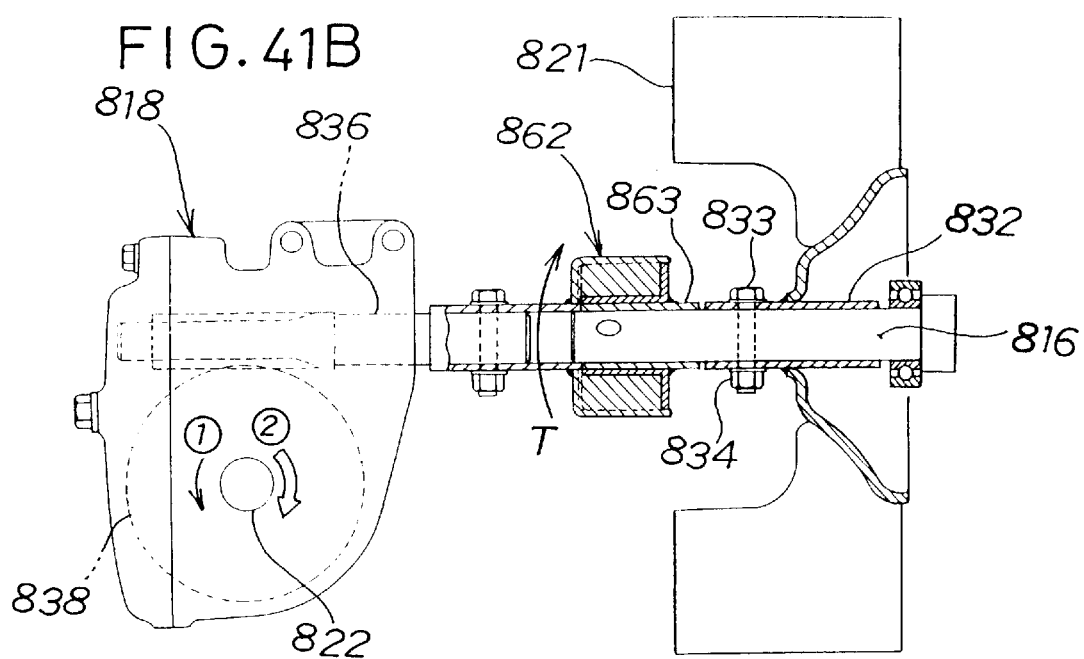

Owing to this rapid increase in load, the auger drive shaft 822 is subjected to a reacting force for rotation in a direction as indicated by an arrow ② in FIG. 41B opposite to a rotational direction as indicated by an arrow ①. Due to this reacting force, a torsional momentum T is produced between the auger transmission input shaft 836 and the main drive shaft 816.

The torsional momentum T gradually varies to a given torsional momentum T2 owing to the rubber coupling 862 in the same manner as shown in FIG. 17 which has been discussed above with reference to the second preferred embodiment. For this reason, it is possible to absorb impact shocks in an efficient manner, thereby providing protection from damage when individual component parts of the power delivery path encounters overload.

In the eighth preferred embodiment of the power transmission system incorporating the rubber coupling discussed, since the snow blower 821 is detachably mounted on the main shaft 816, the damaged snow blower 821 can be easily replaced with a new snow blower.

Obviously, various minor changes and modifications of the present invention are possible in the light of the above teaching. It is therefore to be understood that within the scope of the appended claims the invention may be practiced otherwise than as specifically described.

What is claimed is:

1. A power transmission system for use in a snow-removing machine, the power transmission system comprising:

a drive shaft having a first end for supporting a snow blower having a forward end and a rearward end, the drive shaft having a second end disposed opposite the first end and for extension from the forward end of the snow blower;

a drive source for rotationally driving the drive shaft;

an auger transmission connected to the second end of the drive shaft and having an auger shaft for undergoing rotation in accordance with rotation of the drive shaft;

an auger mounted on the auger shaft for rotation therewith; and an overload protecting mechanism disposed between the snow blower and the auger transmission for preventing application of a power overload between the drive shaft and the auger.

2. A power transmission system according to claim 1; wherein the overload protecting mechanism is disposed in close proximity to the auger transmission.

3. A power transmission system according to claim 2; wherein the overload protecting mechanism comprises a wet-type friction coupling having at least a pair of friction plates in contact with one another, one of the friction plates being connected to the drive shaft and the other of the friction plates being connected to an input shaft of the auger transmission so that the friction plates slip when a torque to be transmitted by the drive shaft exceeds a given value.

4. A power transmission system according to claim 3; wherein the input shaft of the auger transmission has an oil passage communicating with an interior of the auger transmission and an interior of the wet-type friction coupling.

5. A power transmission system according to claim 1; wherein the overload protecting mechanism comprises a wet-type friction coupling having at least a pair of friction plates in contact with one another, one of the friction plates being connected to the drive shaft and the other of the friction plates being connected to an input shaft of the auger transmission so that the friction plates slip when a torque to be transmitted by the drive shaft exceeds a given value.

6. A power transmission system according to claim 5; wherein the input shaft of the auger transmission has an oil passage communicating with an interior of the auger transmission and an interior of the wet-type friction coupling.

7. A power transmission system according to claim 1; wherein the overload protecting mechanism comprises a rubber coupling having an input member connected to the drive shaft, an output member, and a cushion rubber disposed between the input member and the output member.

8. A power transmission system according to claim 1; wherein the overload protecting mechanism comprises a rotational input member connected to the drive shaft and a rotational output member; and wherein the snow blower and the auger transmission are connected to the rotational output member.

9. A power transmission system according to claim 8; wherein when a torque transmitted from the rotational input member exceeds a given value, the rotational output member begins to rotate at a later time relative to the rotational input member.

10. A power transmission system according to claim 8; wherein the rotational output member has an inner cylinder, an outer cylinder covering the inner cylinder, and a connecting element for connecting the inner and outer cylinders to one another; and wherein one of the inner and outer cylinders is connected to the auger and the other of the inner and outer cylinders is connected to the snow blower.

11. A power transmission system according to claim 8; wherein rotational output member is directly connected to the snow blower.

12. A power transmission system according to claim 1; further comprising a detachable connecting element for detachably connecting the drive shaft to the snow blower.

13. A snow-removing machine comprising:

a frame having a front end and a rear end;

a drive shaft mounted on the front end of the frame for undergoing rotation, the drive shaft having a first end and a second end;

a snow blower having an impeller mounted on the first end of the drive shaft for rotation therewith;

an auger transmission disposed forwardly of the snow blower and toward the front end of the frame, the auger transmission having an auger input shaft connected to the second end of the drive shaft for rotation therewith;

an auger mounted on the auger input shaft for rotation therewith; and overload protecting means disposed between the snow blower and the auger transmission for preventing application of a power overload between the drive shaft and the auger.

14. A snow-removing machine according to claim 13; wherein the overload protecting means comprises a tubular casing, a pair of bearings mounted in the tubular casing and rotationally supporting the auger input shaft, and a shaft extending from the tubular casing and connected to the drive shaft for rotation therewith.

15. A snow-removing machine according to claim 13; wherein the overload protecting means comprises a wet-type friction coupling having at least a pair of friction plates in contact with one another, one of the friction plates being connected to the drive shaft and the other of the friction plates being connected to the auger input shaft so that the friction plates slip relative to one another when a torque to be transmitted by the drive shaft exceeds a given value.

16. A snow-removing machine according to claim 13; wherein the auger input shaft has an oil passage communicating with an interior of the auger transmission and an interior of the wet-type friction coupling.

17. A snow-removing machine according to claim 13; wherein the overload protecting means comprises a rubber coupling having an input member connected to the drive shaft, an output member, and a cushion rubber disposed between the input member and the output member.

18. A snow-removing machine according to claim 13; wherein the overload protecting means comprises an input member connected to the drive shaft and an output member; and wherein the snow blower and the auger transmission are connected to the output member.

19. A snow-removing machine according to claim 18; wherein the output member has an inner cylinder, an outer cylinder covering the inner cylinder, and a connecting element for connecting the inner and outer cylinders to one another; and wherein one of the inner and outer cylinders is connected to the auger and the other of the inner and outer cylinders is connected to the snow blower.

20. A snow-removing machine according to claim 18; wherein the output member is connected directly to the snow blower.

* * * * *